March 17, 1936.  J. B. KRYZANOWSKY  2,033,941

VALVE

Filed Sept. 18, 1926  34 Sheets—Sheet 1

Inventor
Julia B. Kryzanowsky  Deceased
Constant J. Kryzanowsky  Administrator

By Steward & McKay
Attorneys

March 17, 1936. J. B. KRYZANOWSKY 2,033,941
VALVE
Filed Sept. 18, 1926 34 Sheets-Sheet 2
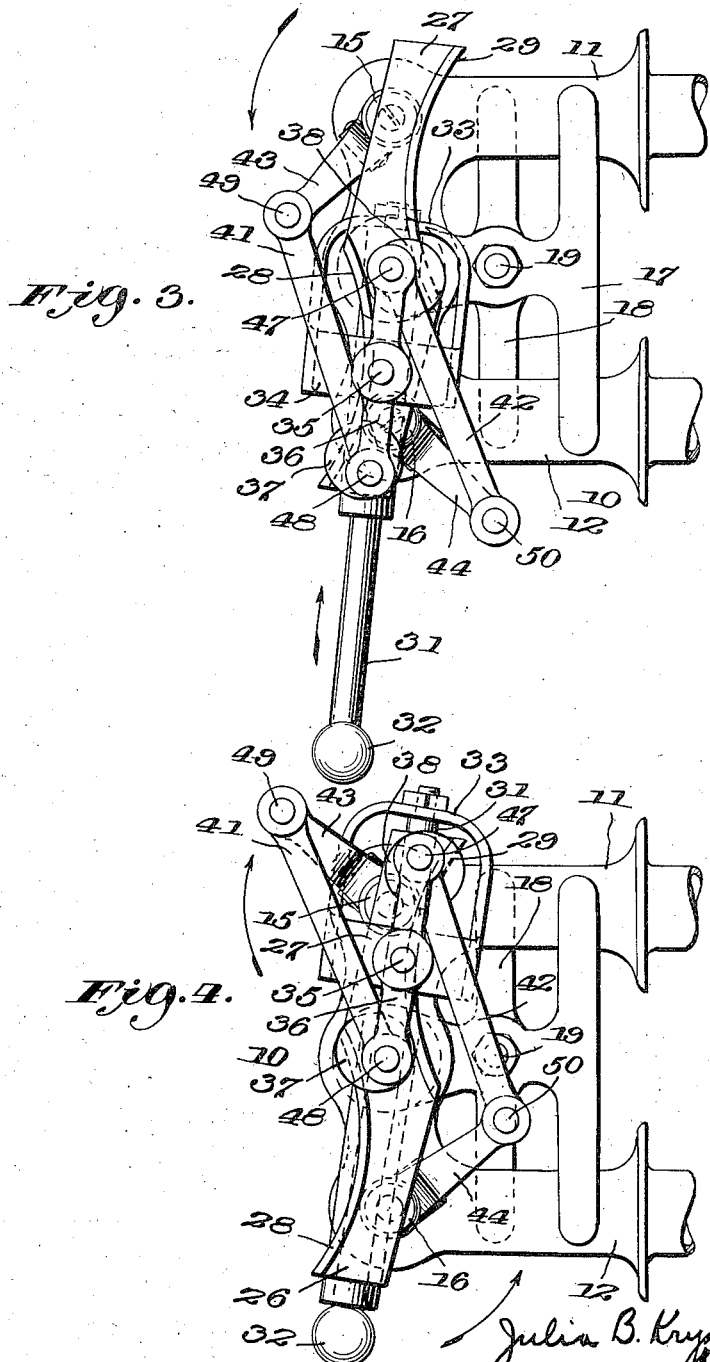

March 17, 1936. J. B. KRYZANOWSKY 2,033,941
VALVE
Filed Sept. 18, 1926 34 Sheets-Sheet 3
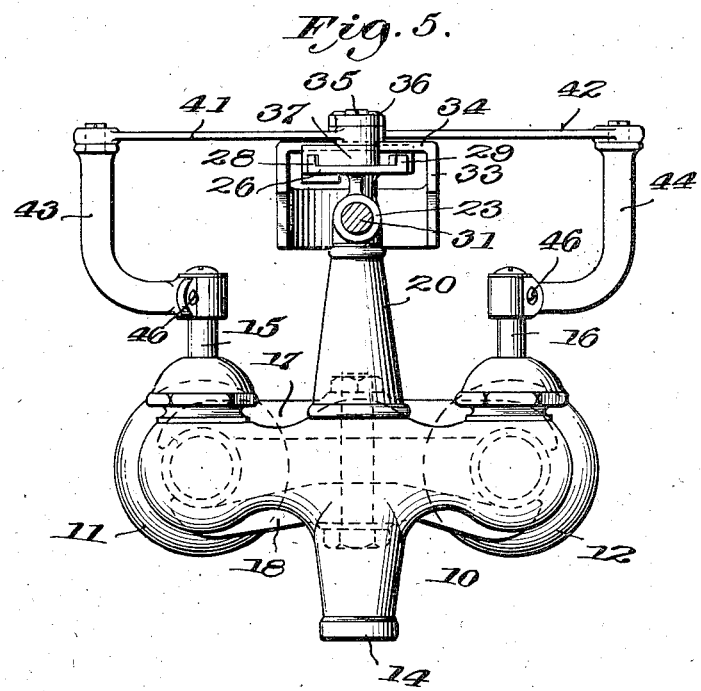
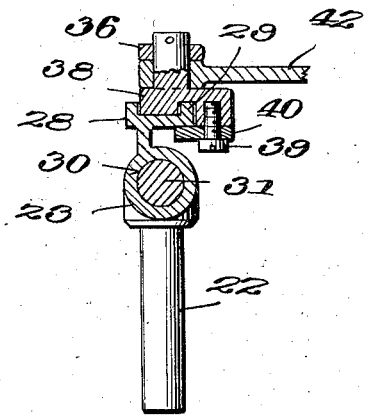
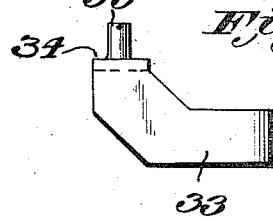
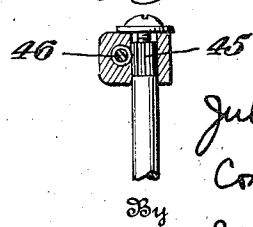
Inventor
Julia B. Kryzanowsky (deceased)
Constant J. Kryzanowsky administrator
By Stewart & McKay Attorneys March 17, 1936. J. B. KRYZANOWSKY 2,033,941
VALVE
Filed Sept. 18, 1926 34 Sheets-Sheet 4
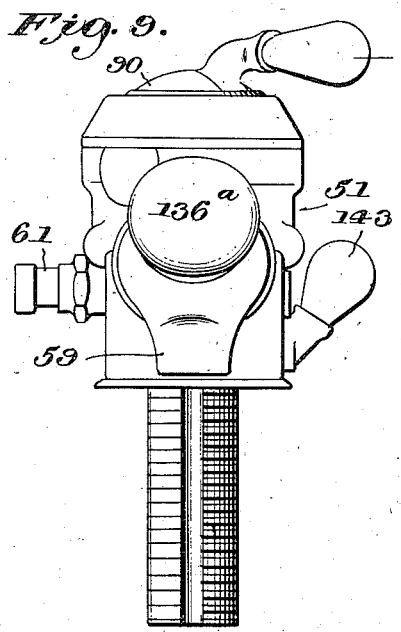
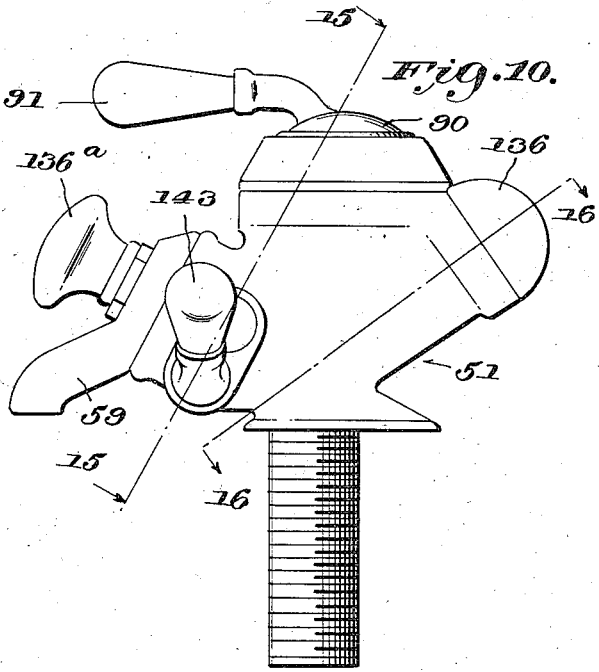
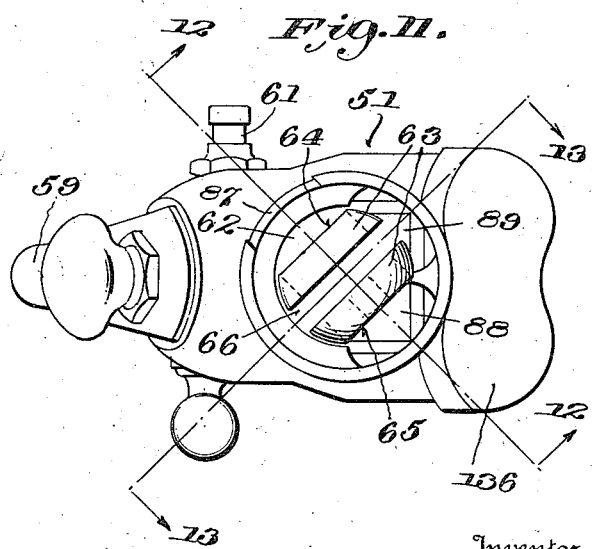

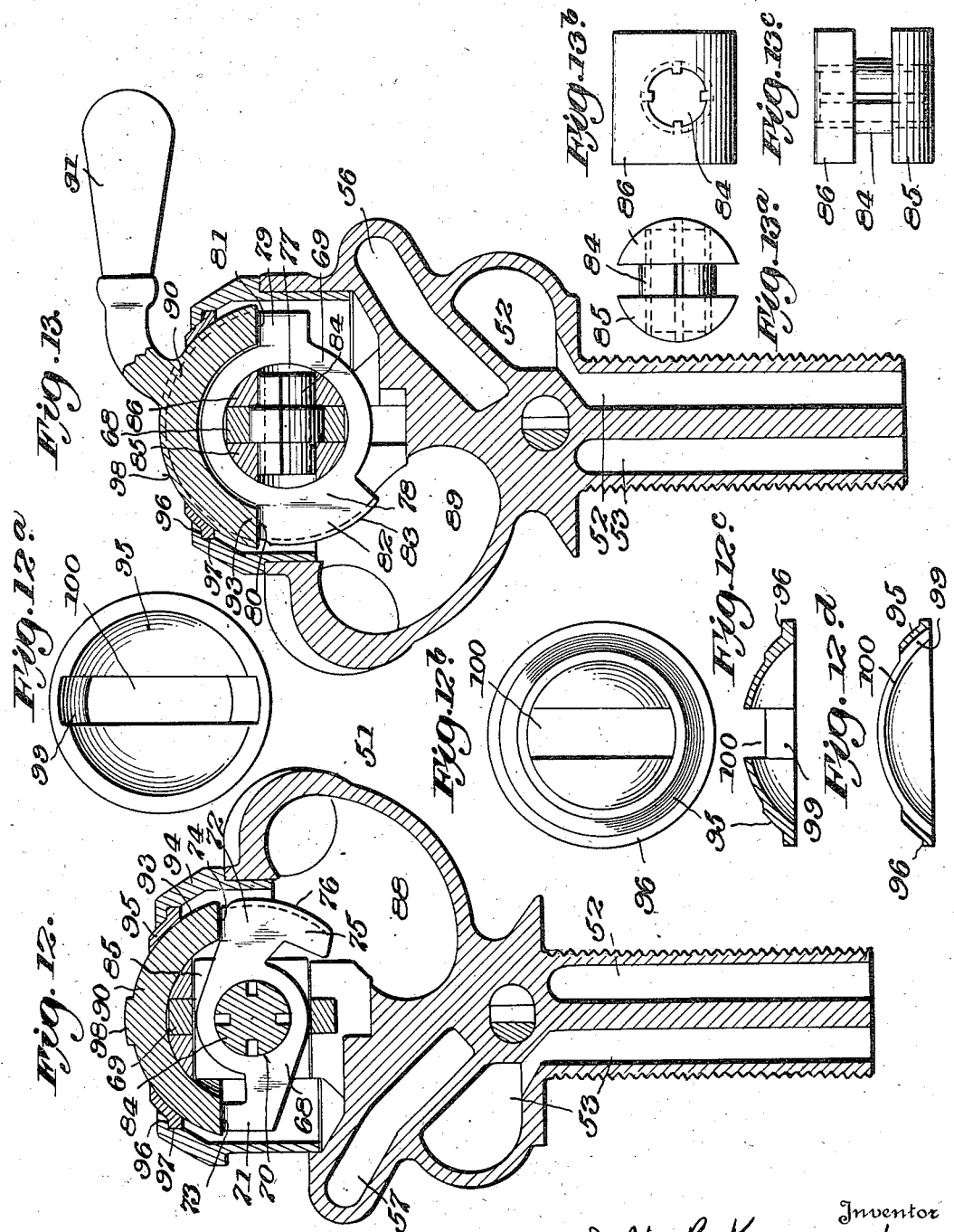

March 17, 1936. J. B. KRYZANOWSKY 2,033,941
VALVE
Filed Sept. 18, 1926 34 Sheets-Sheet 6
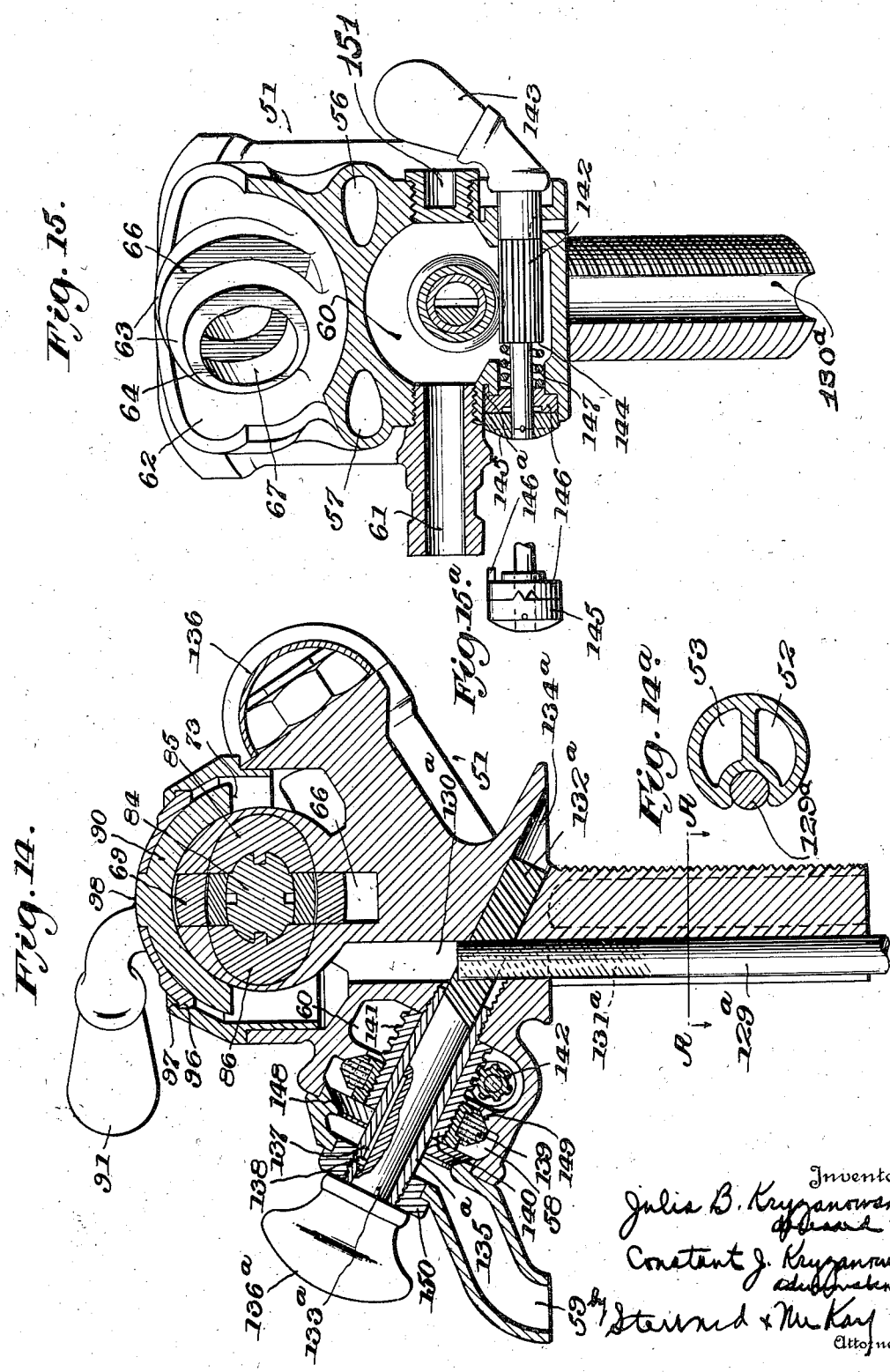

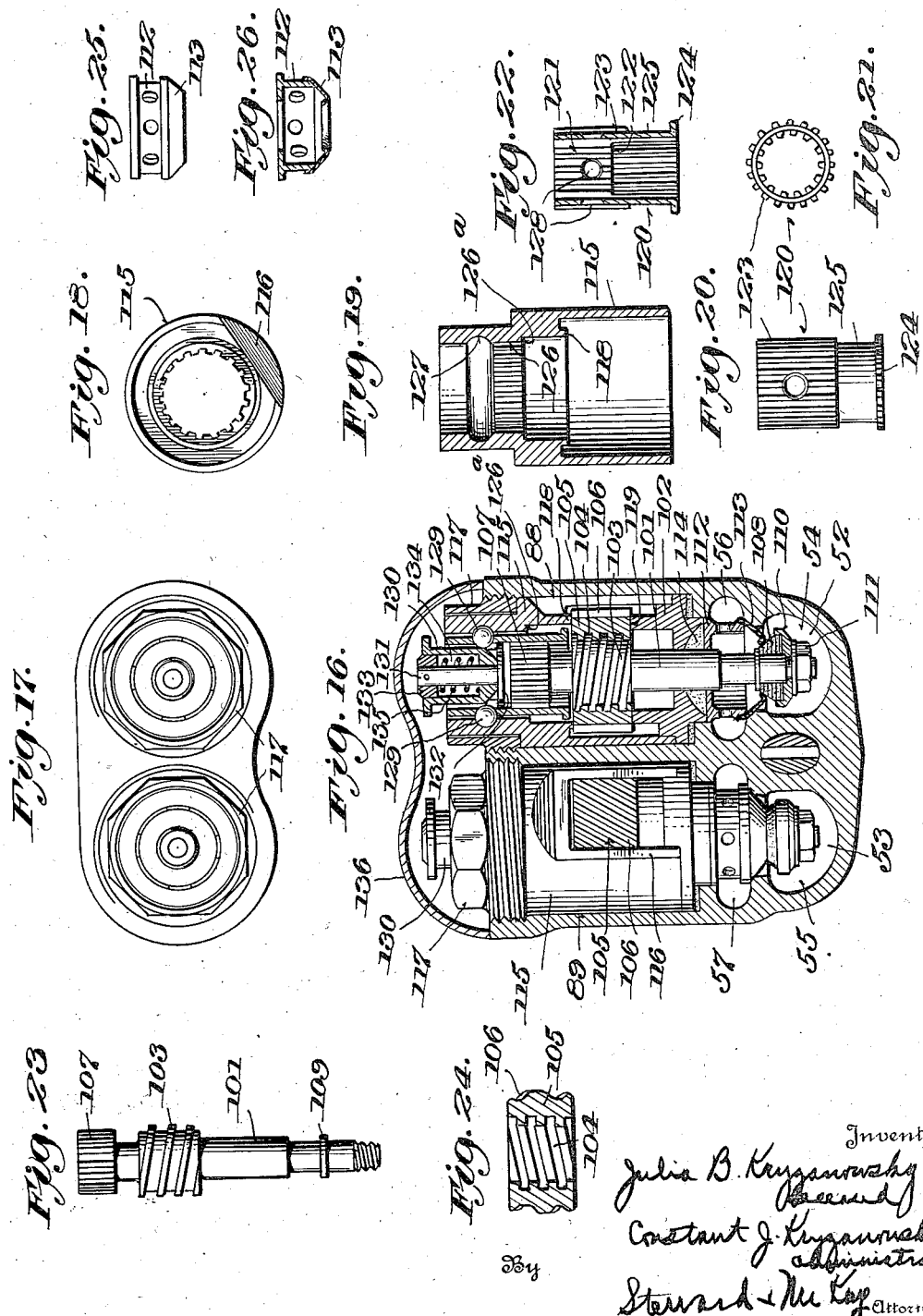

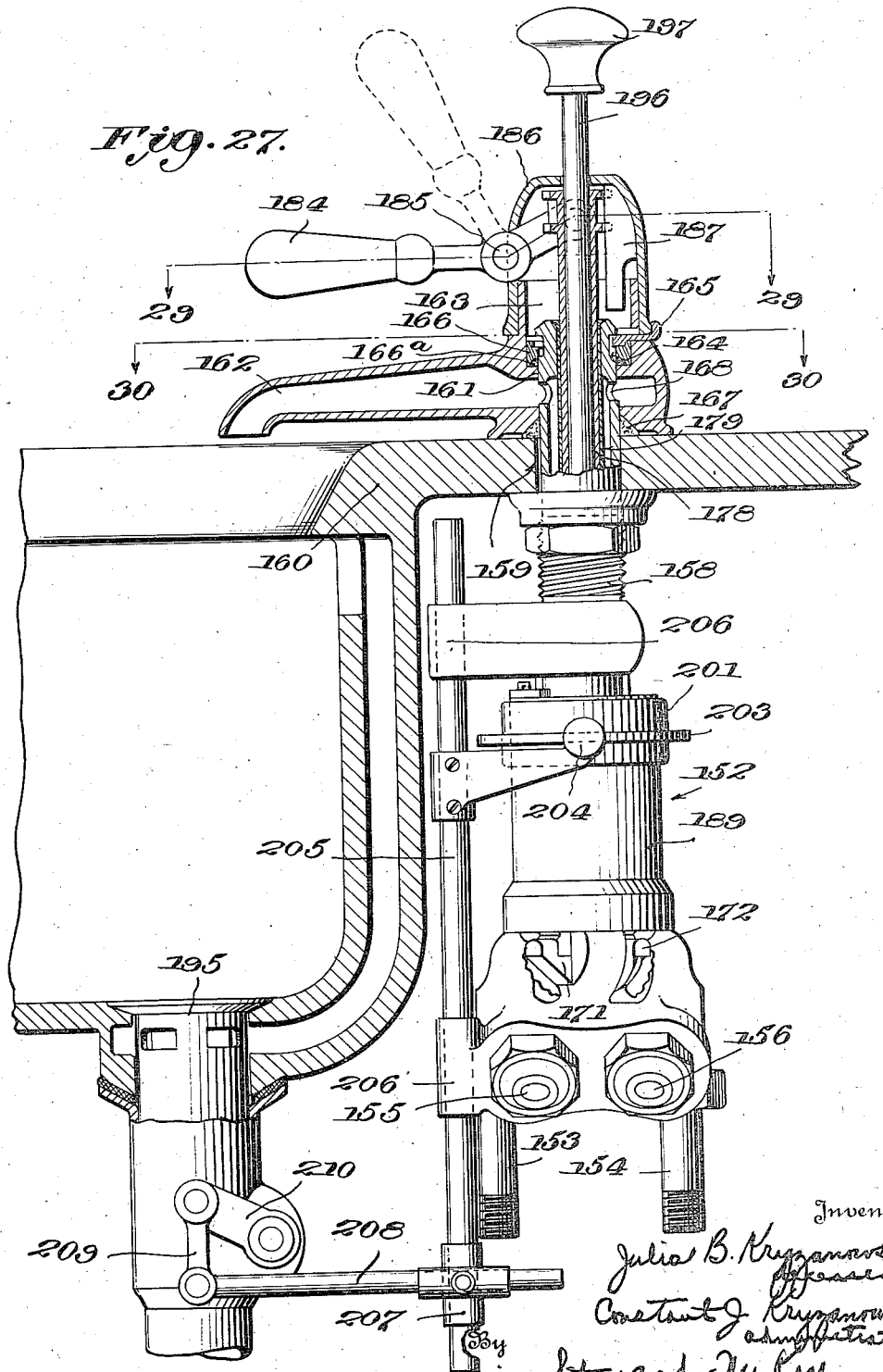

March 17, 1936. J. B. KRYZANOWSKY 2,033,941
VALVE
Filed Sept. 18, 1926 34 Sheets-Sheet 9
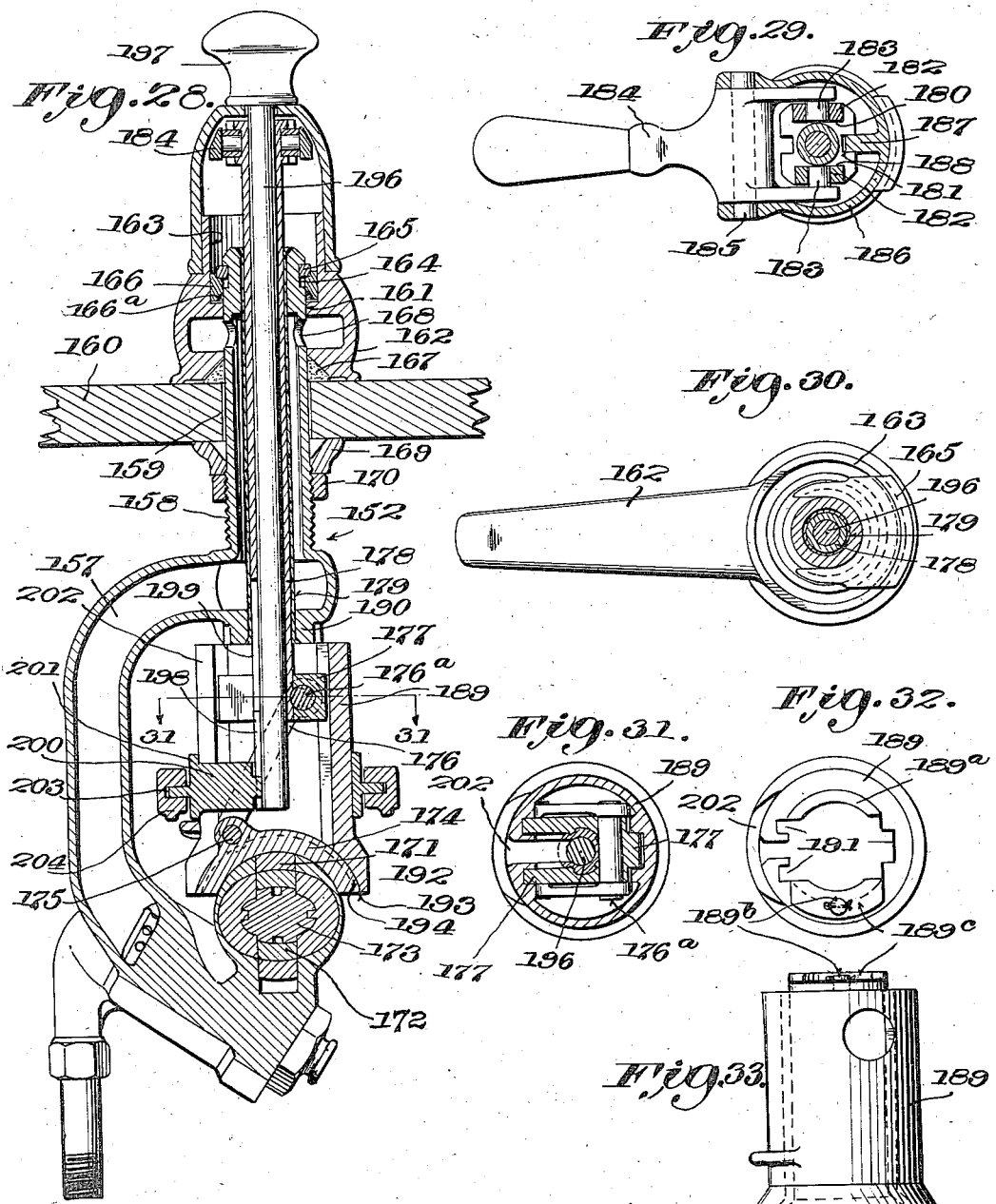

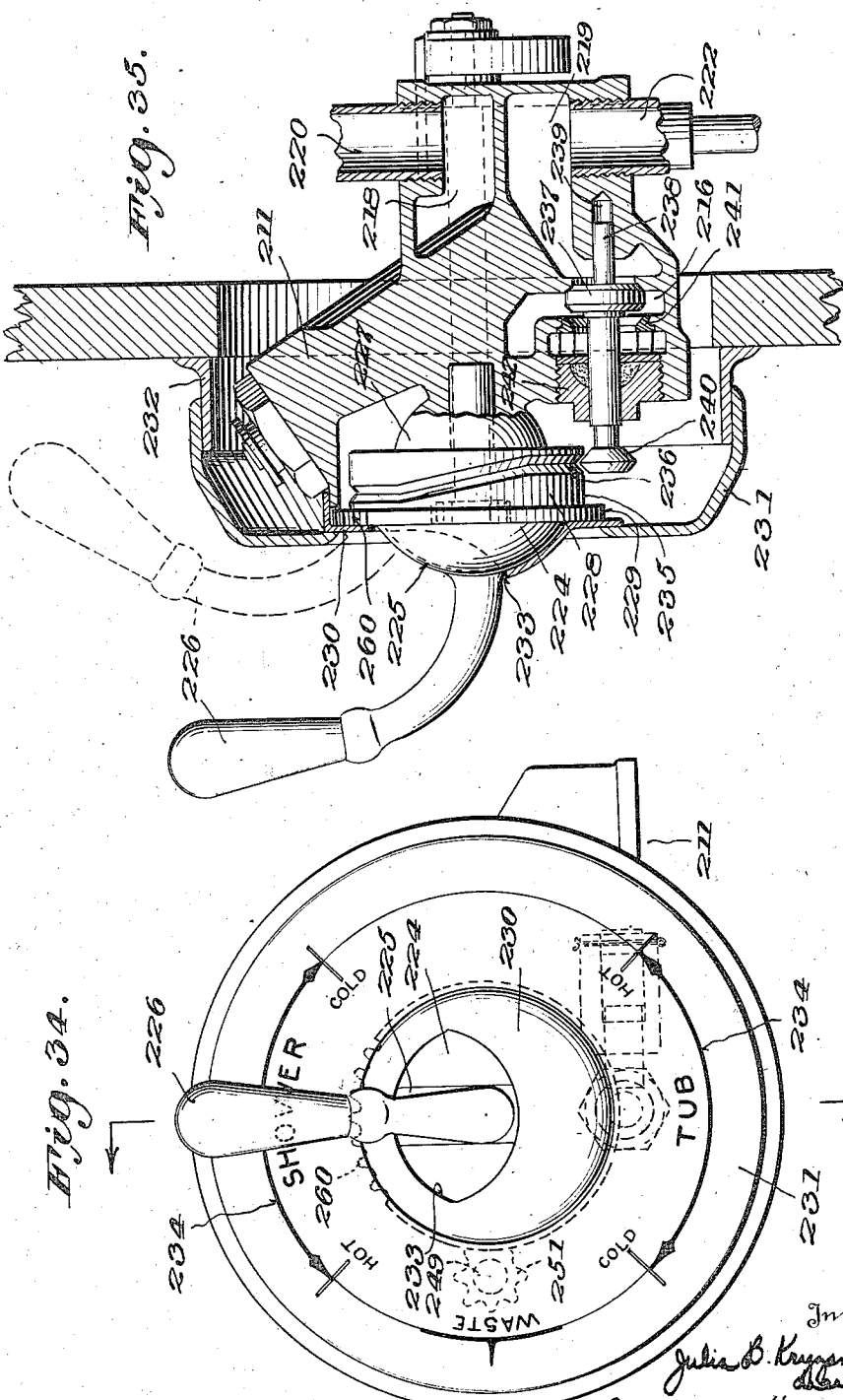

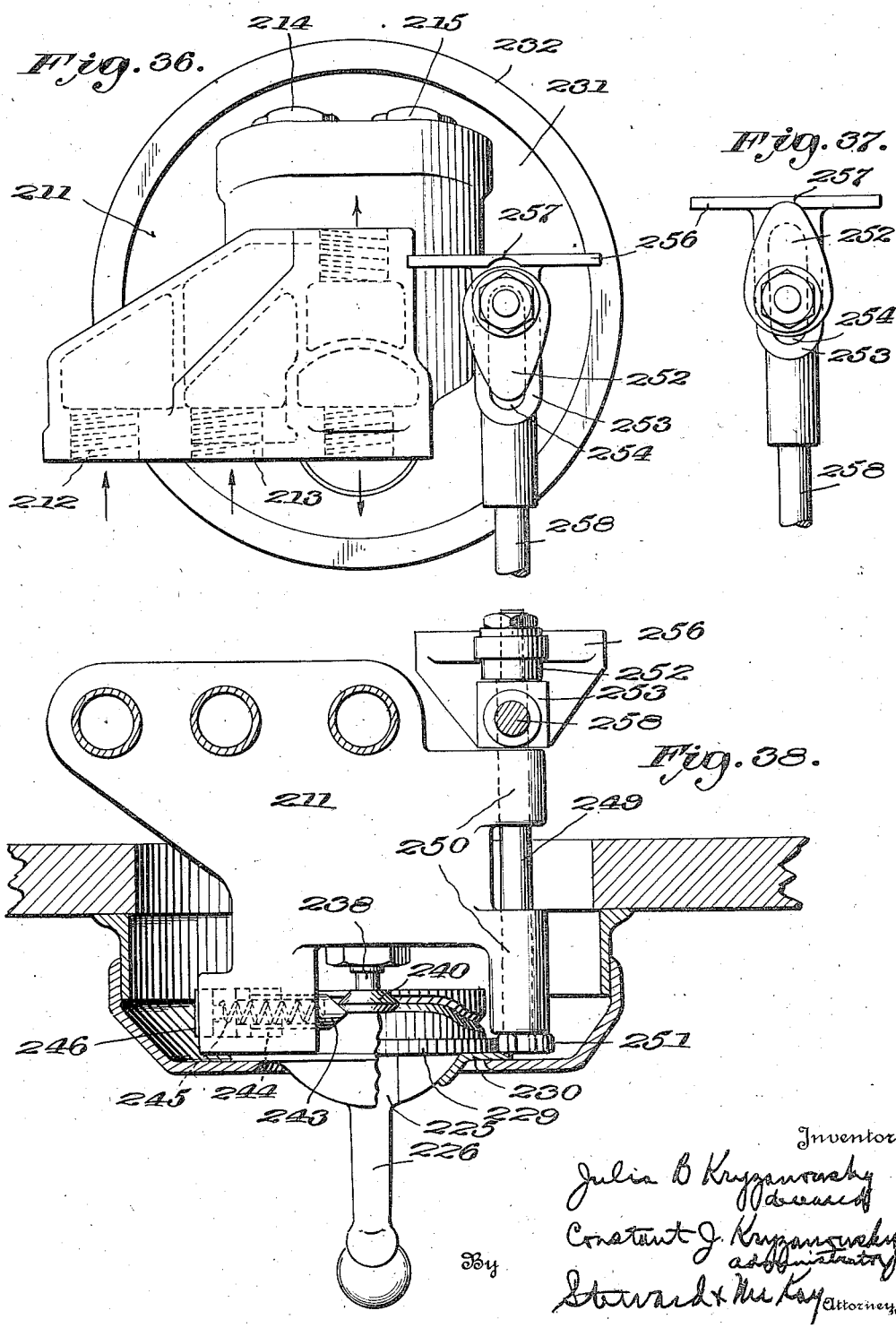

March 17, 1936.  J. B. KRYZANOWSKY  2,033,941
VALVE
Filed Sept. 18, 1926  34 Sheets-Sheet 12

March 17, 1936.  J. B. KRYZANOWSKY  2,033,941
VALVE
Filed Sept. 18, 1926    34 Sheets-Sheet 13
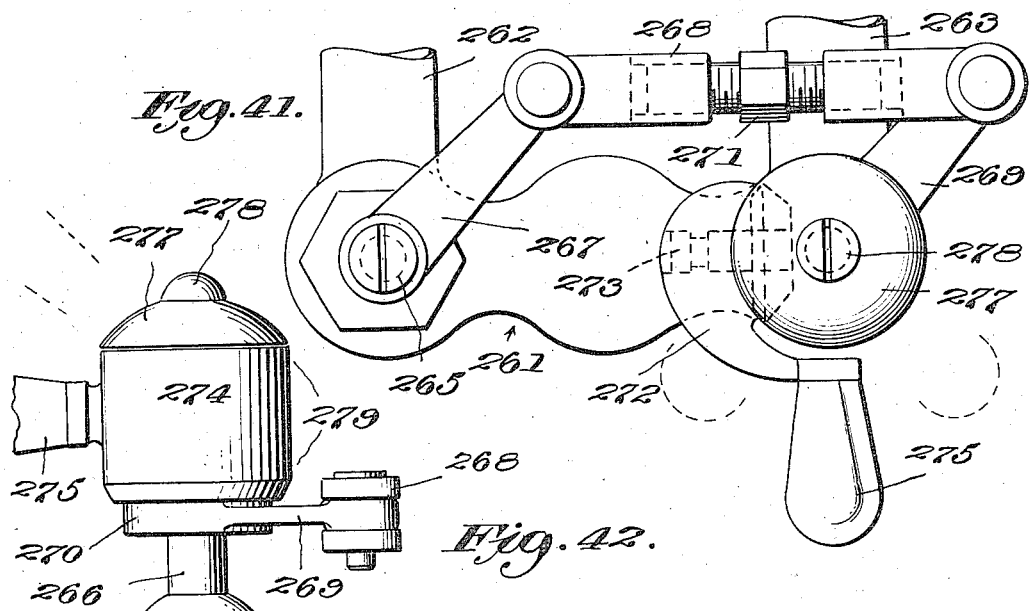
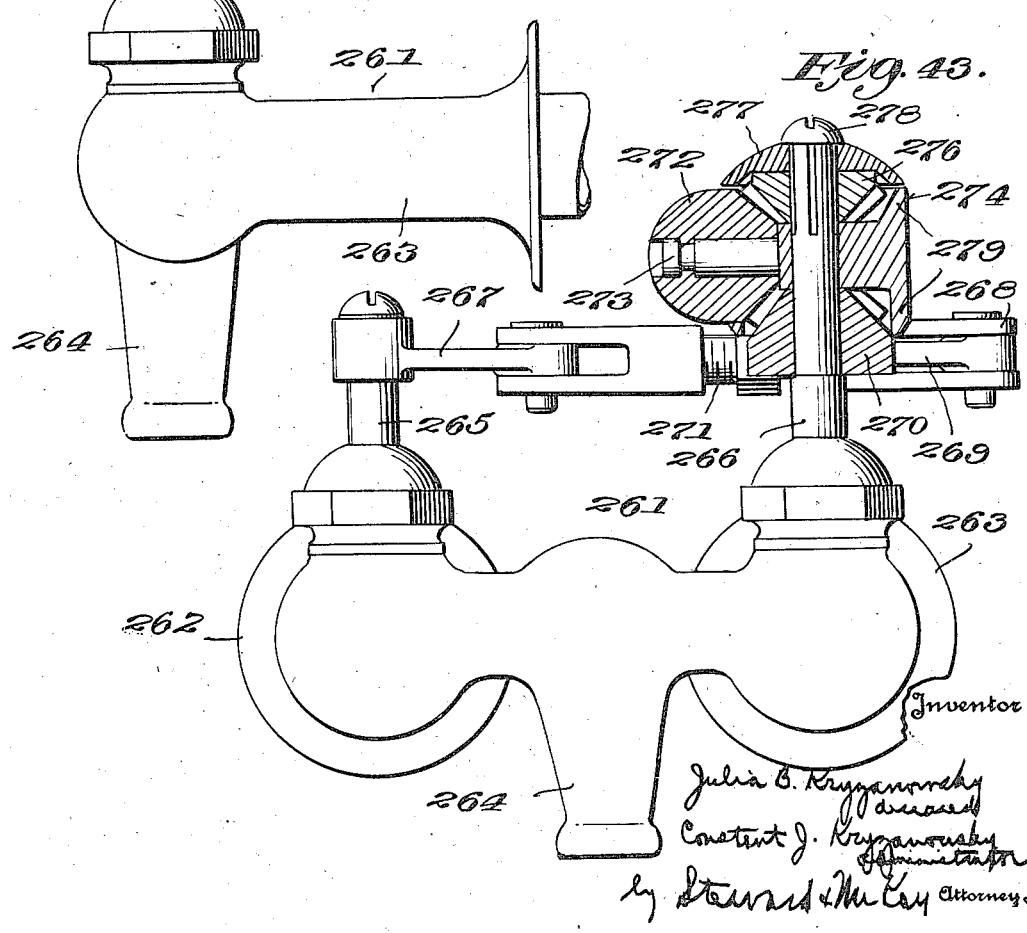

March 17, 1936. J. B. KRYZANOWSKY 2,033,941
VALVE
Filed Sept. 18, 1926 34 Sheets-Sheet 14
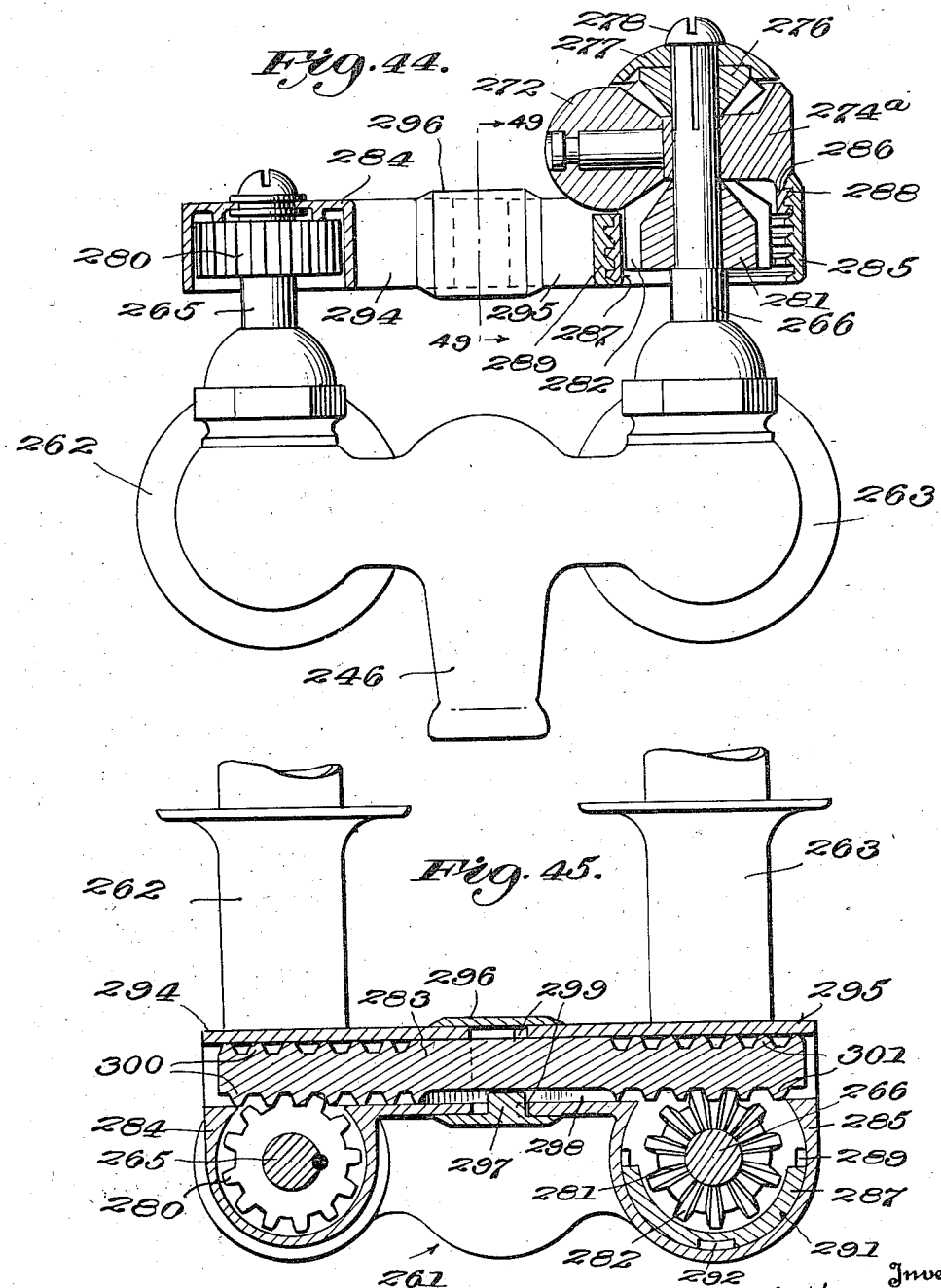

March 17, 1936. J. B. KRYZANOWSKY 2,033,941
VALVE
Filed Sept. 18, 1926  34 Sheets-Sheet 15
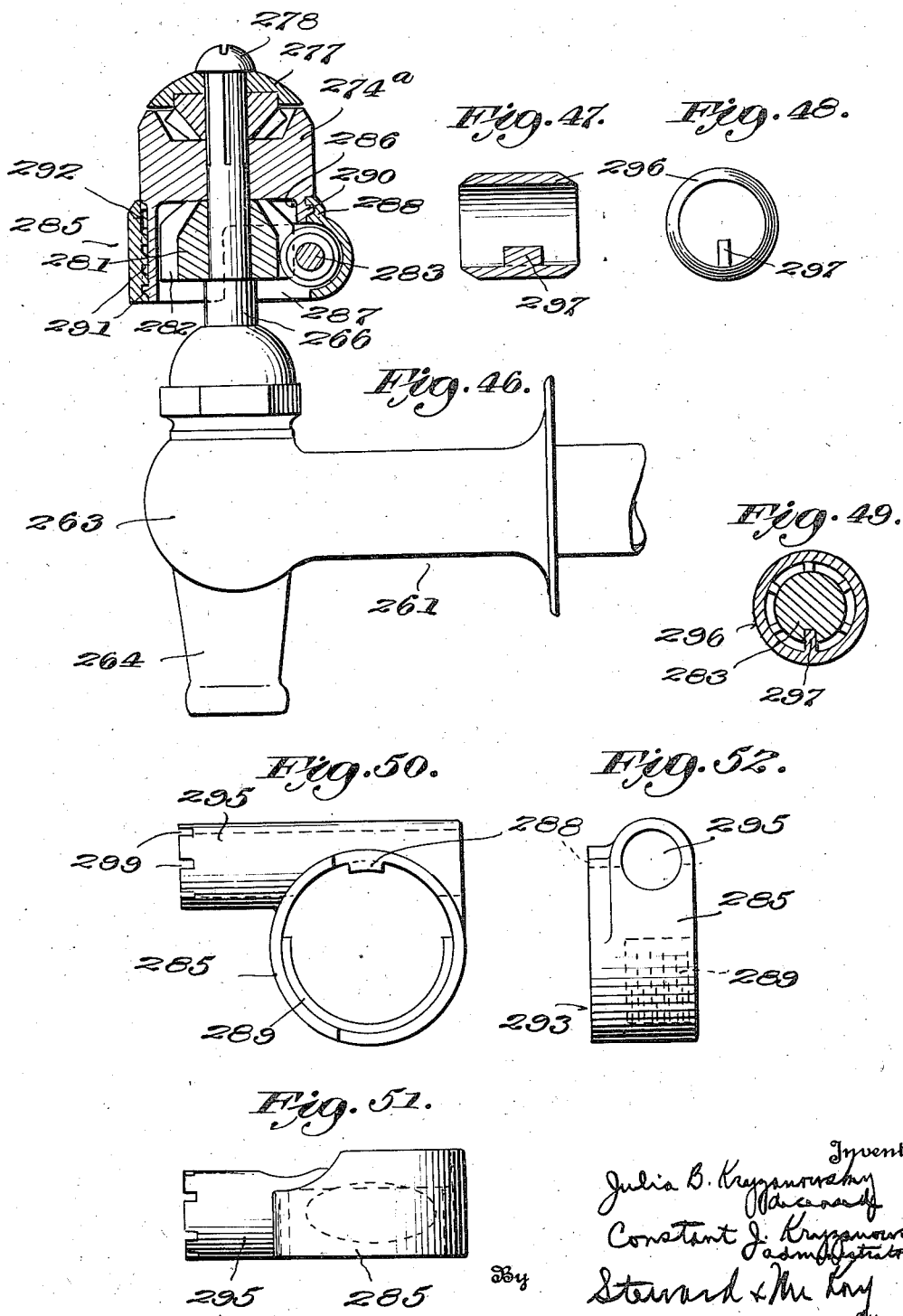

March 17, 1936. J. B. KRYZANOWSKY 2,033,941
VALVE
Filed Sept. 18, 1926 34 Sheets-Sheet 16
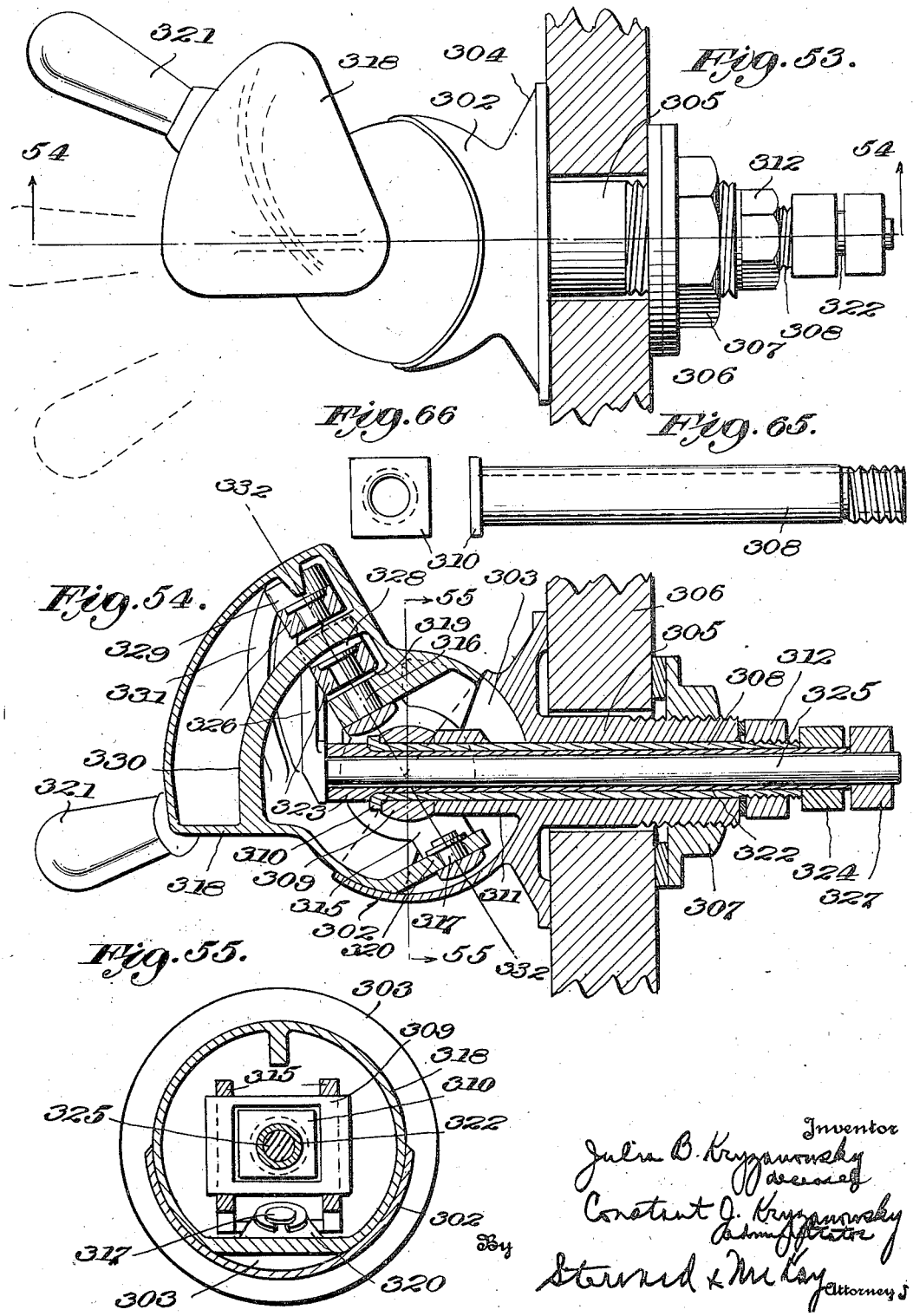

March 17, 1936. J. B. KRYZANOWSKY 2,033,941
VALVE
Filed Sept. 18, 1926 34 Sheets-Sheet 17
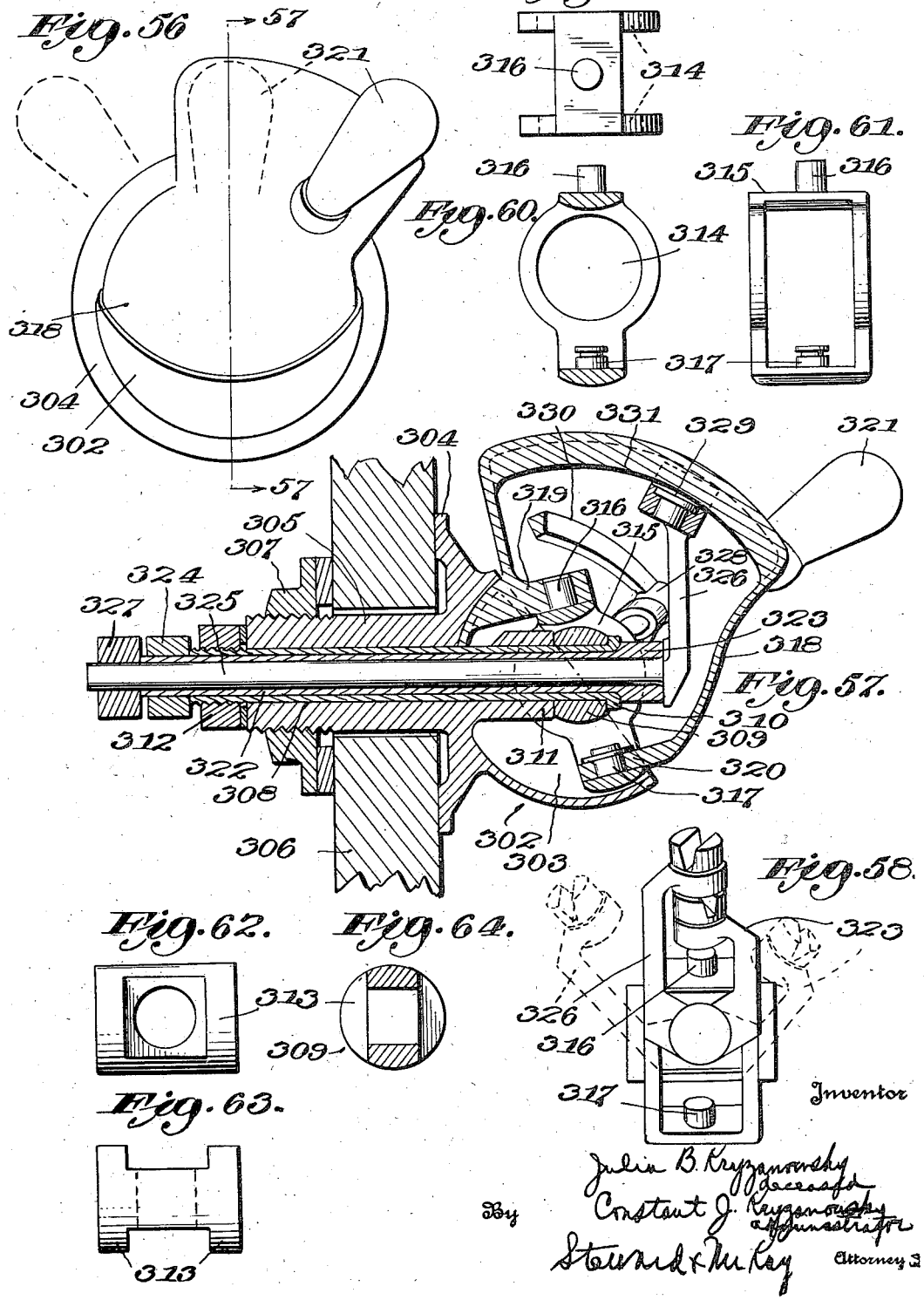

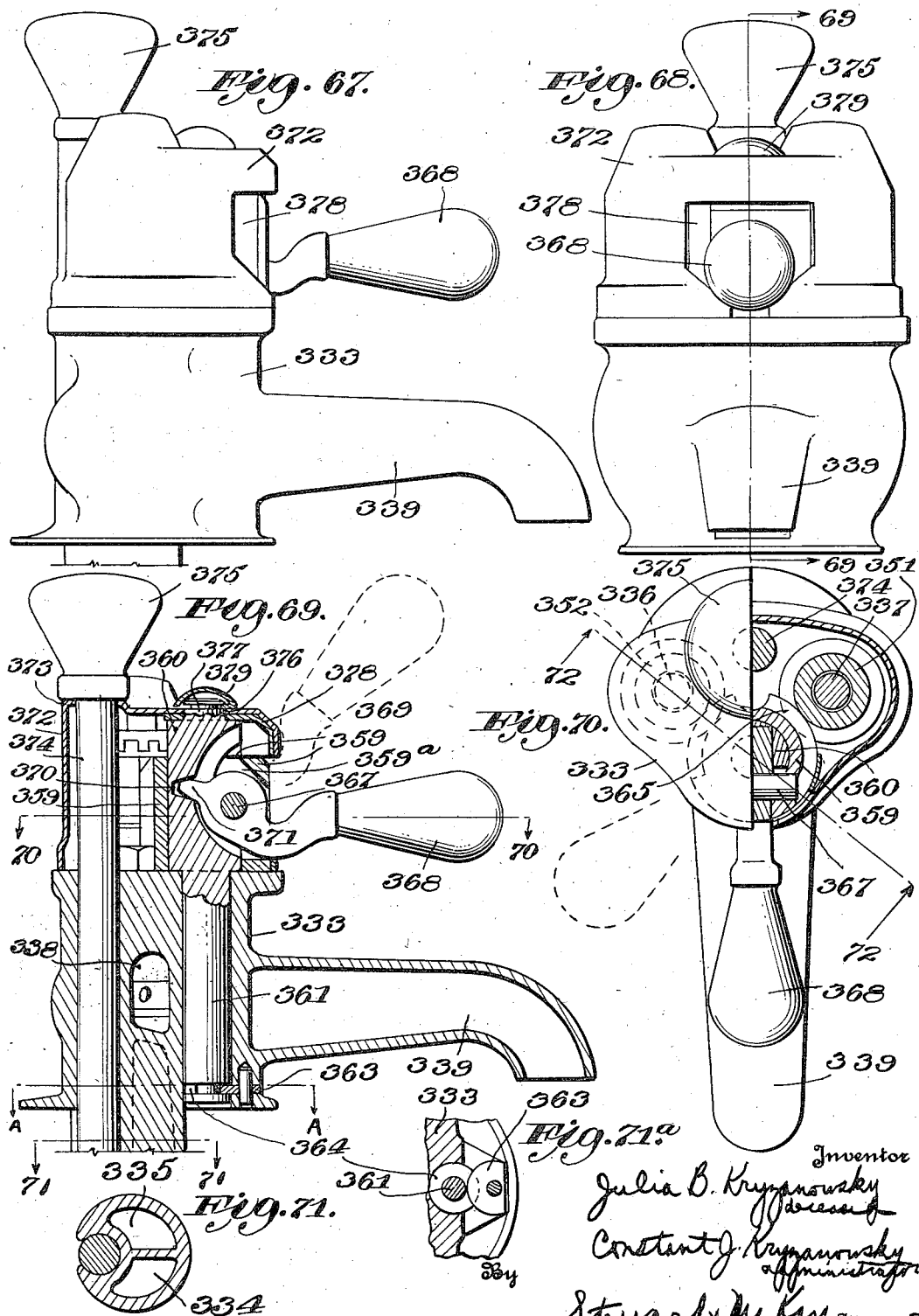

March 17, 1936. J. B. KRYZANOWSKY 2,033,941
VALVE
Filed Sept. 18, 1926 34 Sheets-Sheet 19
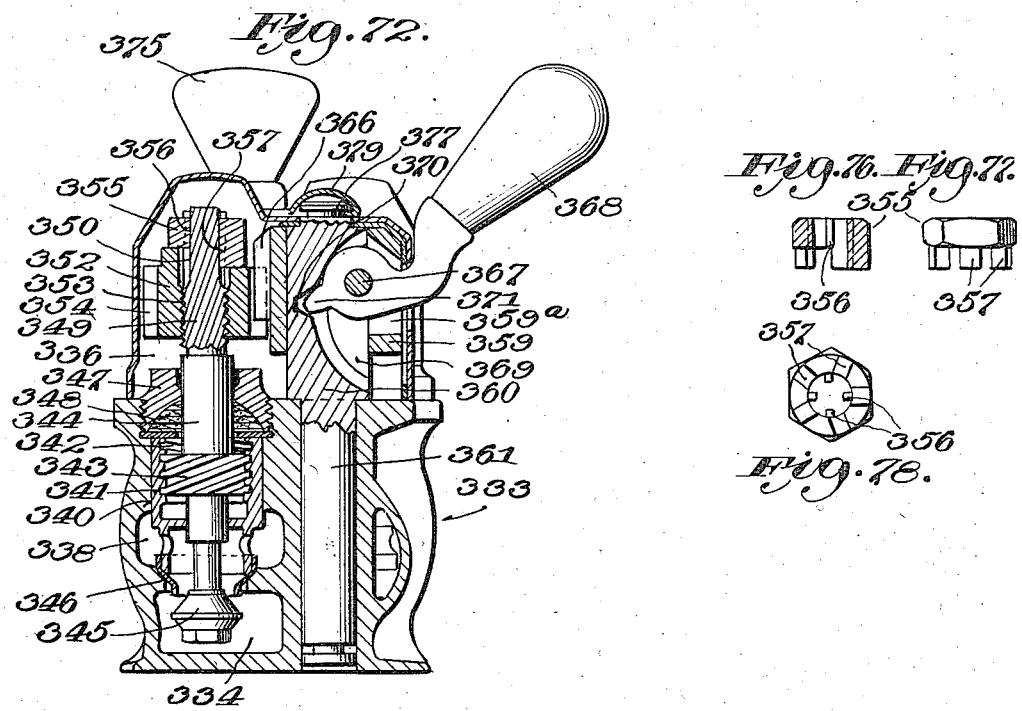
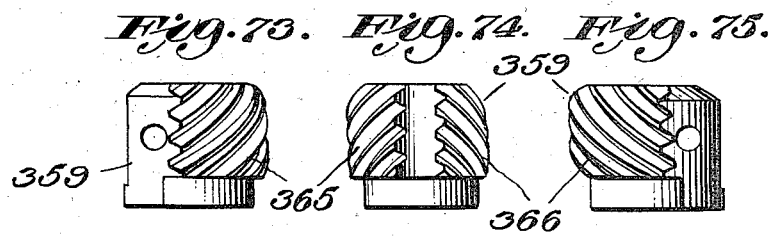

March 17, 1936.  J. B. KRYZANOWSKY  2,033,941
VALVE
Filed Sept. 18, 1926  34 Sheets-Sheet 20
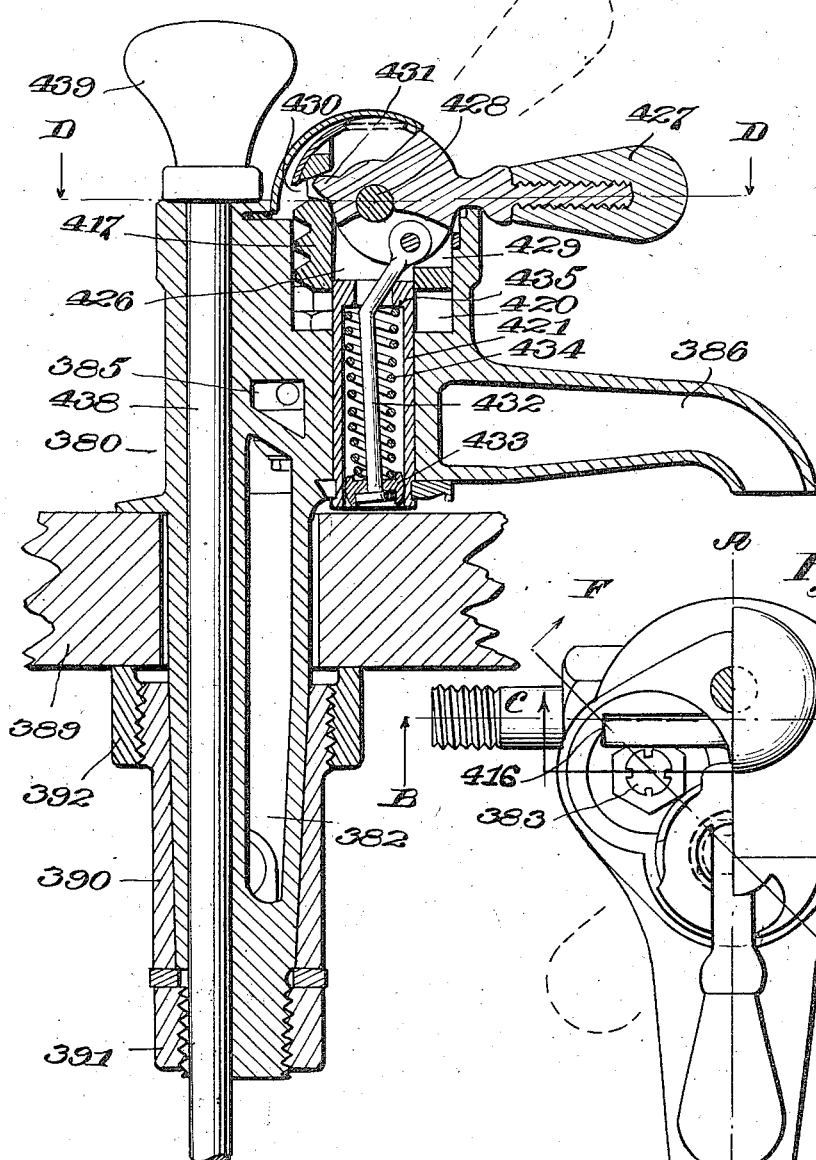
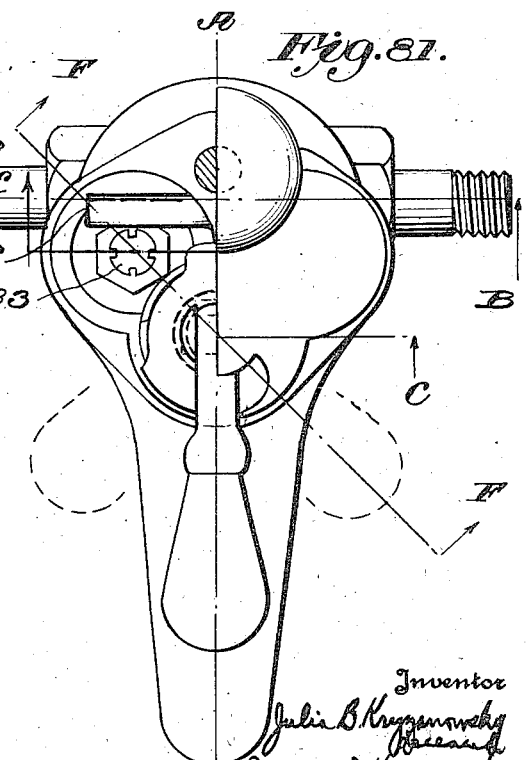

March 17, 1936. J. B. KRYZANOWSKY 2,033,941
VALVE
Filed Sept. 18, 1926 34 Sheets-Sheet 21
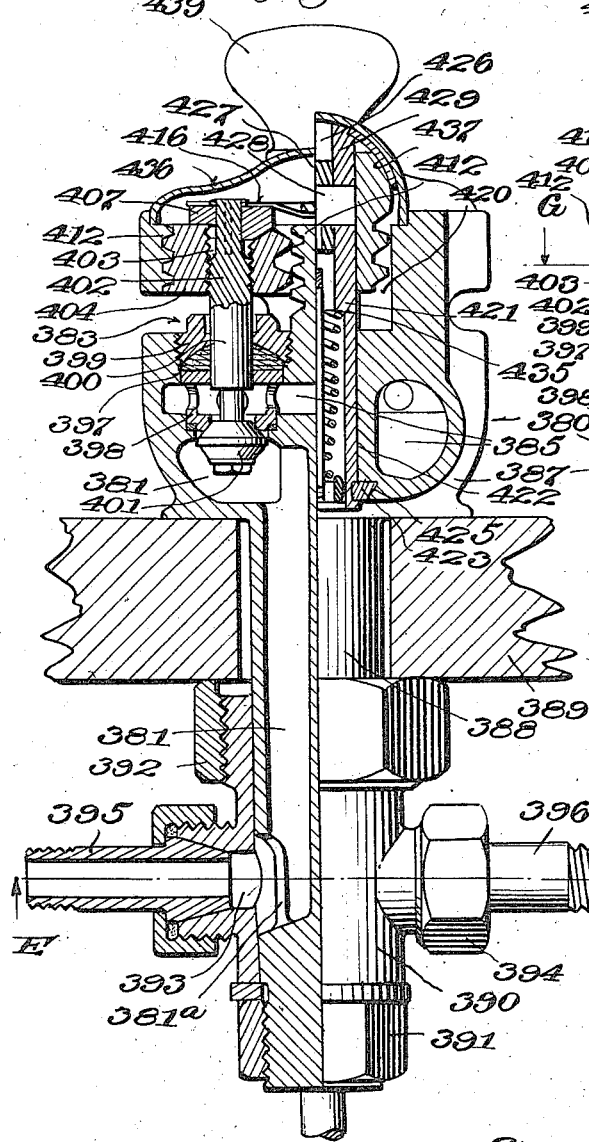
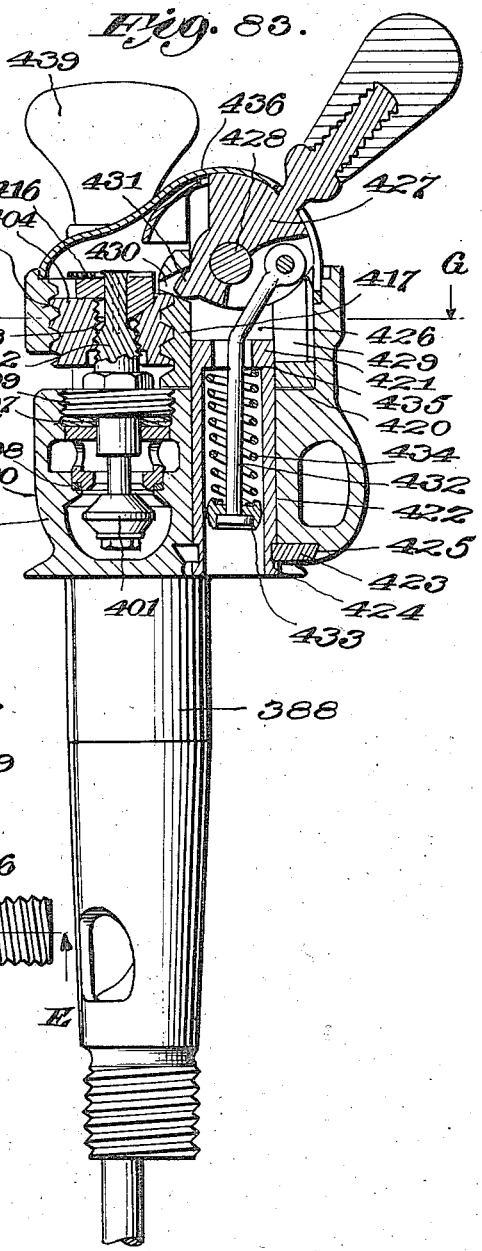
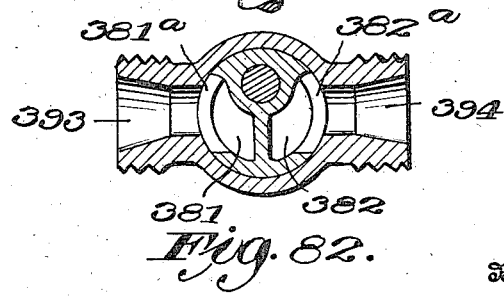

March 17, 1936. J. B. KRYZANOWSKY 2,033,941
VALVE
Filed Sept. 18, 1926 34 Sheets-Sheet 22
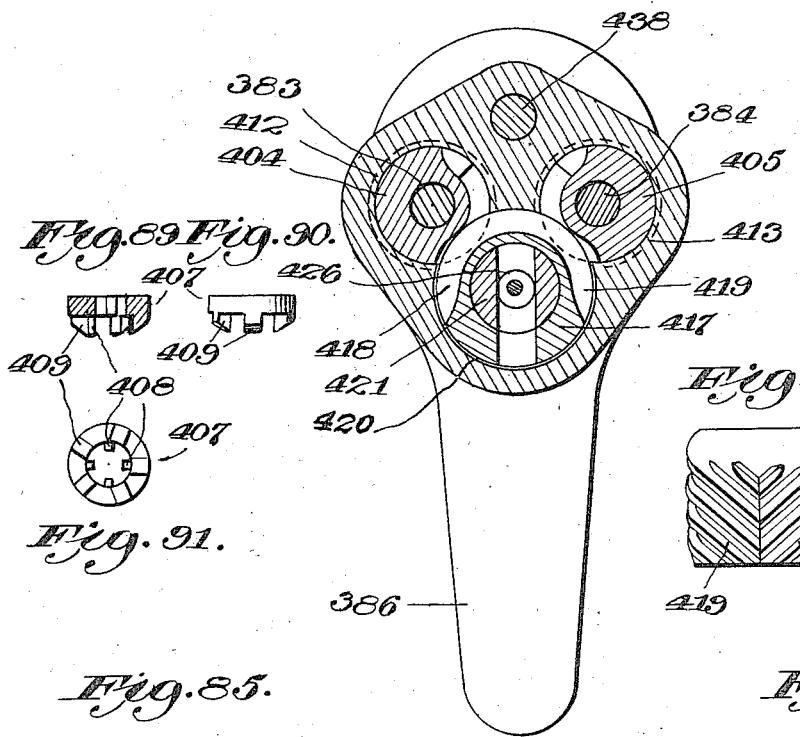
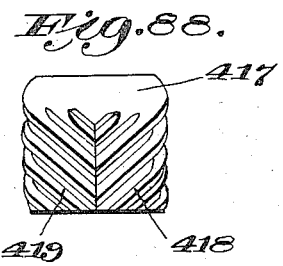
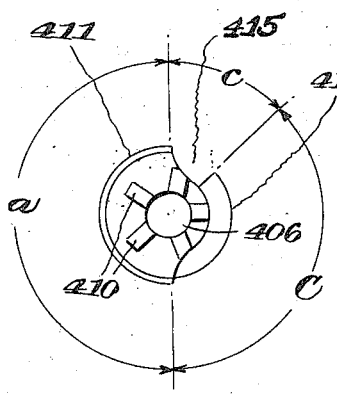
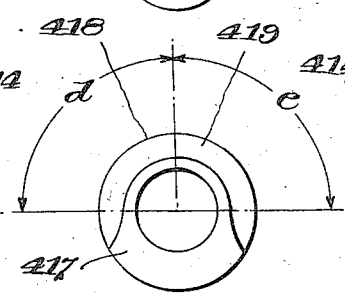

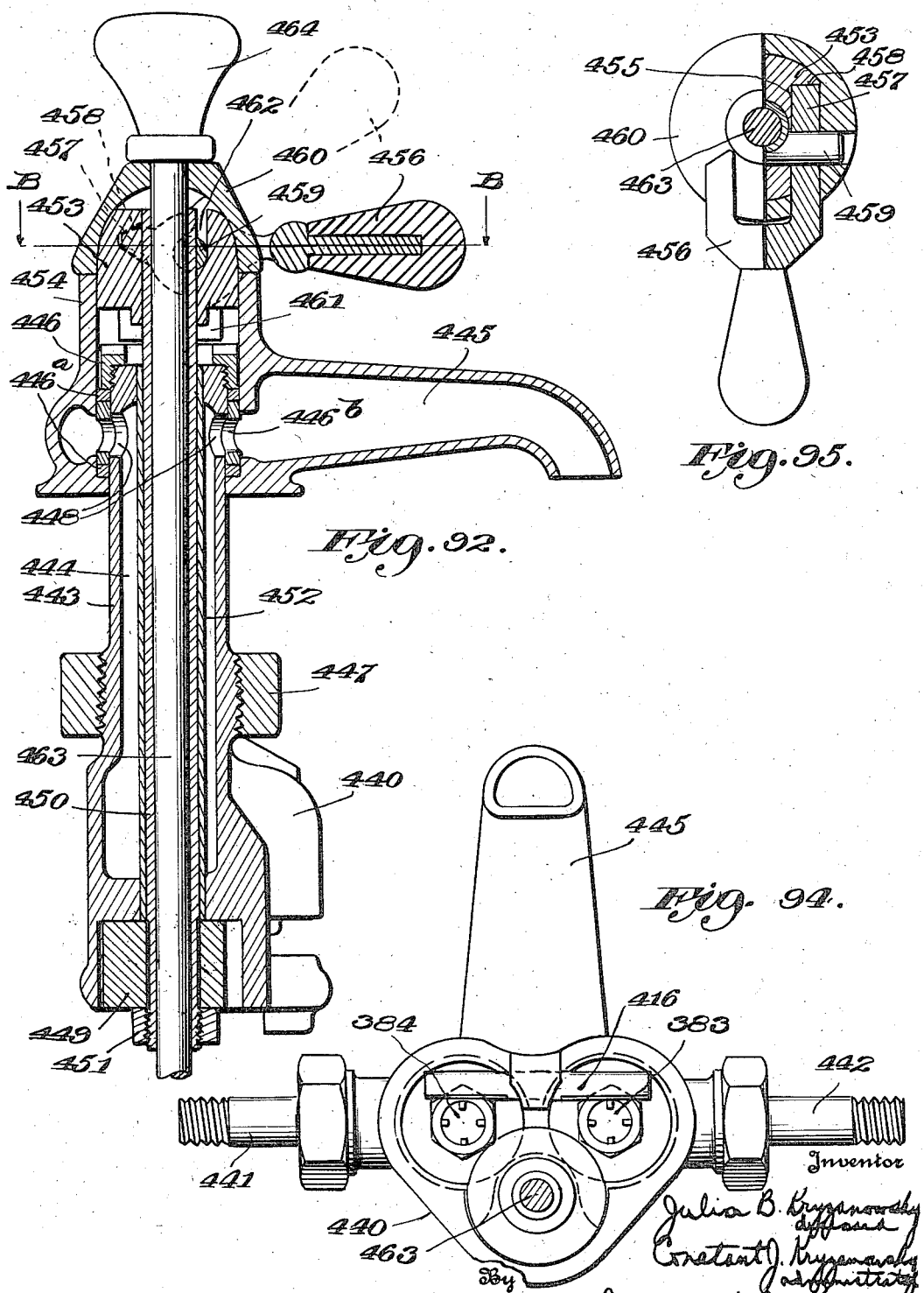

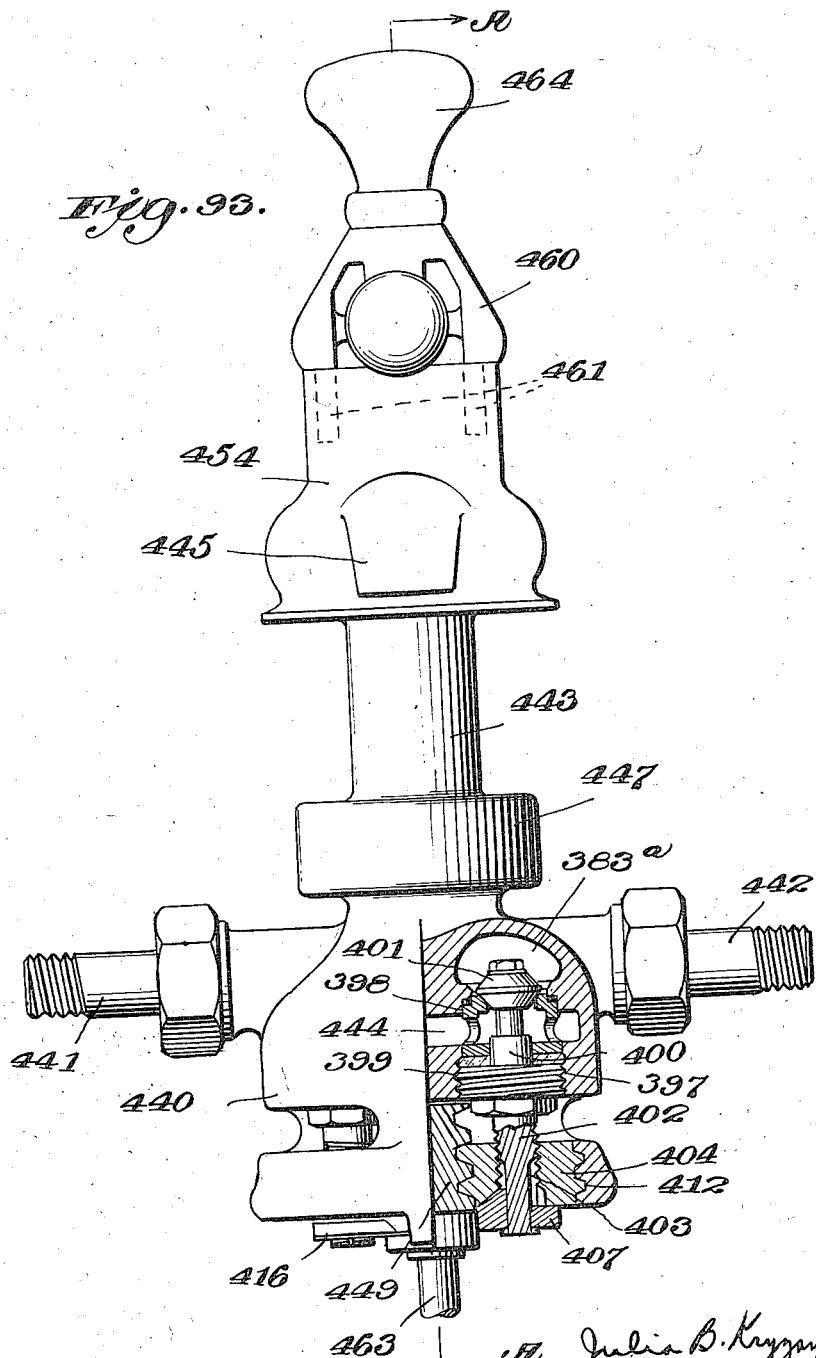

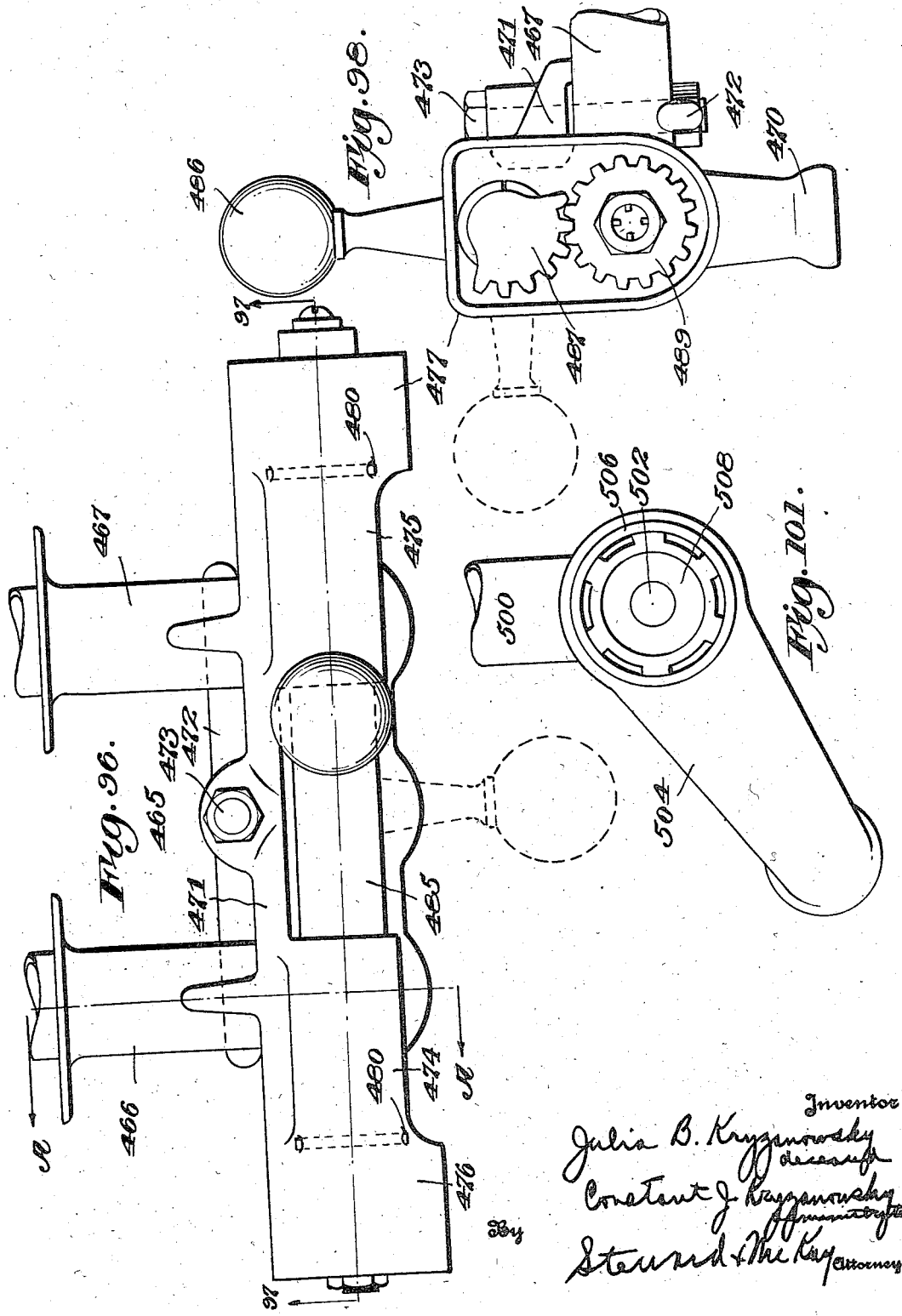

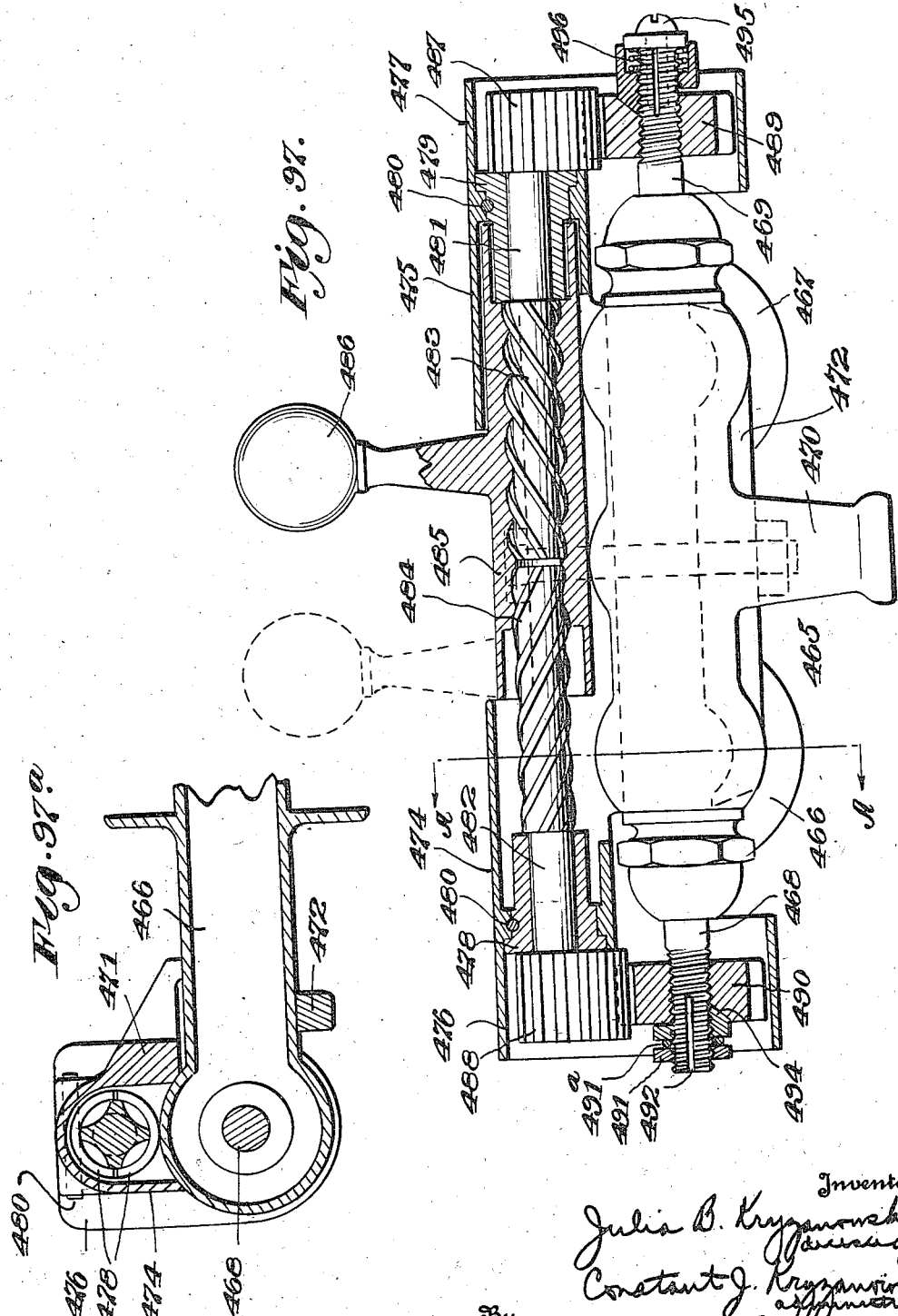

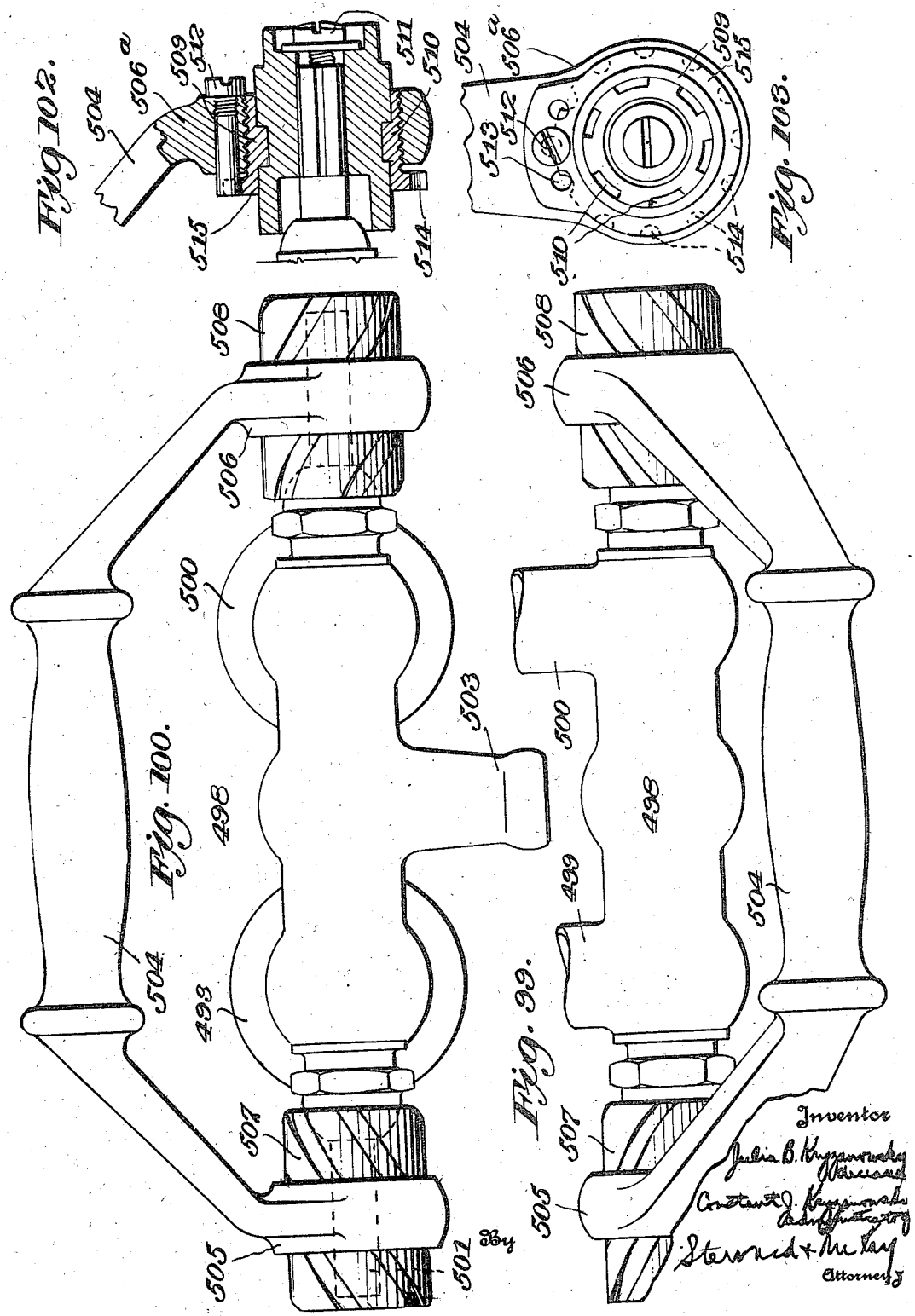

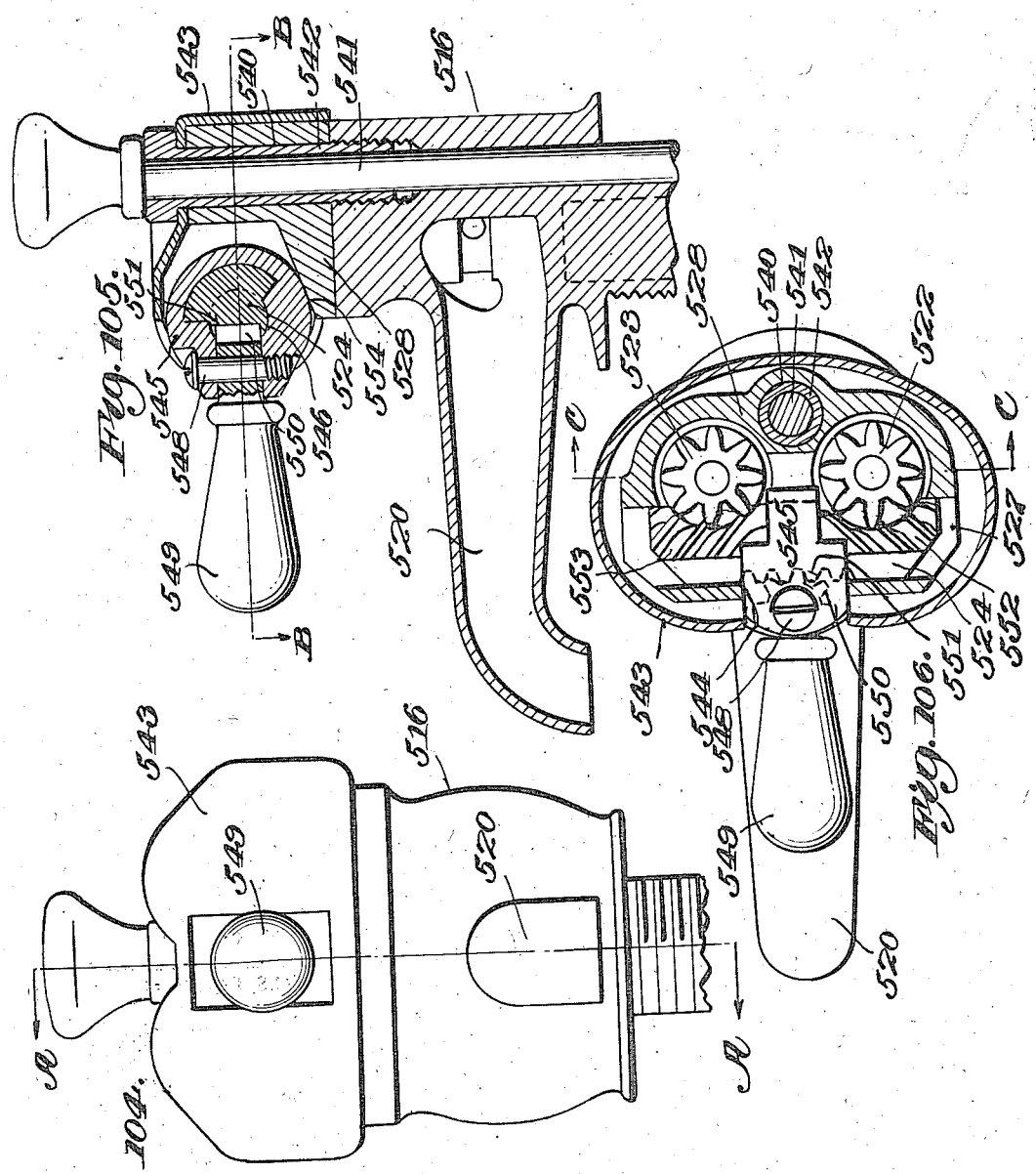

March 17, 1936.     J. B. KRYZANOWSKY     2,033,941
VALVE
Filed Sept. 18, 1926      34 Sheets-Sheet 29
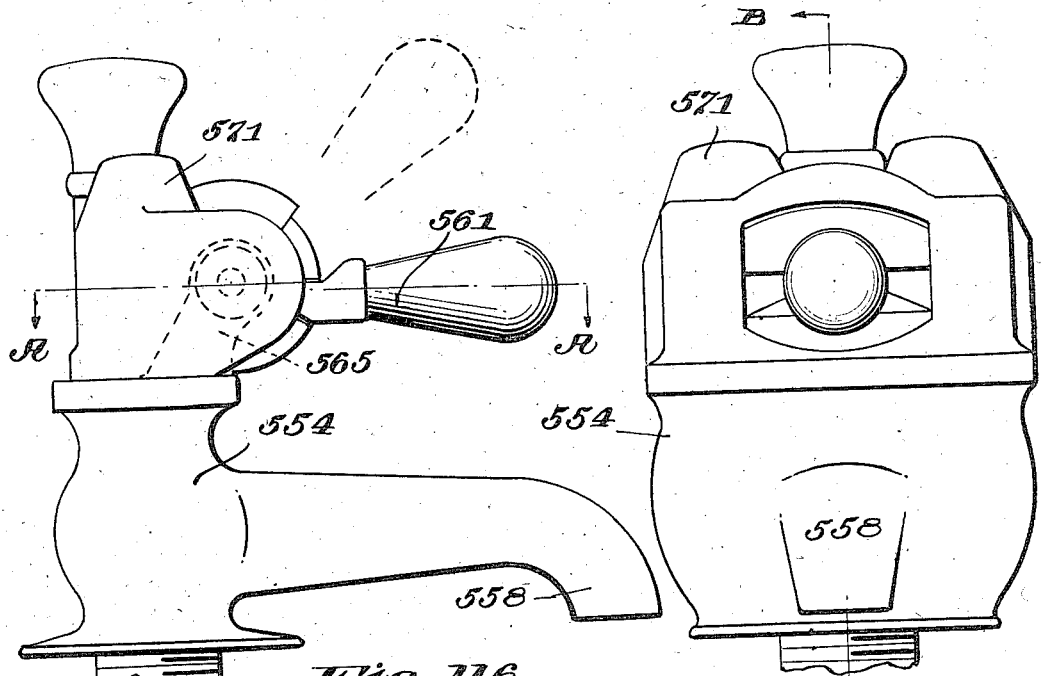
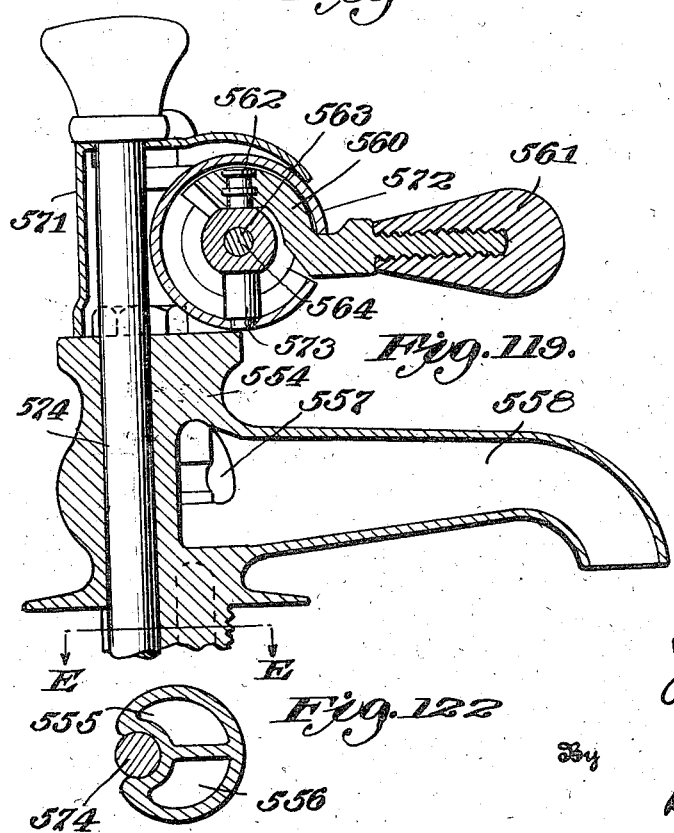

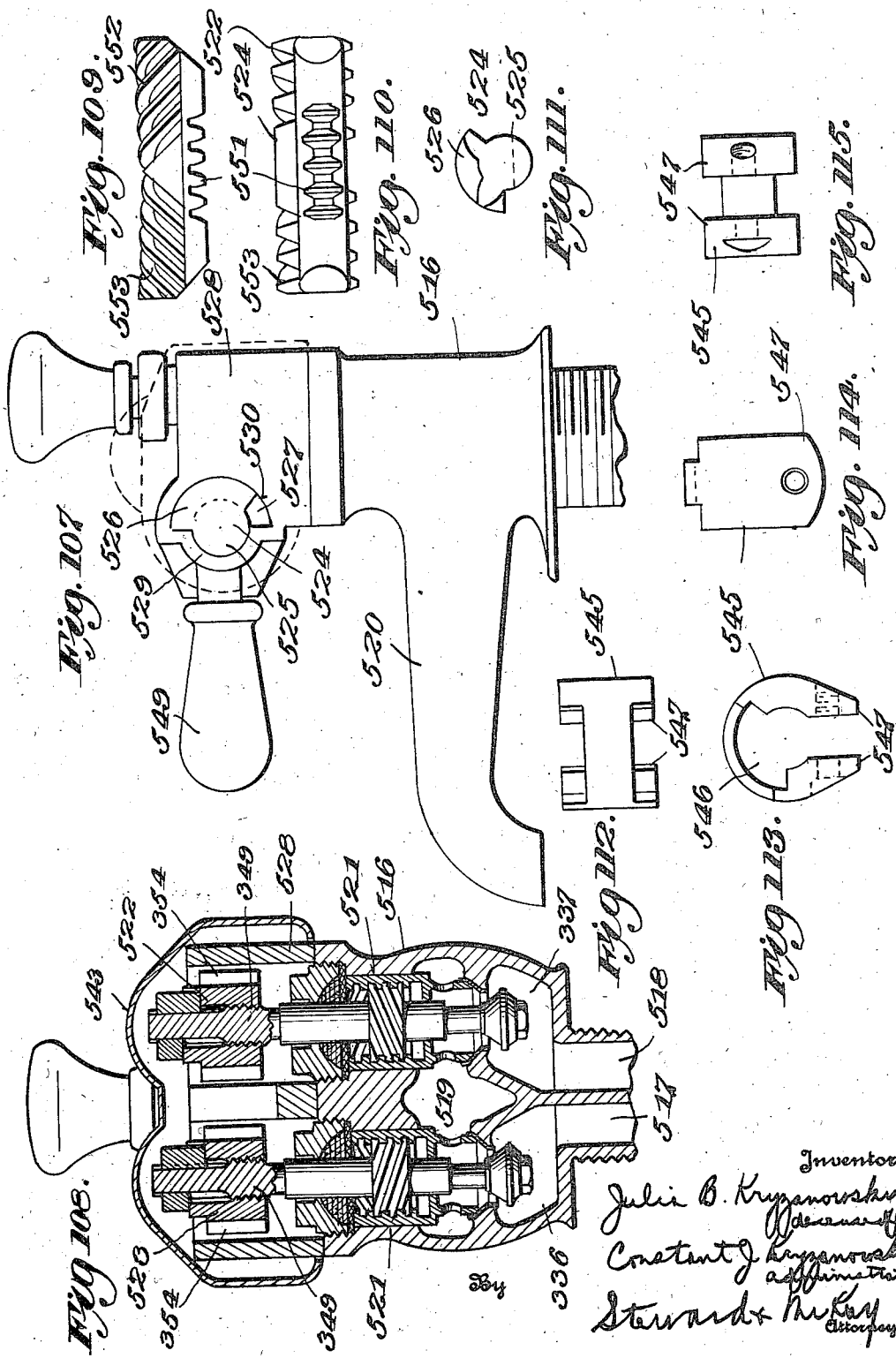

March 17, 1936. J. B. KRYZANOWSKY 2,033,941
VALVE
Filed Sept. 18, 1926 34 Sheets-Sheet 31
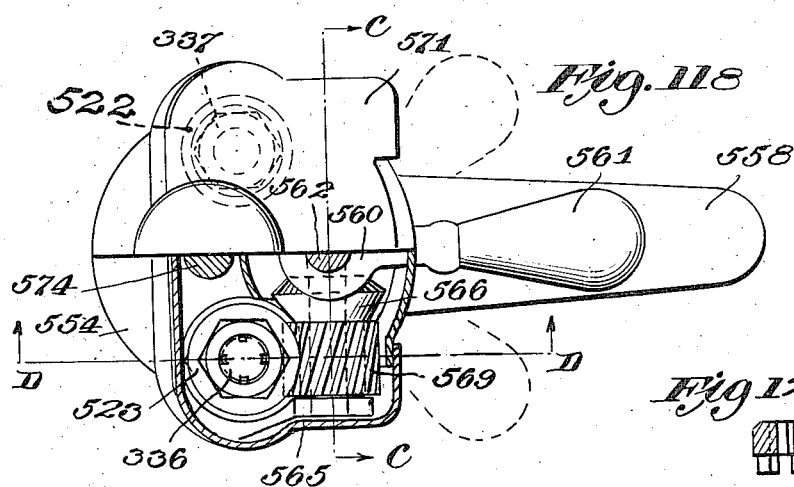
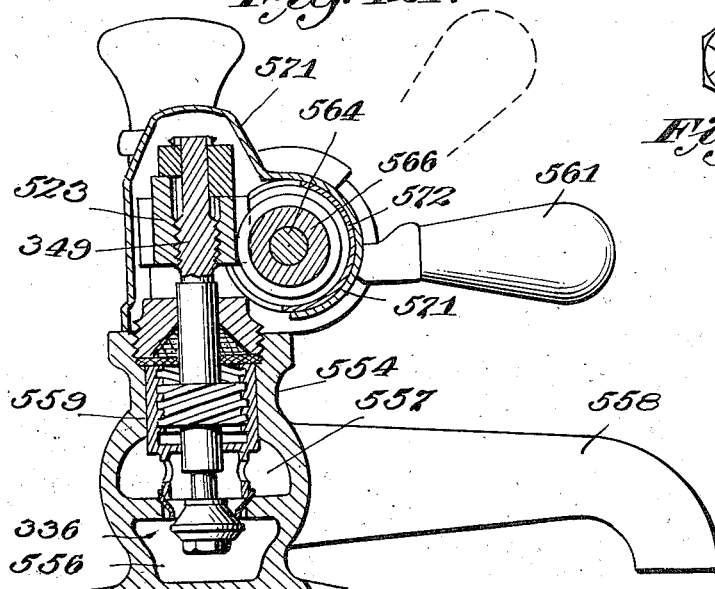
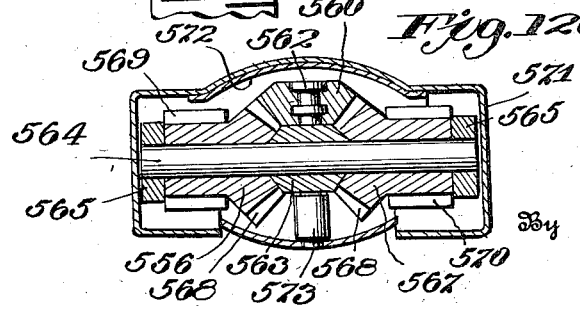

March 17, 1936.  J. B. KRYZANOWSKY  2,033,941
VALVE
Filed Sept. 18, 1926  34 Sheets-Sheet 32
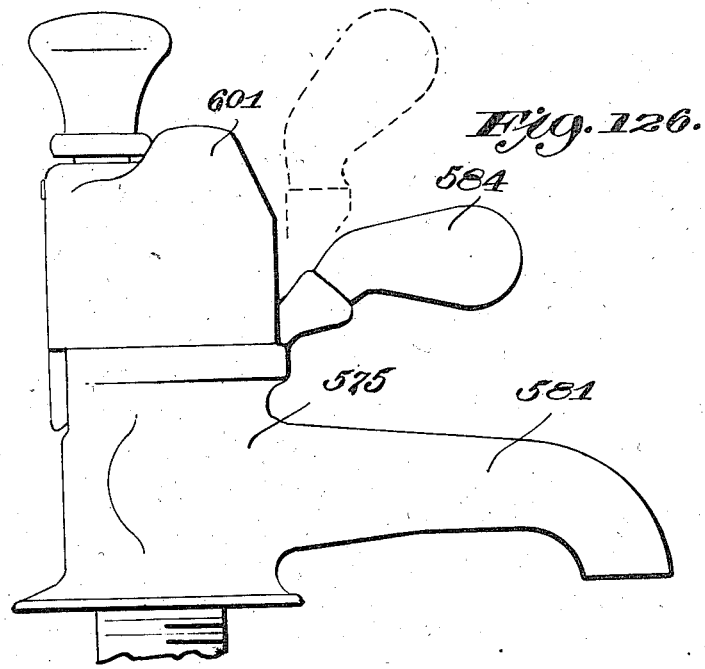
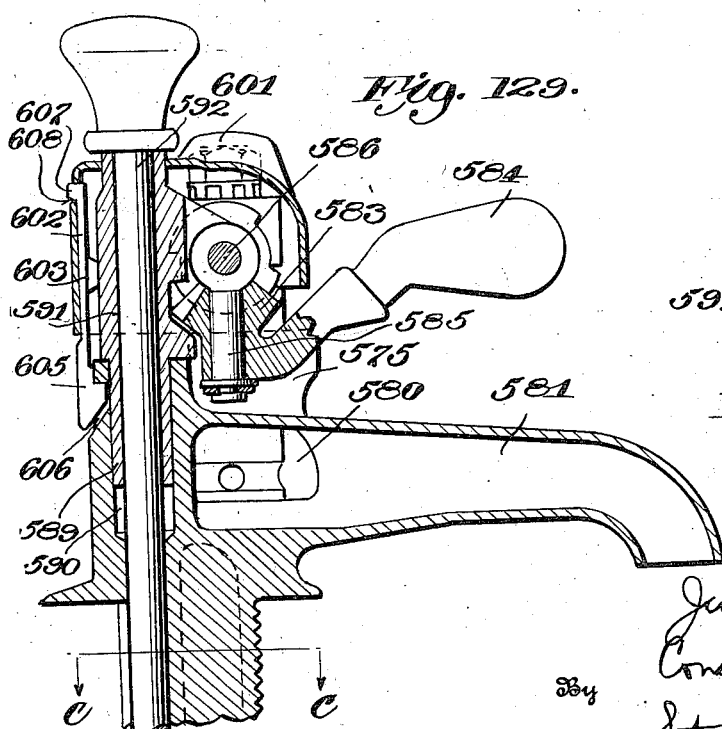
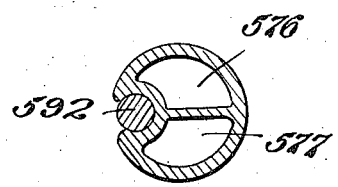

March 17, 1936.  J. B. KRYZANOWSKY  2,033,941
VALVE
Filed Sept. 18, 1926  34 Sheets-Sheet 33
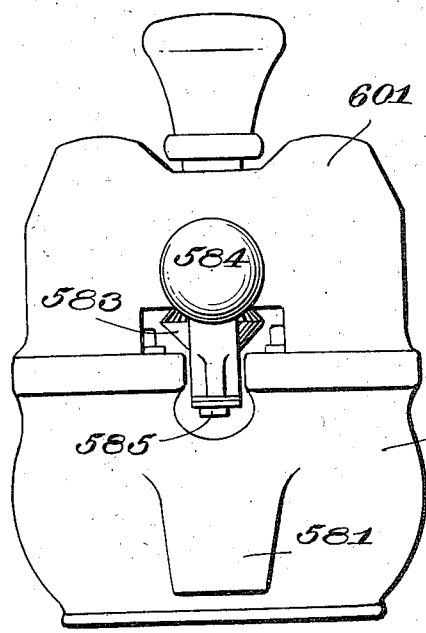
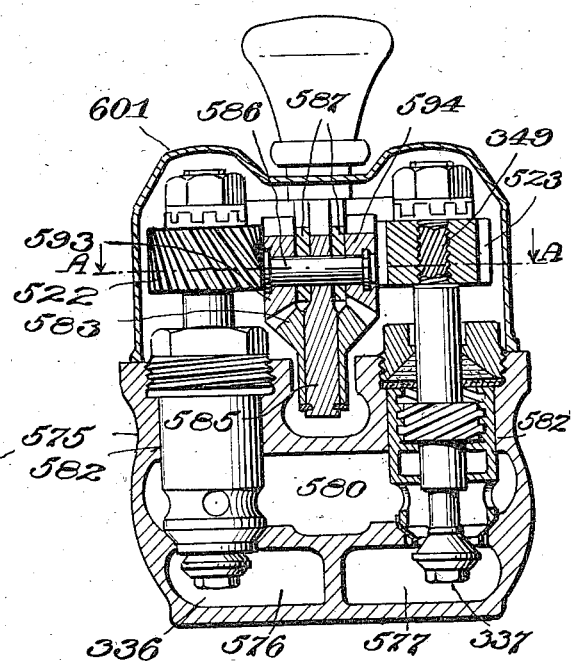
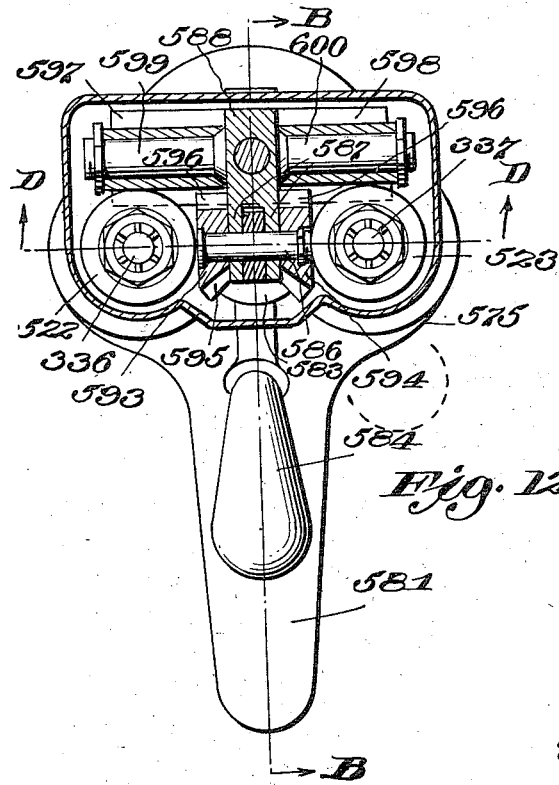

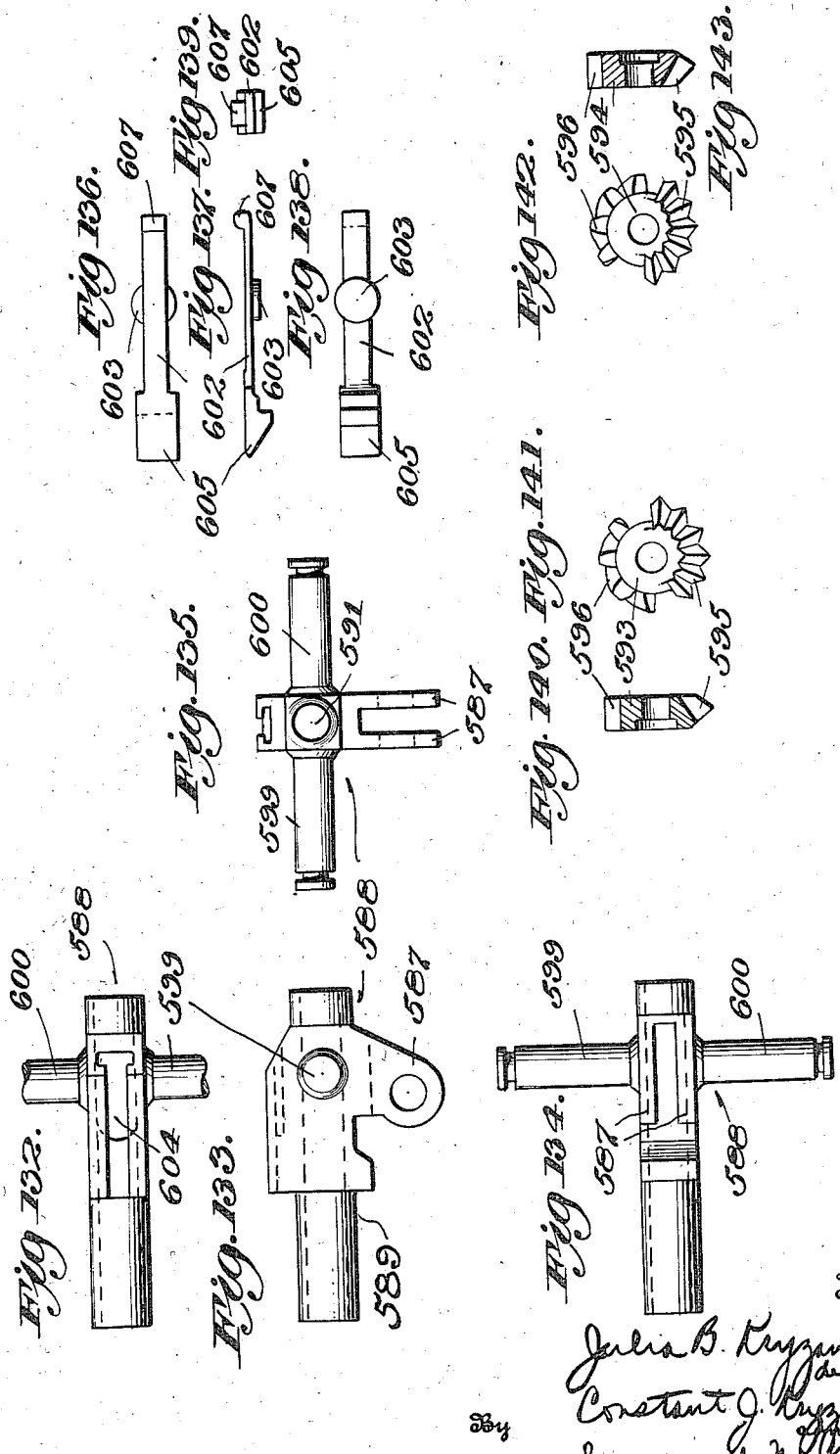

Patented Mar. 17, 1936

2,033,941

UNITED STATES PATENT OFFICE 2,033,941

VALVE

Julia B. Kryzanowsky, deceased, late of Baltimore, Md., by Constant J. Kryzanowsky, administrator, Baltimore, Md.

Application September 18, 1926, Serial No. 136,347

25 Claims. (Cl. 277—18)

This invention relates generally to valves and particularly to valves for regulating or controlling the flow of fluids from a plurality of sources of supply.

An object of the invention is to provide a fixture which will combine in one unit the plurality of devices ordinarily used for controlling the flow of fluids from a plurality of sources of supply, for selecting the point of discharge of said fluid or fluids, and for controlling the final disposal thereof.

Another object of the invention is to provide a fixture in which, by the operation of a single handle or operating member, fluid-flow, both as to proportion and volume, can be controlled, the point of discharge of fluids can be selected, and the final disposal of these fluids can be controlled.

A further object of the invention is to provide a compact fixture which will take up considerably less space than that occupied by the control devices it replaces.

Another object of the invention is to provide a device which can be quickly and readily installed and which can be installed and maintained at low expense.

Another object of the invention is to provide a fixture in which the valve opening will be consistently proportional throughout the whole travel-range of the control lever while on fluid-volume regulation, thus assuring definite valve opening for each position of the lever and thereby accurate and sensitive gradation of flow of liquids, both individual and cumulative.

Another object of the invention is to provide a fixture in which the rate of opening of correlated valves will be consistently proportional through the whole travel-range of the control lever while on fluid relative-proportion ratio-regulation, thus assuring definite valve opening ratios for each position of the lever and thereby accurate and sensitive gradation of proportionate flow rate from each separate fluid source.

A further object of the invention is to provide a fixture in which all valves and operating mechanisms are outside of the fluid chambers and easily accessible and removable, the valve actuating mechanisms and the valves being independent and removable as separate entities.

Another object of the invention is to provide a fixture in which the control lever is so guided as to require only simple unidirectional exertions to operate it for both ratio and volume control.

Another object of the invention is to provide a fixture having adjustments which permit the use of positive-acting valves and the maintenance of such valves in good closing and working condition, thus eliminating the necessity for pressure-closing valves and permitting self-locking position-retaining operation of the control lever at all times.

Other objects of the invention will be obvious from the following description in connection with the accompanying drawings which illustrate several particularly advantageous practical forms which the broad invention may take. In these drawings:—

Fig. 1 is a top plan view of one form of the invention with both valves in closed position, Fig. 2 is a sectional view taken on the line 2—2 of Fig. 1, looking in the direction of the arrows, Fig. 3 is a top plan view similar to Fig. 1, showing the control lever swung to the extreme right from the position shown in Fig. 1, Fig. 4 is a top plan view similar to Fig. 3, with the control lever pushed in as far as it will go, Fig. 5 is a front elevation, partly in section, Fig. 6 is a fragmentary sectional view taken on the line 6—6 of Fig. 1, looking in the direction of the arrows, Fig. 7 is a side elevation in detail of the fulcrum varying yoke, and Fig. 8 is a fragmentary sectional view showing the valve adjustment means.

Fig. 9 is a front elevation of a modified form of the invention,

Fig. 10 is a side view looking to the left of Fig. 9,

Fig. 11 is a top plan view with control disk parts removed,

Fig. 12 is a vertical section on line 12—12 of Fig. 11, looking in the direction of the arrows, with the control disk parts in place and the valve assembly omitted for the sake of clearness, Figs. 12a, 12b, and 12c and 12d are detail bottom and top plan, and two sectional views, respectively, of the key plate, Fig. 13 is a similar sectional view taken on the line 13—13 of Fig. 11, looking in the direction of the arrows, Figs. 13a, 13b, and 13c are detail end, side, and plan views, respectively, of the pivot pin and pivot blocks, Fig. 14 is a vertical sectional view looking to the rear of Fig. 10, Fig. 14a is a sectional view on line A—A of Fig. 14, looking in the direction of the arrows, Fig. 15 is a sectional view on line 15—15 of Fig. 10, with the control parts omitted, Fig. 15a is a detail side elevation of certain parts shown in section in Fig. 15, Fig. 16 is an enlarged sectional view on the line 16—16 of Fig. 10, looking in the direction of the arrows, showing the valves, Fig. 17 is a top plan view of the valve assemblies, Fig. 18 is an end view of one of the valve sleeves, looking from the bottom of Fig. 19, Fig. 19 is a vertical section of one of the valve sleeves, Figs. 20, 21, and 22 are side, end, and vertical sectional views, respectively, of one of the valve adjusting sleeves, Fig. 23 is a side elevation of one of the valve stems, Fig. 24 is a vertical section of one of the valve actuating gears, and Figs. 25 and 26 are side and vertical sectional views, respectively, of one of the valve seat retaining members, with a valve seat in place, Fig. 27 is a side view, partly in section, of another modification of the invention, Fig. 28 is a vertical sectional view looking to the right of Fig. 27, Figs. 29 and 30 are horizontal sectional views on the lines 29—29 and 30—30, respectively, of Fig. 27, looking in the direction of the arrows, Fig. 31 is a detail sectional view on the line 31—31 of Fig. 28, looking in the direction of the arrows, and Figs. 32 and 33 are top plan and side views, respectively, of the key sleeve.

Figure 39:
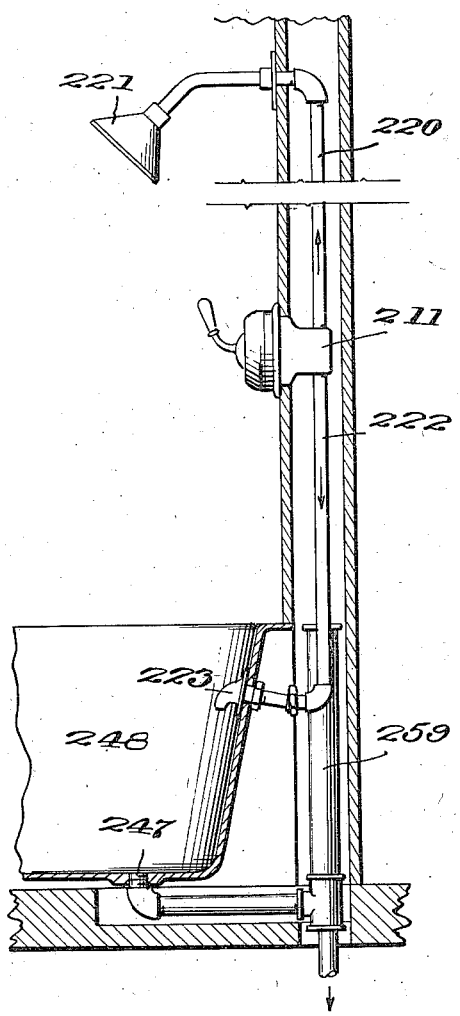
Figure 40:
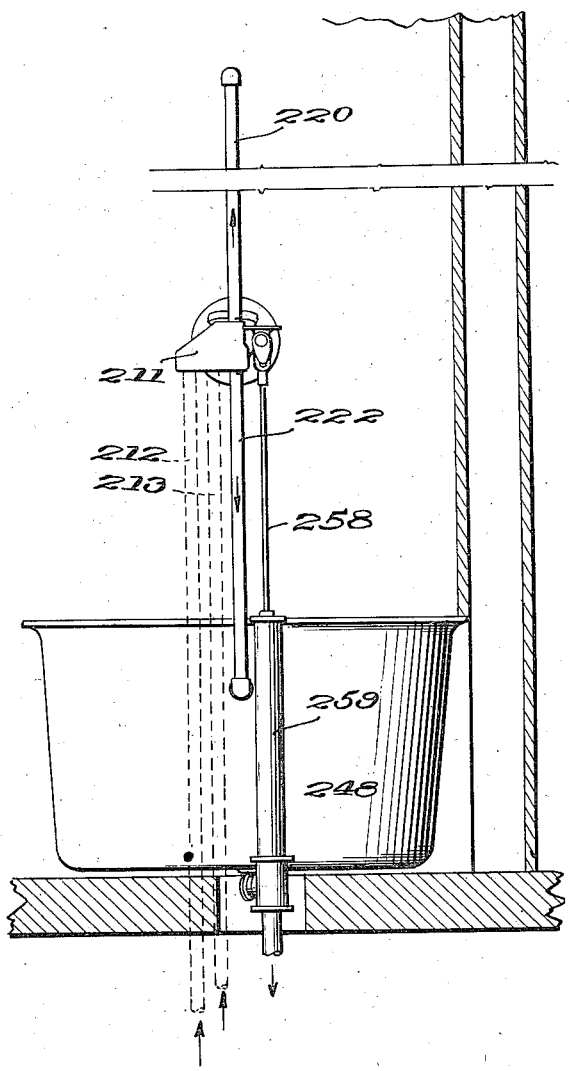

Fig. 34 is a front view of a further modification of the invention,

Fig. 35 is a vertical sectional view looking to the left of Fig. 34,

Fig. 36 is a view looking from the rear of Fig. 34,

Fig. 37 is a fragmentary view in rear elevation showing the waste cam in raised or tub-draining position, Fig. 38 is a view, partly in section, looking from the bottom of Fig. 34, Fig. 39 is a sectional view showing the fixture installed for use with a shower and tub, and Fig. 40 is a sectional view, looking to the left of Fig. 39.

Fig. 41 is a top plan view of another modification of the invention,

Fig. 42 is a side elevation, looking from the right of Fig. 41,

Fig. 43 is a front elevation, partly in section, of Fig. 41,

Fig. 44 is a front elevation, partly in section, of a modified form of control mechanism, Fig. 45 is a top plan view, partly in section, of the modification shown in Fig. 44, Fig. 46 is a side elevation, partly in section, looking from the right of Fig. 44, Figs. 47 and 48 are vertical sectional and end views, respectively, of the locking sleeve, Fig. 49 is a detail sectional view on line 49—49 of Fig. 44, and Figs. 50, 51, and 52 are top plan, front side, and end views, respectively, of the housing member to the right in Fig. 44.

Fig. 53 is a top plan view of another modification of the invention, showing the control lever in extreme left and closed lever position, Fig. 54 is a sectional view on the line 54—54 of Fig. 53, looking in the direction of the arrows, Fig. 55 is a sectional view on the line 55—55 of Fig. 54, looking in the direction of the arrows, Fig. 56 is a front elevation showing the control lever in open and extreme right lever position, Fig. 57 is a sectional view on the line 57—57 of Fig. 56, looking in the direction of the arrows, Fig. 58 is a front end view of a partial assembly of parts ready for insertion into the hollow control member, Figs. 59, 60, and 61 are end, sectional and side views, respectively, of the swivel block, Figs. 62, 63, and 64 are side, adjacent side, and sectional views, respectively, of the pivot pin, and Figs. 65 and 66 are side and end views, respectively, of the pivot pin supporting sleeve.

Fig. 67 is a side elevation of another modification of the invention,

Fig. 68 is a front view of Fig. 67,

Fig. 69 is a sectional view on line 69—69 of Fig. 68, looking in the direction of the arrows, Fig. 70 is a top plan view with the right hand half in section on the line 70—70 of Fig. 69, Fig. 71 is a detail sectional view on the line 71—71 of Fig. 69, Fig. 71a is a fragmentary detail sectional view on the line A—A of Fig. 69, Fig. 72 is a sectional view on the line 72—72 of Fig. 70, looking in the direction of the arrows, showing the valve in open position, Figs. 73, 74, and 75 are side views of the wedge block, and Figs. 76, 77, and 78 are sectional, side, and bottom plan views, respectively, of the adjustment knob.

Fig. 79 is a vertical sectional view of another modification of the invention,

Fig. 80 is a front view, partially in section, the left side being a section on the line B—B, the upper right side being a section on the line C—C of Fig. 81, Fig. 81 is a top view, partially in section, the left side being a partial section on line D—D of Fig. 79, Fig. 82 is a detail section on the line E—E of Fig. 80, Fig. 83 is a sectional view on the line F—F of Fig. 81, showing the valve open and with the fluid supply fitting removed, Fig. 84 is a sectional view on the line G—G of Fig. 83, Figs. 85, 86, and 87 are top plan views of the two valve actuating gears and the control member or gear, Fig. 88 is a side view of the control member or gear, and Figs. 89, 90, and 91 are sectional, side and bottom views, respectively, of the valve spindle clutch member.

Fig. 92 is a side view in section on the line A—A of Fig. 93 of another modification of the invention, Fig. 93 is a front view, partly in section, Fig. 94 is a view from the bottom of Fig. 93, and Fig. 95 is a fragmentary top view, the right side being a section on the line B—B of Fig. 92.

Fig. 96 is a top plan view of another modification of the invention,

Fig. 97 is a front view, with the control mechanism in section on the line 97—97 of Fig. 96, and Fig. 97a is a sectional view on the line A—A of Figs. 96 and 97, and Fig. 98 is a side view.

Fig. 99 is a top plan view of another modification of the invention,

Fig. 100 is a front view,

Fig. 101 is a side view looking from the right of Fig. 99, and

Figs. 102 and 103 are fragmentary detail sectional and side views, respectively, showing the control handles provided with valve adjustment mechanism.

Fig. 104 is a front view of another modification of the invention,

Fig. 105 is a sectional view on the line A—A of Fig. 104,

Fig. 106 is a sectional view on the line B—B of Fig. 105,

Fig. 107 is a side view looking from the right of Fig. 104,

Fig. 108 is a sectional view on the line C—C of Fig. 106,

Figs. 109, 110, and 111 are side, adjacent side, and end views, respectively, of the wedge block, and Figs. 112, 113, 114, and 115 are side views of the guide yoke.

Fig. 116 is a side view of another modification of the invention,

Fig. 117 is a front view,

Fig. 118 is a top view partially in section, the lower position being a section on the line A—A of Fig. 116, Fig. 119 is a sectional view on the line B—B of Fig. 117, Fig. 120 is a detail sectional view on the line C—C of Fig. 118, Fig. 121 is a sectional view on the line D—D of Fig. 118, Fig. 122 is a detail sectional view on the line E—E of Fig. 119, and Figs. 123, 124, and 125 are sectional, side and bottom views of the clutch member.

Fig. 126 is a side view of another modification of the invention,

Fig. 127 is a front view,

Fig. 128 is a top plan view with the control parts shown in section on the line A—A of Fig. 131, Fig. 129 is a sectional view on the line B—B of Fig. 128, Fig. 130 is a detail sectional view on the line C—C of Fig. 129, Fig. 131 is a sectional view on the line D—D of Fig. 128, Figs. 132, 133, 134, and 135 are detail views of the gear spider or support, Figs. 136, 137, 138, and 139 are detail views of the lock spring, and Figs. 140, 141, 142, and 143 are detail views of the transmitting gears.

For convenience in describing the invention it has been shown as adapted for use as a mixing valve for sinks, lavatories, baths, etc., but it is obvious that use of this fixture is not limited to the particular applications mentioned and that it may be used for separately apportioning without mixing fluids, whether of like or different thermal, pressure, gravity, chemical or physical properties and whether directed to one common or to separate receivers and whether the control lever or member be manually or power operated or controlled.

Referring to the drawings and more particularly to Figs. 1–8 inclusive, 10 indicates generally a main hollow body or casing provided with inlet branches or passages 11, 12, a mixing chamber 13, and a discharge passage or outlet 14. Suitable fluid supply pipes are adapted to be connected to extensions or passages 11 and 12 and the flow of liquid in said passages is controlled or regulated by suitable valves (not shown) having stems or spindles 15, 16, respectively. The valves may be of any suitable or well known construction and therefore they have not been illustrated in order to avoid unnecessary complication of the drawings. The above described faucet, it will be observed, is a commercial type of mixing faucet in common use. In this embodiment of the invention, the fluid mixture and flow-control mechanism is applied in the form of an attachment to a standard faucet of the type illustrated.

Figure 1:
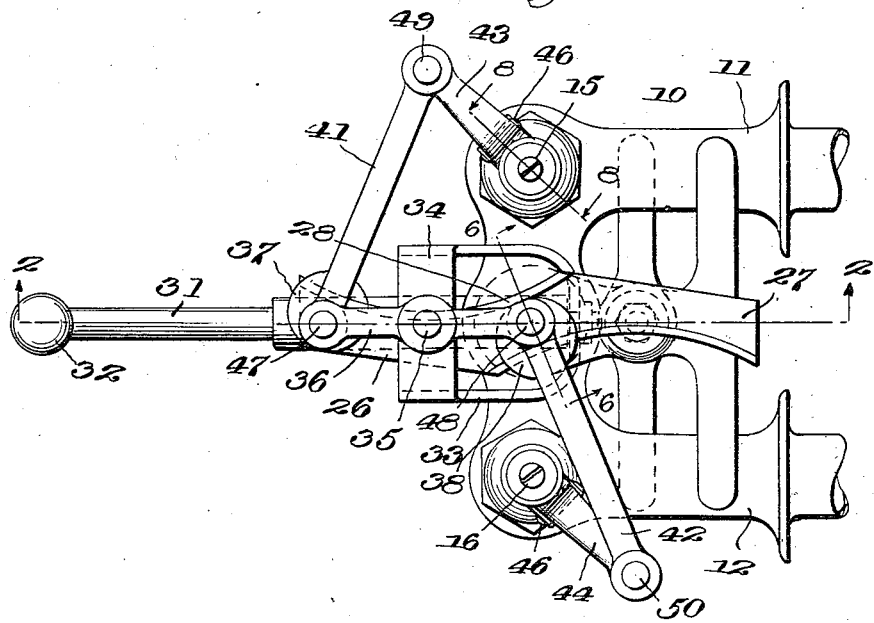
Figure 2:
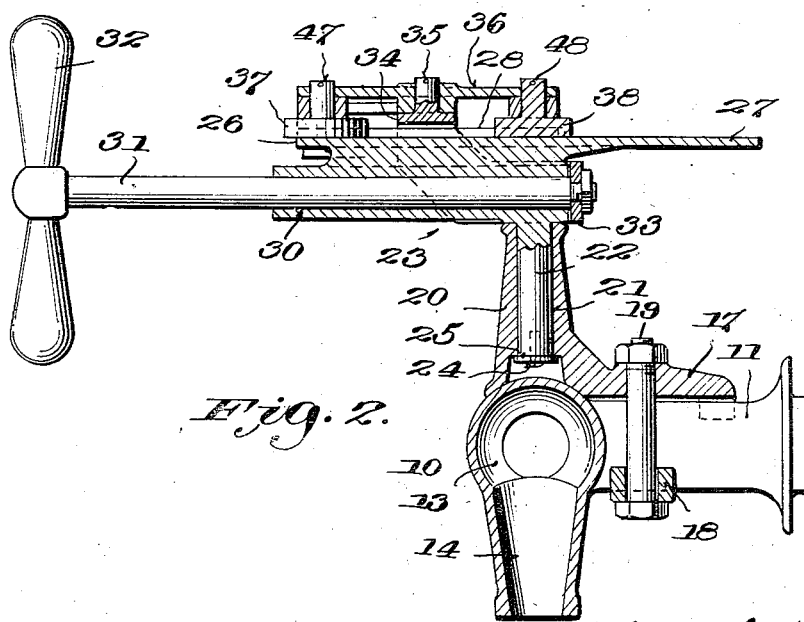

The means for supporting the control mechanism comprises, in the present instance, a casting or saddle member 17 having substantially horizontally projecting arms which rest on or straddle the faucet casting 10, casting 17 being firmly clamped in place by means of a clamping member 18 and clamping bolt 19. Casting 17 is provided with a substantially vertical extension 20 provided with a socket or bore 21 which receives and supports the pivot shank 22 of the oscillating lever 23, pivot pin 22 being held in place by a screw 24 and washer 25. Casting 17 thus forms a support for the fulcrum of the lever 23. The horizontally extending body portion of lever 23 is provided with horizontally extending alined arms 26, 27 which extend equidistantly of the pivot pin 22, said arms being provided with arc-shaped guides or tracks 28, 29, respectively. The main body portion of lever 23 is also provided with a bored guide 30 to receive and slidably support rod 31 which has an operating handle 32 at one end and a yoke 33 at the other end. As shown in Figs. 1, 2, and 7, yoke 33, which is rigidly secured to rod 31 by any suitable means, is a substantially U-shaped member, the arms of which extend on either side of the arms 26, 27, of lever 23, the arms of the yoke terminating in offset portions connected by a bridge portion 34 which extends over and bridges arms 26, 27. Bridge member 34 of yoke 33 is provided with a pivot pin 35 which pivotally supports a link 36 intermediate its ends, the ends of link 36 being pivotally connected to pivots 47, 48 of grooved fulcrum blocks 37, 38 arranged to slide on arcuate guides 28, 29, respectively of oscillating lever 23. Fulcrum blocks 37, 38 are held against displacement by any suitable means, such as by means of a screw 39 and washer 40, as shown in Fig. 6. Links 41, 42 pivotally connect fulcrum blocks 37, 38 with valve operating levers 43, 44, respectively. Valve operating levers 43, 44, which replace the customary valve handles, are preferably adjustably secured to their respective valve spindles to provide a correction of the valve adjustment to compensate for wear, etc. Any suitable adjustment may be provided, but in the present instance (see Fig. 8) the end of each valve stem is provided with serrations or teeth 45 engaging the threads of a worm 46 mounted in the hub of each valve lever. By turning worm 46, relative angular movement of lever and valve stem is caused.

With the parts in the position shown in Fig. 1, both valves are in closed position. If handle 32 is swung to the right from the position shown in Fig. 1 to the position shown in Fig. 3, link 42 would impart no movement to valve lever 44 and the valve controlled thereby because pivot 48 of link 42 is in axial alignment with pivot 22 of lever 23, (see Fig. 2), therefore the valve dependent upon valve lever 44 would remain closed; but link 41 would move valve lever 43 to open its dependent valve, hence fluid emitted from the fixture would all come from this one valve. If, from the position shown in Fig. 3, handle 32 be moved to the "in" position shown in Fig. 4, fulcrum blocks 37, 38 would slide on the arcuate guides or tracks 28, 29 and pivots 47, 48 of links 41, 42 respectively, would swing in arcs, causing a gradual closing of the valve or lever 43 and a gradual opening of the valve or lever 44 so that by the time the "in" position was reached, the position of the valves would be reversed from that shown in Fig. 3, viz: the valve on lever 43 would be closed and the valve on lever 44 would be open. Returning again to Fig. 1, it will be obvious that with the lever 23 in the position shown, sliding movement of handle 32 from one extreme to the other, will not open either valve, the links 41, 42 merely swinging in arcs of which the pivots 49, 50 are the centers. This is a distinct advantage because it permits a preselection of the fluid mixture ratio before any fluid flows.

From the above it will be seen that in this fixture, the fluid mixture ratio is controlled by moving handle 32 "in" or "out" and the amount of fluid flow is controlled by swinging handle 13 to the side. The control movements may be executed separately in any desired sequence or simultaneously.

If desired, a double swing handle or operating member may be substituted for the sliding and swinging operating member shown by replacing handle 32 and part of rod 31 with a bell crank lever pivoted to a lateral extension or bracket formed on lever member 23, one arm of the bell crank lever being connected to yoke 33, the other arm forming the operating handle.

Referring to Figs. 9–26, 51 indicates generally a main hollow body or casing provided with fluid inlets or supply passages 52, 53 controlled by valves 54, 55, respectively, to be explained in detail hereafter, valves 54, 55 discharging into passages 56, 57, connected to a mixing chamber 58 which discharges through spout 59 or through passage 60 and nipple 61.

As clearly shown in Figs. 11 and 15, the crown or top part of casing 51 is provided with a recess 62 from the bottom of which projects a substantially spherical extension 63 having opposed flattened plane-surfaced faces 64, 65 and a vertically extending slot 66 intermediate said faces. Extension 63, which is also provided with a horizontally extending bore or hollow guide 67, forms a support for the oscillating valve operating levers 68, 69, which resemble each other in shape, but differ in size, (see Figs. 12–13). Lever 68, the smaller of the two, has an annular body portion provided with a central aperture or bore 70 and laterally extending arms 71, 72 provided with horizontally extending bearing surfaces 73, 74, respectively, arm 72 having an extended arcuate portion 75, the periphery of which is provided with spiral teeth 76.

Lever 69 is similarly provided with a central aperture 77 and laterally extending arms 78, 79 having horizontally extending bearing surfaces 80, 81, respectively, arm 78 having an extended arcuate portion 82, the periphery of which is provided with spiral teeth 83. Oscillating lever 68 is pivotally supported by a pivot pin 84 (see Figs. 12, 13–13c) which extends through aperture 70 of said lever, pivot pin 84 in turn being supported by two lever pivot blocks 85, 86. Pivot blocks 85, 86 are each a part of a cylinder, the diameter of which is substantially the diameter of the hollow bore 67 in the support or extension 63 of casing 51 and when assembled they form a cylinder having a perimetral groove or guide for the lever 68. Lever pivot blocks 85, 86, besides supporting pivot pin 84, also form the pivot for the larger oscillating lever 69 (see Figs. 12 and 13). To assemble the oscillating levers, lever 69 is inserted in the vertically extending slot 66 in extension 63 of casing 51 so that its central aperture or bore 77 is in alinement with the horizontally extending bore 67. Lever 68 and pivot blocks 85, 86 are mounted on pin 84, pivot blocks 85, 86 being arranged on either side of lever 68. This assembly of lever 68, pin 84 and pivot blocks 85, 86 is then inserted, through slot or opening 87 in the wall of casing 51, into the bore 67, passing through opening 77 of lever 69. The levers 68, 69 are thus pivotally mounted for movement in planes at right angles to each other and the bearing surfaces 73, 74, 80, 81 of the two levers are in a common horizontally extending plane. When mounting the levers 68, 69, they are so arranged that the ends of the levers provided with teeth extend into the apertures or sockets 88, 89, respectively, provided for the valves in casing 51.

The oscillating valve operating members 68, 69 are actuated or controlled by a control member 90 which, in the present instance, is an arcuate, hollow, hemispherical member provided with a control handle 91. The concave surface of said control member rests on the spherical support 63 of casing 51 and holds pivot blocks 85, 86 in place, the annular edge 93 of control member 90 resting on bearing surfaces 73, 74, 80, 81 of levers 68, 69.

It will be seen that the spherical head or extension 63 supports the hollow hemispherical control member 90 for movement about either a horizontal axis or a vertical axis or both. Means are provided for holding the control member 90 in place comprising, in the present instance, a cylindrical cap or housing member 94 and a hollow hemispherical plate 95, plate 95 being provided with a laterally extending peripheral flange or rib 96 which engages in a complementary annular groove or recess 97 of housing member 94. The upper or convex side of control member 90 is provided with a flat projecting band or rib 98 in alinement with handle 91, said rib or band fitting in a complementary groove 99 in plate 95, the handle of said control member projecting through a slot or opening 100 in said plate. When the control handle 91 is tilted or swung on a horizontal axis, handle 91 rides in slot 100 and rib 98 rides in groove 99 in plate 95, which is held stationary, the rib and groove connection of plate and control member preventing any tendency of handle 91 to twist. In turning or rotating control member 90 on a vertical axis, the flange 96 of plate 95, which must turn with the control member, rotates in the groove 97 of housing member 94. It will be seen that housing member 94, control member 90 and plate 95 provide a dust-proof closure which encloses and protects the valve levers, etc.

The valves, previously generally indicated and referred to by the reference numerals 54, 55, will now be described in detail. Although any suitable or well known type of valve can be used, the type herein disclosed is preferred. Each valve assembly, comprising the valve proper and its related parts, can be inserted and removed as a separate entity from the socket or recess 88 or 89 provided for it in the main casing 51. Referring more particularly to Figs. 16–26, 101 is the valve stem which is slidably supported in the valve stem guide member 102. Intermediate its ends, the valve stem 101 is provided with an enlarged threaded portion 103 which fits into a threaded opening 104 of a valve actuating member or gear 105. The periphery of valve actuating member 105 is provided with spiral teeth 106 adapted to be engaged by the teeth on valve actuating lever 68 or 69. One end of the valve stem 101 is provided with splines or spur teeth 107, which will be explained later, the other end supporting a valve body or disk 108 which is held in engagement with the shoulder 109 on the valve stem by a valve body retainer 110 and a nut or similar fastening means 111. Slidably mounted on valve stem 101, between the valve body or disk 108 and the valve guide 102, is a valve seat supporting or retaining member 112 which removably supports or retains the valve seat 113 against which valve body 108 is adapted to seat.

Valve stem packing 114 is interposed between valve guide 102 and valve seat retainer 112, the guide 102 being recessed to receive said packing. 115 is a valve sleeve adapted to abut valve guide 102 and enclose or support portions of the valve assembly. Valve sleeve 115 is provided with a port or slot 116 through which oscillating valve lever 68 or 69 extends to engage the valve gear 105. A valve retaining nut or bushing 117 is adapted to engage, by screw threads or similar means, the walls of the sockets or passages 88 or 89 and removably clamp valve sleeve 115 and the abutting parts of the valve assembly in place. It will be obvious that when valve guide 102 and valve sleeve 115 are thus assembled, valve gear 105 is confined between abutments 118 and 119, respectively, formed on these members, said abutments permitting rotary movement of said valve gear but preventing substantially any sliding movement of said gear longitudinally of the axis of the valve stem.

In order that the valve proper will slide or move axially when valve actuating gear 105 is rotated, means are provided which will hold valve stem 101 against rotary movement, but permit axial movement thereof. It is also desirable to provide an adjustment of the valve position to compensate for wear, etc., and in the present instance the means for holding the valve stem against rotary movement during operation also includes valve position adjusting means. In the example illustrated these means comprise a valve adjusting sleeve or collar 120, provided with internal spur teeth or splines 121, the teeth extending in from one end (see Fig. 22) being reduced, as by reaming, for instance, sufficiently to provide an internal shoulder 122 intermediate the ends of said collar or sleeve. The outer surface of the collar or sleeve 120 is provided with external teeth or splines 123, a portion of the teeth, marked 124, at one end of the collar projecting out further than the rest of the teeth to form a shoulder ring. The collar or sleeve 120 is also provided intermediate its ends with a reduced portion or circular groove 125. Adjusting sleeve or collar 120 fits inside the valve sleeve 115 and over the splined end 107 of valve stem 101, the interior teeth or splines 121 of adjusting sleeve 120 engaging the teeth or splines 107 on the valve stem; the exterior teeth or splines 123 of the collar 120 engaging the internal teeth or splines 126 provided on the inside of valve sleeve 115, thus permitting sliding movement of the valve stem, but normally preventing rotating thereof. Clutch mechanism is provided to normally hold the adjusting collar 120 in fixed position relative to valve sleeve 115, said clutch mechanism permitting movement of said adjusting collar 120 relative to valve sleeve 115 when it is desired to adjust the position of the valve. As shown in Figs. 16 and 19, valve sleeve 115 is provided adjacent teeth or splines 126 with an internal groove or recess 127 and valve adjusting sleeve 120 is provided with a plurality of radially extending apertures 128 carrying clutch balls 129 supported by hollow clutch cone or member 130 extending into sleeve 120 so that said balls normally project through said apertures 128 into groove 127 to normally prevent relative sliding movement of sleeves 115 and 120. Hollow clutch cone or member 130 is slidably supported on a clutch pin 131 having an integral head 132 at one end, said head engaging internal shoulder 122 of valve collar 120 to prevent withdrawal of said pin from said valve collar when assembled as shown. The other end of pin or carrier 131 is provided with a removable collar 133 and between said collar 133 and the bottom of recess 134 in clutch member 130 is supported on pin 131 a spring 135 which tends to hold clutch member 130 in place within adjusting sleeve 120, clutch member 130 in turn forcing clutch balls 129 into the internal groove 127 of sleeve 120. To adjust the valve, clutch cone or member 130 is raised or withdrawn from within adjustment sleeve 120 a sufficient distance, against the tension of spring 135, to release the clutch balls 129 and permit sliding movement of adjustment sleeve 120 within valve sleeve 115. When adjustment sleeve 120 has been withdrawn from valve sleeve 115 sufficiently for shoulder ring 124 of said adjustment sleeve to abut the internal shoulder 126ª of said valve sleeve, the recessed portion or groove 125 of the adjustment sleeve will register with splines 126 whereby splines 126 and 123 will be disengaged. With adjustment sleeve 120 thus pulled out, valve stem 101, by means of the engagement of splines 107 and 121, can be rotated to adjust the valve. After the adjustment has been made the clutch member is released and the adjusting parts are pushed back to their normal or locked position. A removable cap 136 is provided to cover the valve assemblies.

Suitable means are provided for operating or controlling a waste disposal valve (not shown). Referring more particularly to Figs. 14 and 15, 129ª indicates a waste valve operating rod supported or guided in a guide passage 130ª provided in main casing 51. Rod 129ª is provided with teeth 131ª which slant or extend at an angle from the axis of said rod. Teeth 131ª on rod 129ª are adapted to engage with slanting teeth 132ª of a waste pull rod 133ª supported or guided in a passage 134ª and guide sleeve 135ª. Waste pull rod 133ª, which is provided with an operating handle or knob 136ª, is provided with a longitudinally extending spline or keyway 137 adapted to receive a pin 138 secured in the interior of the guide sleeve 135ª, this pin and spline connection preventing rotation of rod 133ª and limiting its longitudinal movement. Guide sleeve 135ª, which is secured to main casing or body 51 by screw threads or similar means, provides means for supporting the fluid mixture directing valve 139, the function of which is to connect the fluid mixture passage 58 with either the spout outlet 59 or the spray passage outlet 60 leading to spray nipple 61. Fluid mixture directing valve 139 is secured by screw threads or similar means to hollow valve stem 140 slidably supported on guide sleeve 135ª. Valve stem 140 is provided with teeth 141 meshing with gear pinion 142 pivotally supported in suitable bearings provided in main faucet body 51. One end of gear pinion 142 is provided with an operating handle 143, the opposite end of said pinion being reduced to provide a shoulder 144. Secured to the reduced end of the gear pinion 142 is a facial toothed collar 145 and between the collar 145 and the shoulder 144 is mounted a facial cam bushing 146 held stationary in faucet body 51 by pin 146ᵃ. Spring 147 holds the facial tooth of collar 145 in engagement with either of the two sloping cam surfaces of cam bushing 146 to yieldingly contact valve 139 with either valve seat 148 of spout 59 or valve seat 149 of spray passage outlet 60, thus preventing halfway positioning of valve 139. Spout 59 which is separable from main faucet body 51 is held in engagement therewith by means of a bushing 150 held by screw threads or similar connecting means to guide sleeve 135ᵃ. 151 is a removable threaded plug interchangeable with nipple 61 to permit the spray nipple to be placed on either side of the spout, as desired. Gear pinion 142 is so mounted in main casing or body 51 that the handle 143 can be placed on either side of the fixture.

To operate the fluid inlet valve, the control member 90 is tilted or oscillated on a horizontally extending axis to depress or operate one or both of the valve oscillating levers 68 or 69. If control member 90 is oscillated on an axis coinciding with the axis extending through the arms of one of the oscillating valve operating members, only the other oscillating valve lever will be operated. If the control member 90 is swung about a vertically extended axis until the operating handle 91 is midway between the toothed ends of the oscillating valve levers and the handle tilted, both valves will be opened simultaneously an equal amount. It will thus be seen that the control member can be operated to deliver fluid entirely from one valve or the other or a mixture of any desired proportion. Movement of the handle to the right or left as viewed in Figs. 9 and 10, for instance, controls the mixture ratio and up and down movement or tilting of the lever controls the rate of flow.

Figs. 27–33 show a modified form of the invention similar to the form illustrated in Figs. 9–26, but with the valves located below the basin or similar receptacle. Referring to Figs. 27–33, 152 indicates generally a main faucet body or casing provided with fluid inlet branches or passages 153, 154 controlled by valves indicated generally by 155, 156 discharging into a fluid mixture branch or passage 157. The hollow discharge shank 158 of the main faucet body 152 extends through an opening 159 in the top of the basin 160 and into a vertically extending aperture or bore 161 in the hollow discharge spout 162 which rests on the top of the basin. Spout 162 is provided with an integral annular flange or sleeve 163 into which the end of hollow shank 158 extends, the shank being provided adjacent its end with a recess or annular groove 164 engaged by a locking washer 165 to lock shank 158 in the bore 161 of spout 162. Packing gland 166 rests in the bottom of the recess formed in the top of spout 162 by sleeve or flange 163, a packing ring 166ᵃ surrounding the hollow shank 158. A packing washer 167 mounted in a recess in the bottom of the spout prevents leakage at this point. The hollow shank 158 is provided with a plurality of radially extending discharge apertures 168 which register with the hollow discharge passage of spout 162. A washer 169 held by a lock nut 170 threaded to hollow shank 158 engages the under side of basin 160 to firmly clamp the fixture in place.

The two halves 155, 156, valve oscillating levers 171, 172, and pivot parts 173 are practically identical with corresponding parts shown in Figs. 9–26, and therefore these parts have not been shown in detail here. The control member 174 is practically identical with the control member 90 shown in Figs. 9, 10, 12, and 13, except that operating handle 91 is replaced by pivot lug 175. Pivot lug 175 is connected through pivoted link 176 connected by pin 176ᵃ to a cross head 177 which is actuated for turning and up and down movement by a hollow push rod 178. Push rod 178 is slidably and rotatably mounted in a guide sleeve 179 which extends through hollow shank 158, said guide sleeve forming the inner wall of an annular fluid passage in said vertical shank. Push rod 178 is provided at opposite sides adjacent the upwardly extending ends, with recesses 180, 181 into which extend bearing blocks 182 and alined pins 183 which extend laterally from the forked end of an operating lever 184 pivoted at 185 to a hollow cap or head 186 adapted to turn or rotate on the sleeve of flange 163 of spout 162. Cap or head 186, which is held against displacement by the overhanging end of forked locking washer 165, is provided with an internal radially extending key 187 which engages in grooves 188 provided in the end of push rod 178, thus causing push rod 178, cap 185 and operating lever or handle 184 to turn together, push rod 178 transmitting any turning movements to cross head 177. Cross head 177 slides within a slotted sleeve 189 mounted on control member or disk 174, said sleeve being mounted between said control member and a guide boss 190 provided on main faucet body 152. One end of sleeve 189 is provided with a projecting rib 189ᵃ and a pin 189ᵇ adapted to receive a removable guide block 189ᶜ, said rib and guide block adapted to engage on either side of boss 190 to guide sleeve 189 against displacement. Sleeve 189 is provided with a plurality of longitudinally extending internal grooves or key-ways 191 to receive complementary extensions formed on the cross head 177 so that turning movement of the cross head will be transmitted to the control sleeve 189. The lower portion of the control sleeve 189 is provided with a hemispherical or concave recess or socket 192, which fits over the convex surface of control member 174, said socket being provided with a groove 193 fitting over a complementary rib or projection 194 on control member 174 so that turning movement of sleeve 189 will be transmitted to control member 174. It will be seen that turning movement of lever 184 about either a horizontal axis or a vertical axis or both, will be transmitted through push rod 178, cross head 177, link 176 and control sleeve 189 to control member 174, which in turn will operate one or the other valve, or both.

Means are provided for controlling a waste outlet valve indicated generally at 195. Valve 195, which is of the reciprocating type, is operated by a waste valve operating rod 196 slidably mounted in and extending through hollow push rod 178, the waste valve operating rod being guided to partake of the rotary movement of hollow push rod 178 without following the up and down movement. Rod 196 is provided at the upper end with an operatnig knob or handle 197, the lower end which extends into split sleeve 189, being provided with a key 198 engaging in a slot or keyway 199 in hollow push rod 178. The lower end of rod 196 is detachably connected to a lug 200 of a ring 201 slidably mounted on split sleeve 189, the lug 200 of said ring extending through the slotted opening 202 of sleeve 189 whereby ring 201 will turn with sleeve 189. The exterior of ring 201 is provided with an annular flange 203, which engages a grooved fork 204 attached to waste rod 205 slidably mounted in guide-ways or passages 206 formed integral with faucet body 152. An adjustable fitting or clamp 207 rigidly connects vertically extending rod 205 with a substantially horizontal rod 208, rod 208 being connected by pivoted link 209 to a waste valve operating lever 210. Vertical or up and down movement of waste valve operating rod 196 and handle 197 will be transmitted by the mechanism just described to waste valve 195 to open and close the same, but rotary movement of waste valve operating rod 196 will not be transmitted to valve 195 because the rotary movement of ring 201 will not be transmitted to grooved fork 204, the flange 203 of ring 201 merely rotating when waste valve operating rod 196 is rotated.

Referring to Figs. 34–40, 211 indicates generally a main hollow faucet body or casing adapted to be mounted in a wall panel. The faucet body is provided with fluid inlets or supply passages 212, 213 controlled by valves generally indicated by 214, 215, respectively, said valves discharging into a mixing passage or chamber 216 which in turn discharges into either fluid mixture discharge passage 218 or 219. Discharge passage 218 is connected by pipe 220 to the shower rose or spray outlet 221 and discharge passage 219 is connected by piping 222 to a tub fixture or inlet 223.

The valves indicated generally by 214, 215 are practically identical with the valves shown in detail in Fig. 16 and therefore they have been only generally indicated here. Main faucet body or casing also supports or carries oscillating valve operating levers, pivot parts and controlling means practically identical with corresponding parts shown in detail in Figs. 9–26 and therefore these parts have not again been shown in detail. As in the form of the invention just referred to, this modification is provided with hollow hemispherical control member 224, provided on its convex surface with a projecting rib 225 and an operating handle 226, said control member or handle corresponding to the parts numbered 90 and 91, respectively, shown in Fig. 13, for instance. Control member 224 is supported on a spherical projection or support 227 integral with main body or casing 211, being held in place by a key plate 228 which functions as does the plate 95 in Figs. 12 and 13. Key plate 228 is provided with a flange 229 confined between a portion of the casing 211 and a cap plate 230 secured to the main casing or body by any suitable means. An indicator plate bonnet or cap 231 and indicator plate extension flange or ferrule 232 provide a casing or housing to enclose and protect the main casing 211 and connected parts. Cap or plate 230 is provided with a specially shaped aperture 233 through which operating handle 226 of control member 224 extends, said aperture restricting the movement of handle 226 to prevent it from being given other positions than those corresponding to the operating marks or legends 234 on indicator plate bonnet 231. Key plate 228 is provided with a cylindrical extension 235, the periphery of which is provided with a cam or groove 236.

Means are provided for directing the fluid passage to one or the other of a plurality of discharge outlets. In this instance, this means comprises a fluid discharge directing valve 237 which controls the fluid discharge passage or chamber 216 and directs the discharge therefrom to either shower discharge passage 218 or tub discharge passage 219. Valve 237 is mounted on a valve stem 238, one end of which is supported in a guide passage 239 provided in casing 211, the other end being provided with a head or knob 240 which engages in the cam or groove 236 of key plate 228. Intermediate the valve 237 and knob 240 the valve stem 238 slidably engages in and is supported by a valve seat member 241 and a valve seat retainer and packing gland 242. It will be seen that when key plate 228 is rotated by a control member 224, valve 237 will be reciprocated, due to the engagement of knob 240 in groove 236.

The pressure of the fluid in passage or chamber 216 will tend to maintain the valve 237 against either of its two seats, but additional means are also provided for ensuring seating of valve 237. As shown in Fig. 38, 243 indicates a hollow plunger, mounted in a suitable guide recess 244 provided in casing 211. A spring 245 is confined in recess 244 between plunger 243 and a spring retained plug 246, said spring yieldingly holding the pointed or bevelled end of the plunger 243 in engagement with the valve stem seat or knob 240. Plunger 243 thus tends to yieldingly hold valve 237 against either of its two seats.

Means are also provided for controlling or operating the waste discharge outlet 247 of the tub 248. A rod or shaft 249 is supported in suitable bearings 250 provided in main casing 211. One end of said shaft is provided with an intermittent action gear 251, the other end being provided with a waste actuating cam 252. Mounted on shaft 249 adjacent cam 252 is a waste cam yoke 253, said yoke being provided with a slot 254, through which shaft 249 extends, and a head 255 provided with a stabilizing groove 257. Waste cam yoke 253 is connected by a waste valve operating rod 258 to a reciprocating waste valve (not shown) operating in waste valve and overflow stand pipe 259. The intermittent action gear 251 on shaft 249 engages the flange 229 of key plate 228, said flange normally holding the gear against rotation. A portion of the flange 229 is provided with teeth 260 and when key plate 228 is rotated sufficiently to bring teeth 260 in engagement with gear 251, said gear, shaft 249 and cam 252 are rotated to either open or close the waste valve. As shown in Fig. 36, cam 252 and yoke 253 are in the position they occupy when the waste valve is closed. This is the position these parts would take when the control handle 226 would be in a position just opposite to that shown in Fig. 34, i. e., in the "tub sector". When the control handle 226 is moved from this position to the position it occupies in Fig. 34, teeth 260 will engage gear 251 in passing and rotate said gear, shaft 249 and cam 252 a half-turn, moving the cam and yoke 253 to the position they occupy in Fig. 37, thus opening the waste discharge valve of the tub. In this position the tip of cam 252 engages in the stabilizing groove 257 in the head 256 of yoke 253 to compensate for any inexactitude in the positioning of the control handle.

From the above, it will be seen that one operating handle controls, not only the fluid mixture ratio and rate of flow, but this lever also controls or selects the point of discharge and also the operation of the waste discharge. The various controls are so interlocked as to permit use of the shower only when the waste valve is open. The tub fixture cannot be used until the waste valve has been closed. Furthermore, movement of operating handle 226 from the "tub sector" position or zone to the "shower sector" position or zone, or vice versa, causes a closing of valves 214, 215, if open, to preclude unwished flow of fluid in changing from one of these positions or zones to the other.

In the embodiments of the invention illustrated in Figs. 41–52, the fluid mixture and flow-control mechanism is applied in the form of an attachment to a standard commercial mixing faucet of the type shown. Referring to Figs. 41–43, 261 indicates generally a main hollow faucet body or casing provided with fluid inlet branches or passages 262, 263, and a fluid discharge passage or outlet 264. The flow of fluid through said inlet passages to said discharge passage is controlled by suitable valves (not shown) having stems or spindles 265, 266. Secured to valve stem 265 is a valve operating lever 267 connected by a pivoted link 268 to a lever 269, which is an integral part or extension of bevel gear 270 mounted for rotation on valve stem 266. The three-part connecting link 268 is adjustable as to length by means of adjusting screw 271 for reasons to be explained hereafter. Bevel gear 270 meshes with a bevel gear 272 mounted to rotate on the pivot pin or shank 273 of a pivot block 274 mounted to freely rotate on valve stem 266. Bevel gear 272, which is provided with an extension or handle 275, meshes with a bevel gear 276 keyed or otherwise rigidly secured to valve stem 266. A cap or cover plate 277, supported on valve stem 266 and held in place by a screw 278, cooperates with the flanges 279 on pivot block 274 to enclose or house the gearing just mentioned.

In the modification shown in Figs. 44–52, the valve levers 267, 269, and connecting link 268, for actuating valve spindle 265 from gear 270, have been replaced by a rack and gear transmission comprising gear 280 secured to valve spindle 265, and a bevel gear 281, provided with spur teeth 282, mounted for rotation on valve spindle 266, spur gear 280 and combination bevel and spur gear 281 being engaged by a round rod or rack 283 supported in guides or housings 284, 285. Housing 284 is supported on valve spindle 265 and in addition to providing a guide for part of rod 283, also covers or houses gear 280. Housing 285 is supported on pivot block 274ª which is similar to the pivot block 274 of Figs. 41–43, except that pivot block 274ª is provided with a relatively short depending skirt portion 286 and a longer depending skirt portion 287, each depending portion extending approximately one-half around the circumference of said bearing block 274ª. The enlarged annular portion of housing 285 is provided with internally extending interrupted toothed portions 288 and 289 adapted to register with external toothed portions 290, 291, provided on depending skirt portions 286, 287, respectively, on housing 285 when these parts are finally assembled, as shown in Figs. 44–52. To disassemble pivot block 274ª and housing 285, they are rotated a half turn relatively to each other at which time a vertically extending groove 292 cut in the teeth 291 of long skirt portion 287 of pivot block 274ª will register with the relatively small toothed portion 288 on housing 285 and the toothed portion 286 of bearing block 274ª will register with the portion 293 of housing 285 from which the threads of teeth have been stripped. Thus these two parts can be separated.

As has been previously explained, housings 284, 285, in addition to housing gears 280, 281, also support and guide the rod or rack 283, said housings 284, 285, being provided with guide portions 294, 295, respectively, for this purpose. The adjacent spaced ends of guide portions 294, 295, of housings 284, 285 are connected by a sleeve 296 slidably mounted on said guide portions. Sleeve 296 is provided with an internal tooth 297 which engages in a longitudinally extending groove or keyway 298, in rod 283, said tooth also adapted to engage with any one of a plurality of slots 299 in the end of guide portion 295 of housing 285. When tooth 297 of sleeve 296 is in engagement with one of the slots 299, rod 283 is held against rotation, but when said tooth is out of engagement with said slots, said rod can be freely rotated by turning sleeve 296. The ends of round rod or rack 283 are provided with threads 300, 301. These threads, which mesh with gears 280, 281, are of opposed direction of lead and accordingly, by turning sleeve 296 and rod 283, gears 280, 281, will be rotated, whereby adjustment of the valves to compensate for wear, etc., is provided. In the form shown in Figs. 41–43, adjustment of the valves is made by means of the adjustment screw 271, which adjusts the length of link 268.

As shown in the drawings, the valves are in closed position. Referring to Figs. 41–43, if handle 275 is swung to raised position, (shown in dotted lines in Fig. 42), gear 272 will impart movement to gears 270 and 276, gear 270 through lever 269 and link 268 oscillating lever 267 on valve spindle 265, thus causing opening of the dependent fluid admission valve; simultaneously gear 272 will also turn gear 276 in a direction opposite to that of gear 270, gear 276, which is fixed to valve spindle 266, causing this spindle to turn with a resultant opening of the depending fluid admission valve. If control handle or lever 275, while in this raised position, is swung to the extreme right in Fig. 41, then the gear train 270, 272, and 276 will turn as a unit, causing a further opening of the valve on spindle 265 and a corresponding closing of the valve on spindle 266. A swing of handle 275 while in a raised position to the extreme left position will cause opposite valve movement to that described, resulting in the opening of the valve on spindle 266 and the closing of the valve on valve spindle 265.

The operation of the modification shown in Figs. 44–52 is similar to that described above except that the link and lever mechanism for actuating spindle 265 from gear 270 is replaced by the rack and gear transmission already described.

The amount of fluid flow is controlled in this fixture by the angle of elevation of the control handle above the horizontal, while the fluid ratio is controlled by the amount of control handle swing to the right or the left of the vertical central plane, the fluid proportions being equal when the control handle is in said vertical central plane. Both control movements may be executed simultaneously or the mixture ratio adjustment may follow that of flow rate setting. The travel area of the tip of the control handle is that of a spherical triangle within which the control handle may be moved in any path desired.

Referring to Figs. 53–66, 302 indicates generally a control casing or housing having a hollow hemispherical recess or socket 303, a flange 304, and a hollow shank 305. The hollow shank of said housing is adapted to extend through an aperture in a wall 306, being clamped in place by a lock or clamp nut 307, secured to shank 305 by screw threads or similar fastening means. Extending through hollow shank 305 is a sleeve 308, said sleeve supporting a pivot pin 309 which is clamped between the rectangular flanged end 310 of said sleeve and the projection 311 of casing 302, sleeve 308 being clamped in place by lock or clamp nut 312. The enlarged circular ends 313 of pivot pin 309 extend into complementary circular apertures 314 provided in the sides of a rectangular swivel block 315 whereby swivel block 315 is pivotally supported by pivot pin 309. One end of rectangular swivel block 315 is provided with an upper or external swivel pin 316 and the opposite end of the swivel block is provided with a lower or internal swivel pin 317 in alinement with swivel pin 316. Pivotally supported on swivel pins 316, 317 of swivel block 315 is an oscillating hollow control member 318. Control member 318 is provided with an apertured upper lug or swivel hub 319 and a lower apertured lug or swivel hub 320, the apertures in said lugs or hubs being in alinement and fitting swivel pins 316, 317, respectively, of swivel block 315 whereby control member 318 is pivotally supported on swivel block 315. Control member 318 is provided with an operating handle 321. Rotatably mounted within sleeve 308 is a hollow shaft or sleeve 322 provided at one end with a valve-actuating lever 323 and at the other end with a valve-actuating lever 324. Rotatably mounted within hollow shaft or sleeve 322 is a shaft 325 provided at one end with a valve-actuating lever 326 and at the other end with a valve-actuating lever 327. The levers 323, 326 of hollow shaft 322 and shaft 325, respectively, extend into the hollow control member 318, the swinging ends of these levers being provided with pivoted followers 328, 329, which engage oscillation tracks or arcs 330, 331, respectively, provided within the hollow interior of oscillating control member 318. The valve-actuating levers 324, 327, are connected by suitable mechanism, not shown, to any suitable or well known type of valves (not shown).

It will be seen that control member 318 is mounted for oscillation about either a horizontal axis or a vertical axis or both and that when said control member is oscillated by means of handle 321, levers 323, 324, 326, 327, will be actuated, causing a corresponding opening or closing of the dependent valves.

In Fig. 53, the control handle is shown swung to the extreme left, in which position the valves are closed, and in dotted lines are shown the central and the extreme right positions of the control handle. In order for the control handle to assume the positions shown in dotted lines in Fig. 53, the oscillating control member 318 is turned on pins 316, 317, of the swivel block 315. This turning does not affect or change the closed position of valve-actuating levers 323, 326 which remain in the positions shown in Figs. 54 and 58 (full line position of levers), due to the fact that the center lines of both levers coincide and pass through the pivotal intersection line 332 of the arcs or tracks 330, 331 of control member 318. Fig. 58 shows in dotted lines the location of levers 323, 326 in either extreme open valve position brought about by tilting control member 318 on pivot pin 309 into the position of Figs. 56 and 57. The oscillations of levers 323, 326 to produce the open-valve position indicated are produced by arcs or tracks 330, 331 of control member 318 acting on these levers through the followers 328, 329, respectively. The axial planes of arcs or tracks 330, 331, intersect on the swivel axis 332 at an angle suitably chosen to produce the required valve lever angular spread when control member 318 and arcs or tracks 330, 331, are tilted on pivot pin 309 into open positions as shown in Fig. 56. For any intermediate tilt positions of control member 318 on pin 309, the amount of total oscillation of both levers 323, 326 is proportional to the corresponding angle spread of arcs or tracks 330, 331; while the amount of individual oscillation of lever 323 and lever 326 is proportional to the angle of side swing of handle 321, bisecting the included angle of the planes of the arcs or tracks 330, 331, from the central plane of oscillation about pivot pin 309. Thus when handle 321 coincides with this plane, the swing angles of the levers 323, 326, are both alike, while with handle 321 swung to one side of this plane, the opening angle of one lever is increased and that of the other is correspondingly decreased. The handle 321 can be oscillated for fluid ratio adjustment while in closed valve-lever position, thus permitting a pre-setting of the control parts for a pre-selected fluid ratio.

The travel area of the tip end of the control handle is a spherical rectangle and the control lever can be moved in any desired path within this area.

The fluid flow rate is controlled by the amount of angular elevation of the control handle above the plane of closure of the valves and the fluid ratio is controlled by the amount of angular side deflection of the control handle from a central plane in which plane the fluid proportion ratio is equal for both fluids.

Referring to Figs. 67–78 inclusive, 333 indicates generally a main casing or faucet body provided with inlet or fluid supply passages 334, 335, controlled by valves generally referred to by 336, 337, respectively. Valves 336, 337 discharge into a mixing or discharge passage 338 connected to the hollow discharge spout 339 with which the faucet body 333 is provided. Each valve proper, together with the other parts making up the complete valve assembly, is supported in a socket or passage provided therefor in main casing 333, one of these sockets, indicated by 340, being shown in Fig. 72. In each of said sockets is fitted or supported a hollow valve sleeve 341 provided with an internal threaded portion 342 adapted to receive and rotatably support an enlarged threaded portion 343 of valve stem 344. The lower end of valve stem 344 is provided with a renewable valve body or disk 345 which is adapted to seat against a removable valve seat 346 supported on the lower end of the valve sleeve 341. Valve stem 344 is slidably and rotatably mounted in a valve stuffing gland 347 provided with gland packing 348, said stuffing gland being secured to main casing 333 by screw threads or similar means and clamping the valve sleeve 341 in place. As shown in Fig. 72, the upper end of the valve stem 344 projects from the stuffing gland 347 and is provided with a threaded portion 349 and a plurality of longitudinally extending splines or keyways 350. Rotatably mounted on the threaded portion 349 of each valve stem 344 is a valve actuating gear 351 or 352, each gear being provided with an internal threaded portion 353, and external threads or spiral teeth 354. The external spiral teeth 354 of valve actuating gear 351 are right hand and the external spiral teeth of valve actuating gear 352 are left hand, for reasons which will be explained hereafter. Slidably mounted on the splined end of the valve stem 344 is an adjusting knob or member 355 provided with internal teeth or keys 356 which engage in the slots or keyways 350 of valve stem 344 whereby rotation of adjustment knob 355 relative to said valve stem is prevented. Adjustment knob 355 is also provided with a plurality of clutch teeth 357 which are adapted to engage in a plurality of complementary internal slots or keyways provided in each of the valve actuating gears 351, 352. With the parts as shown in Fig. 72, rotation of valve gear 352 relative to valve stem 344 is prevented because of the engagement of clutch teeth 357 of adjustment knob 355 with the internal slots or keyways of valve gear 352, rotation of adjustment knob 355 relative to valve stem 344 being in turn prevented because of the engagement of teeth 356 with splines or keyways 350 provided in said valve stem. By sliding clutch teeth 357 of the adjustment knob out of engagement with the slots or keyways 358 of the valve actuating gear, the valve stem 344 will be free to rotate in said valve actuating gear and thus the valve can be adjusted to compensate for wear, etc.

The valves are actuated, through valve actuating gears 351, 352, by a control member 359 which is slidably mounted on a pivot block 360 having a pivot shank 361 pivotally supported in a recess 362 provided therefor in main casing or body 333. A pivoted lock washer 363 engaging in a groove or recess 364 in pivot shank 361 provides means for removably locking the pivot block to the main faucet body. The circular block or control member 359, which is mounted for slidable and rotatable movement relative to valve actuating gears 351, 352, is provided on its periphery with right hand spiral teeth 365 and left hand spiral teeth 366, said right hand spiral teeth 365 engaging with the right hand spiral teeth of actuating gear 351 and said left hand spiral teeth 366 of control member 359 engaging with the left hand spiral teeth of valve actuating gear 352. Pivotally connected to wedge block or control member 359 by a horizontally extending pivot pin 367 is a control handle or lever 368, said lever extending through a slot or opening 359a in control member 359. The pivot block 360 is recessed or cut away at 369 to permit sliding movement of pivot pin 367 longitudinally of said pivot block, the bottom of said recess 369 being formed to provide a slot 370 to receive a projecting lug or tooth 371 on control lever or handle 368, said lug or tooth acting as a fulcrum for vertical tilting movement or oscillation of lever 368. It will be seen that vertical oscillation or tilting of lever 368 will cause vertical sliding movement of control member or wedge block 359 and that horizontal oscillation or swing of lever 368 will cause rotary movement of control member 359.

The valve operating parts are covered and protected by a removable cover or hood 372. Hood 372 is provided with an aperture 373 through which extends the waste valve operating rod 374 provided with a knob or handle 375. Hood 372 is also provided with an aperture 376 through which extends the reduced end 377 of pivot block 360. Also mounted on the reduced end 377 of pivot block 360 is an auxiliary cover or hood 378, said auxiliary cover 378 partially enclosing pivot block 360 and turning with it to its extreme right or left positions to preclude exposure of the gear teeth of the wedge block or control member 359. Outside cover 372 and auxiliary cover 378 are held in place by a snap washer 379 which engages in a groove in the reduced end 377 of pivot block 360.

If control lever 368 be moved from the position shown in full lines to the position shown in dotted lines in Fig. 69, it will pivot about the engagement line of tooth 371 in pivot block 360 and raise pivot pin 367 and through it the wedge block or control member 359. Spiral teeth 365 and 366 of control block or member 359 will slide in the engaging spiral valve actuating gears 351, 352 mounted on the valve stems or spindles and will cause said stems or spindles to turn in equal amounts, opening equally both fluid supply valves. If, while in this elevated position, the control handle 368 be swung to the right in Figs. 68 and 70, gear 351 will cause a further opening of its dependent valve and gear 352 will cause corresponding closing of its dependent valve. A swing of the control handle 368 to the left will reverse the respective opening conditions of the two valves, a part-way swing of handle lever 368 causing a proportional alteration of respective valve openings.

The travel area of the tip of the control lever or handle is that of a spherical triangle within which the control lever can be moved in any path desired. The amount of fluid flow is proportional to the elevation of the control handle above the horizontal; the fluid ratio is dependent on the amount of lever deflection to the right or left of the vertical central plane, in which plane the fluid proportions are equal for both supply valves.

Referring to Figs. 79–91, inclusive, 380 indicates generally a main faucet body or casing provided with fluid inlets or supply passages 381, 382 controlled by valves indicated generally by 383, 384, respectively. Valves 383, 384 discharge into a discharge or mixing passage 385 connected to the hollow discharge spout 386. Main faucet body or casing 380 is provided with an enlarged portion or head 387 and a shank 388 through which inlet passages 381, 382 extend. The faucet body is adapted to be mounted on a basin or similar fixture, indicated at 389, with the head 387 resting on the top of the basin and the hollow shank extending through an aperture in said basin. The projecting tapered end of the hollow shank 388 extends into a hollow fitting 390, said fitting being clamped in place by clamp nut or bushing 391 secured to the end of shank 388 by screw threads or similar fastening means. Fitting 390 is provided with a clamping nut or bushing 392 connected by screw threads or similar fastening means to said fitting, said clamping nut 392 being adapted to engage the under side of the basin to clamp the faucet body in place. Fitting 390 is provided with openings 393, 394 adapted to register with apertures 381a, 382a opening into passages 381, 382, respectively, of shank 388. Fluid supply pipes 395, 396 are connected to openings 393, 394, respectively of fitting 390. It will be seen from the foregoing that this fixture can be easily and quickly installed and connected.

The valves generally referred to by 383, 384 are mounted in sockets or passages 397, provided therefor in main faucet body 380. These valves are generally similar to the valves illustrated in Figs. 67–78, but differ in important particulars which will be pointed out hereafter. Mounted in each socket or recess 397 is a combined valve seat and seat cage member 398 held in place by a valve packing gland 399 secured to main casing 380 by screw threads or similar fastening means, said gland and seat cage slidably supporting the valve stem or spindle 400. The lower end of valve stem 400 is provided with a renewable valve head or disk 401 adapted to seat against valve seat 398. The opposite or upper end of the valve spindle 400 is provided with a threaded portion 402 and a plurality of longitudinally extending splines or keyways 403. Rotatably mounted on the threaded portion 402 of each valve stem is a valve actuating gear 404 or 405, each gear being provided with an internal threaded portion 406 which engages the threaded portion 402 on the valve spindles. Slidably mounted on the upper or threaded end of each valve stem 400 is a valve clutch or adjusting member 407, said clutch member being provided with internal clutch splines or keys 408 which engage in the longitudinally extending keyways 403 on valve stem 400. Clutch member 407 is also provided with axially extending teeth or keys 409 adapted to engage in complementary recesses or keyways 410 provided in valve actuating gears 404, 405. A spring 416 mounted on casing 380 normally retains the clutch member in the position shown in Figs. 80 and 83. As thus shown, the valve stem or spindle 400 and valve actuating gear 404 are locked against relative rotary movement, but when clutch member 407 is slid along said valve stem sufficiently to disengage teeth 409 from recesses 410, the valve stem can be rotated within the valve actuating gear, thus permitting an adjustment of the position of the valve to compensate for wear, etc. Each valve actuating gear 404, 405, is provided on a portion of its periphery with external threads 411 which engage with the internally threaded apertures or guides 412, 413, respectively, provided therefor in faucet body 380. The threads 411 on each valve actuating gear extend for half of the circumference of each valve gear, indicated by the arcs a in Figs. 85 and 86. A portion of the remainder of the circumference of each valve gear is provided with spiral gear teeth 414, the outside diameter of these gear teeth being smaller than the root diameter of the threads 411 to allow turning of each valve actuating gear in its respective threaded guide 412, 413. The extent of the spiral gear teeth on the circumference of each valve gear is indicated by the arc C in Figs. 85, 86. The remaining portion of the circumference of each valve gear is provided with a recess or clearance cut 415. The extent of this cut is indicated by arc c in Figs. 85, 86. In this form it will be observed that the guide threads and the spiral actuating threads have been combined and both placed on each valve actuating gear, thus materially reducing the amount of space required.

The valves are actuated, through valve actuating gears 404, 405, by a circular control member or wedge block 417 provided on its periphery with right hand spiral teeth 418 and left hand spiral teeth 419. The right hand spiral teeth 418 of wedge block 417 engage with the spiral teeth on valve actuating gear 404 and the left hand spiral teeth 419 of said wedge block engage with the spiral teeth on valve actuating gear 405. As shown in Fig. 87, the extent of the portions of the circumference of wedge block 417 covered by the spiral teeth 418, 419 is indicated by the arcs d, e, respectively. Wedge block or control member 417, which fits into a recess 420 provided therefor in main casing 380, is slidably mounted on a pivot pin 421 rotatably mounted in the recess 422 provided therefor in casing 480. A beveled U-shaped washer or plate 423 engages in grooves 424, 425, provided in one end of pin 421, and casing 380, respectively, to removably lock the pivot pin in place. The upper or opposite end of pivot pin 421 is provided with a longitudinally extending slot or opening 426 to receive a control lever or handle 427 which is pivotally connected to pivot pin 421 by a horizontally extending pivot pin 428 mounted therein. Control lever 427 extends into a slot 429 provided in control member or wedge block 417. Control member or wedge block 417 is also provided with an internal groove or recess 430 in alinement with slot 429, said recess receiving a lug or projecting tooth 431 provided on control lever 427. It will thus be seen that when control lever or handle 427 is oscillated on control lever pivot 428, control member or wedge block 417 will be caused to slide on pivot pin 421 and then when control lever 427 is oscillated on the vertically extending pivot 421, rotary movement of wedge block or control member 417 will be caused.

As shown in Fig. 79, control lever or handle 427 is in closed position. Means are provided for normally holding the said control lever in closed position comprising a link 432 pivotally connected at one end to control lever 427. The other end, which extends into the hollow pivot pin 421, is provided with a head 433. A spring 434 is confined between head 433 and a shoulder or abutment 435 of hollow pin 421, said spring tending to hold the control lever in closed position.

The operating parts are covered by a main hood or cover plate 436 suitably recessed to permit unrestrained movement or oscillation of control member 427. An auxiliary cover plate 437 carried by pivot pin 421 and movable therewith is also provided. A waste valve operating rod and handle or knob are indicated by 438, 439, respectively.

As previously stated, Fig. 79 shows the control lever 427 in closed position. If said lever be swung to the position indicated by dotted lines in Fig. 79, it will pivot about pin 428 held in pivot pin 421 and the tooth or lug 431 on said control lever will move control member or wedge block 417 downwardly on pin 421. Spiral teeth 418 and 419 of wedge block 417, through their engagement with corresponding spiral teeth 414 in valve actuating gears 404, 405, will cause said valve actuating gears to turn. This turning of said valve actuating gears, through the action of threads 411 in the threaded guides 412, 413, respectively, in main body 380, will cause a simultaneous travel of said valve actuating gears in the direction of the valve axes. This movement of the valve actuating gears and the valve spindles secured thereto will cause a separation of valves 401 from their stationary seats 398, thereby admitting fluid from passages 381, 382, to mixing or discharge passage 385 connected to spout 386.

If lever 427, while in this last position, be swung to the right or left as indicated by dotted lines in Fig. 81, then control member or wedge block 417 swinging with said lever, will, through teeth 418, 419, impart a turning movement through teeth 414 to valve actuating gears 404, 405 and through the action of threads 411 in threaded guides 412, 413, respectively, will cause the lowering of one valve and the corresponding raising of the other. When control lever 427 is depressed to fully closed position, it will resume the central full line position of Figs. 79 and 81, from which it can be moved to any point in its travel area in any desired path. The travel area of the tip of the control handle is that of a spherical triangle.

The flow volume control is proportional to control lever elevation above the horizontal plane D—D; the fluid ratio is proportional to the amount of side swing of the control lever from the vertical plane A—A, in which plane the flow rate is equal for both component fluids.

Figs. 92-95 inclusive, illustrate an embodiment of the invention in which the construction shown in Figs. 79-91, inclusive has been modified to place the valve mechanism below the basin or similar fixture. Referring to Figs. 92-95, inclusive, 440 indicates generally a main hollow body or casing to which are connected suitable fluid supply pipes 441 and 442, said pipes communicating with inlet passages controlled by valves referred to generally by 383, 384. One of said inlet passages is indicated by 383ª in Fig. 93. The main body or casing 440 is provided with a hollow shank 443 having an annular fluid discharge passage 444 into which said valves discharge. The end of hollow shank 443 extends into a discharge fitting or spout 445, which rests on the top of the basin or similar fixture, the end of the hollow shank receiving a spout holding nut 446 which is secured to the end of the hollow shank by screw threads or similar fastening means. Nut 446 clamps against suitable packing 446ª and an apertured spacing sleeve 446ᵇ mounted in spout 445. A clamping nut 447 mounted on shank 443 clamps the assembled body and spout to the basin or similar fixture. Hollow shank 443 is provided with a plurality of discharge apertures 448 opening into annular discharge passage 444, said apertures registering with the hollow discharge passage of the spout 445.

The valve assemblies generally referred to by 383, 384 are mounted in sockets or passages 397 provided therefor in main body or casing 440. This mounting of the valves and the various parts making up the valve assemblies, including the valve actuating gears, are practically identical with the parts correspondingly numbered in Figs. 79-91, inclusive, and reference is made to the previous detailed description of these parts for a detailed understanding of the parts correspondingly numbered in Figs. 92-95, inclusive.

The valves are actuated, through valve actuating gears 404, 405, by a circular control member or wedge block 449, which is similar in construction to, and functions like, the circular control member or wedge block 417 illustrated in Figs. 79-91, inclusive. The slight differences in construction between the two forms of wedge blocks are due to the differences in mounting, wedge block 449 being without the slot 429 and groove 430 of wedge block 417, due to the fact that wedge block 449 is not directly engaged by the control lever or handle. Control member or wedge block 449 is securely clamped in place on the lower end of a wedge block sleeve 450 by a clamping nut 451. Wedge block sleeve 450 extends through the hollow guide 452 of shank 443, the upper or extending end of said sleeve being provided with an integral enlarged head or slide block 453 which is guided in the annular extension 454 of spout 445. Wedge slide block 453 is provided with lateral indentations or cut away portions 455 to receive the arms of a U-shaped control lever or handle 456, the arms of said lever being provided with lugs or teeth 457 adapted to engage in recesses 458 provided in wedge block slide 453. Control lever or handle 456 is pivotally supported by means of pivot pin 459 carried by pivot cap 460. Pivot cap 460, which is swiveled to the spout fitting 445, is provided with guide lugs or extensions 461 which fit into the annular extension 454 of the spout body 445. Wedge block slide 453 is provided with a horizontally extending slot or recess 462 which receives the pivot pin 459 and permits relative sliding movement of pin 459 and slide block 453. A waste valve actuating rod 463 provided with handle or knob 464 extends through an aperture in pivot cap 460 and through wedge block sleeve 450.

It will be seen from the above that control lever or handle 456 is supported for movement or oscillation about both vertical and horizontal axes. The operation of this form of the invention is similar to that illustrated in Figs. 79-91, inclusive, the only difference being that oscillation of control lever 456 is transmitted to the wedge block by means of the wedge block sleeve and slide in this form, whereas in the form illustrated in Figs. 79-91, the control lever or handle directly engages the wedge block. Except for these differences, the operation of the two forms is the same and the remarks regarding the operation of the form illustrated in Figs. 79-91 apply here.

Figs. 96-98, inclusive, illustrate an embodiment of the invention applied in the form of an attachment to a commercial mixing faucet of the type shown. Referring to Figs. 96-98, 465 indicates a main hollow faucet body or casing provided with inlet branches or passages 466, 467 controlled by valves (not shown) having valve stems or spindles 468, 469, respectively. The valves, which may be of any suitable or well known construction, discharge into the mixing or discharge spout 470 with which the main faucet body is provided.

A control mechanism is supported by a main supporting frame of housing member 471 which rests on the main faucet body 465, being held or clamped in place by a clamp yoke 472 and clamping bolt 473. Housing 471 is provided with alined hollow tubular end portions 474, 475, the ends of which are provided with enlarged hollow portions or gear covers 476, 477, respectively. Rotatably mounted in split bushings 478, 479 secured in the tubular guide portions 474, 475 of housing 471 by pins 480, are gear shafts 482, 481, respectively. The inner ends of gear shafts 481, 482, which are provided with spiral threads or teeth 483, 484, extend into a sleeve 485 provided with right hand and left hand internal spiral splines or threads which engage the corresponding external spiral splines or teeth on the gear shafts 481, 482. Sleeve 485 is provided with an operating lever or handle 486. The outer ends of gear shafts 481, 482 are provided with integral spur gear sectors 487, 488, said gear sectors engaging or meshing with spur gears 489, 490, secured to valve stems or spindles 469, 468, respectively.

From the above it will be noted that spiral sleeve or control member 485 is mounted for sliding and rotary movement and such movement will be transmitted through the gearing just mentioned to the valves to open and close the same. As shown in the drawings, the valve connected to valve stem 469 is in fully opened position and the valve connected to valve stem 468 is in fully closed position. If the control lever or handle 486 be moved in its elevated position from the right, as shown in Figs. 96 and 97, to the left, the valve connected to the stem 469 would gradually close and the valve connected to stem 468 would simultaneously open. When the control lever 486 reaches the extreme left position, as indicated in dotted lines in Fig. 97, the valve connected to stem 468 will be wide open and the valve connected to stem 469 will be fully closed. Referring to Figs. 96 and 98, if the control lever 486 be moved from the open position, shown in full lines, to the closed position, indicated in dotted lines, it would travel on a helical line to assume the position shown in dotted lines.

The travel area of the tip of the control lever is that of a triangle on a cylindrical surface, within which area said control handle can be moved in any path desired. The angle of the incline of the control lever from the horizontal controls the fluid flow rate and the amount of side movement from the central vertical plane controls the fluid ratio, the fluid proportion being equal when the control lever is in this vertical central plane.

Adjustment means have been provided for ensuring a proper seating of the valves to compensate for wear, etc. Each valve gear 489, 490 is connected by screw threads or similar means which will permit relative rotary movement between each valve gear and its respective valve stem. Rotation of each valve gear relative to its valve stem is, however, normally prevented by suitable clutch means, said means being adjustable or movable to permit relative movement of each valve gear and its valve stem when an adjustment is desired. When the clutch is released, the respective valve stem can be rotated in its valve gear so that adjustment of the valve for proper seating is thus permitted. Two forms of clutch adjustments are shown. In the form illustrated to the left in Fig. 97, a clutch member 491, provided with internally and axially extending splines or keys 492, is slidably mounted on the valve stem 468. The splines or keys 492 of the clutch member normally engage in longitudinally extending keyways 493 and recesses 494 provided in valve stem 468 and spur gear 490, respectively, thus normally locking said valve stem and spur gear against relative rotary movement. A circular spring 491ª mounted in a recess in clutch member 491 normally engages the threads of valve stem 468 to hold the clutch member in adjusted position. To adjust the valve, clutch member 491 is released from engagement with spur gear 490 and valve stem 468 can then be turned in spur gear 490 to adjust the valve. After adjustment the parts are returned to the normal or locked position shown in Fig. 97. In the modified form of adjusting clutch shown to the right in Fig. 97, a different means for yieldingly holding the clutch member in locking position is shown. In this form, a screw 495 carried by valve stem 469 holds a spring 496 in engagement with the clutch member 497, said spring yieldingly holding the clutch member in locking position. Except as noted, the operation of this form of clutch member is the same as that just described.

Figs. 99–103, inclusive, illustrate an embodiment of the invention applied in the form of an attachment to a commercial faucet of the type illustrated in Figs. 96–98. Referring to Figs. 99–103, 498 indicates a hollow faucet body or casing provided with inlet branches or passages 499, 500, controlled by valves (not shown) having valve stems or spindles 501, 502, respectively. The valves, which may be of any suitable or well known construction, discharge into the mixing or discharge spout 503 provided on faucet body 498.

The means for operating or controlling the valves comprises a control member or handle 504 provided with apertured ends or hubs 505, 506. Hubs 505, 506, which are internally threaded, engage or fit over the externally threaded spiral gears 507, 508 secured to valve spindles 501, 502, respectively. As shown in the drawings, the spiral teeth on gear 507 are left hand and the teeth on spiral gear 508 are right hand. It will be seen that control member or handle 504 is supported for sliding and rotary movement and that such movement of the control handle will, through the gearing just mentioned, cause opening or closing of the valves. With the control handle 504 in the position shown in the drawings, both valves are partially open. If the control handle be moved to the right from this position, the valve connected to valve stem 501 will close and the valve connected to valve stem 502 will be fully opened. These valve actions will be reversed if the control lever is moved to the extreme left. If the control handle 504 be swung from the raised position shown to a position in which the handle proper is substantially on the same level with the horizontal axis of the fixture, both valves would close. The area of the travel of the handle is a triangle on a cylinder and within this area the handle may be moved in any path desired. The angle of incline of the handle to the horizontal controls the fluid flow rate and the amount of angular side travel from the central vertical plane controls the variation of fluid proportion, the proportions being equal in said central vertical plane.

Means for adjusting the position of the valves to ensure proper seating have been provided. In the form illustrated in Figs. 102, 103, the hub 506ª is provided with internal screw threads adapted to receive the externally threaded portion of an adjusting member or bushing 509. Hollow member or bushing 509 is provided with internal splines or spiral threads 510 which engage the external spiral threads of the spiral gear 508. Spiral gear 508 is splined or otherwise rigidly secured to valve stem 502, being held in place by the screw 511 fitted in the end of said valve stem. Adjustment member 509 is normally held against rotation in hub 506ª by means of a screw or threaded pin 512 fitting in any one of a plurality of threaded apertures 513 provided therefor in hub 506ª, the projecting end of said pin or screw engaging in any one of a plurality of notches or recesses 514 provided in the flanged end 515 of hollow adjustment member or bushing 509. The apertures 513 are so arranged relative to the spacing of recesses 514 in flange 515 as to provide adjustment or turning movement of member 509 for less than the distance between the notches when this is desirable. It will be seen that when pin 512 is disengaged from the adjustment member, valve stem 502 can be turned relatively to the hub 506ª, thus permitting the position of the dependent valve to be adjusted.

Referring to Figs. 104–115, inclusive, 516 indicates generally a hollow faucet body or casing provided with inlet or fluid supply passages 517, 518, controlled by valves generally referred to by 336, 337, respectively, said valves discharging into a mixing passage 519 connected to the hollow spout 520 with which said faucet body is provided. The valve assemblies generally referred to by 336, 337, are mounted in sockets or passages 521, provided therefor in main casing 516. The valve parts making up the valve assemblies and the mounting thereof are substantially identical with the parts correspondingly numbered in Figs. 67-78, inclusive, and reference is made to the previous detailed description of these parts for a detailed understanding of the parts correspondingly numbered in Figs. 104-115, inclusive. Mounted on the threaded portion 349 of each valve stem is a valve actuating gear 522 or 523, said gears corresponding generally to the valve actuating gears 351, 352 illustrated in Figs. 67-78.

The valves are actuated, through valve actuating gears 522, 523, by a control member or wedge block 524. Control member 524 comprises a stepped cylindrical body having a portion 525 of relatively small radius extending for the greater portion of the circumference of said control member and a portion 526 of larger radius extending for the remaining or smaller part of the circumference of said control member. The centers of the arcuate portions 525 and 526 are coaxial. The control member or wedge block 524 is supported for rotary or oscillating and sliding movement in a longitudinally extending recess or hollow guide 527 in a hollow frame 528 supported on main casing 516, said recess 527 comprising a hollow semicylindrical portion 529, and a larger hollow semicylindrical portion 530 adapted to receive the small and large arcuate portions 525, 526, respectively, of control member 524. Frame 528 is provided with a vertically extending passage 540 through which extends a waste valve operating rod 541 and a headed sleeve or hollow bolt 542 secured to main casing 516 by screw threads or similar fastening means. Hollow bolt 542 clamps the frame 528 and the faucet hood 543 in place. Mounted in a slot or recess 544 provided in frame 528, said slot or recess opening into or intersecting the recess or hollow guide 527, is a guide yoke 545 provided with an opening 546 profiled to fit wedge block or control member 524. The control member or wedge block extends through the opening 546 in guide yoke 545 and holds said yoke in place in slot 544. Pivotally mounted between spaced jaws 547 of guide yoke 545 by pivot pin 548, is a control lever or handle 549. One end of said control lever or handle is provided with a gear segment or spur teeth 550 engaging with the spur teeth or rack portion 551 formed in the small arcuate portion 525 of control member or wedge block 524. The periphery of the large arcuate portion 526 of control member or wedge block 524 is provided with right hand spiral teeth 552 and left hand spiral teeth 553, said teeth engaging corresponding spiral teeth 354 of valve actuating gears 522, 523. It will be seen that oscillation of control lever or handle 549 about pivot pin 548 will cause the control member or wedge block 524 to slide in the guide recess 527 in frame 528 and that when said control handle is elevated or depressed, said control member or wedge block will, through yoke 545, be oscillated or turned in guide recess 527. Because of the engagement of spiral teeth 552, 553 of control member 524 with the spiral teeth on valve actuating gears 522, 523, respectively, the sliding and turning movement of the control member or wedge block 524 will cause opening or closing of the valves.

The control lever is shown in the position it occupies when both valves are closed. If said control lever be elevated, wedge block 524 would be turned on its horizontal axis and because of the engagement of the spiral teeth 552, 553 with the spiral teeth on valve actuating gears 522, 523, both valves would be opened an equal amount. If, in this elevated position, the control lever 549 be oscillated about pivot pin 548, wedge block 524 will be caused to slide, due to the action of the gear teeth 550 on gear rack 551, and said movement of the wedge block will cause an increased opening of the valve toward which the wedge block is moved, and a decreased opening of the valve from which the middle point of the wedge block is moved. If this slide movement of the control lever be of sufficient magnitude to cause complete closing of one valve, then the other valve will be fully opened. If lever 549 be at its maximum elevation, the flow through the open valve would also be at the maximum; if lever 549 be now returned to central plane position without lowering its elevation, both valves would be equally open and their combined flow would equal that of the one valve at maximum opening. A decrease in lever elevation would reduce the flow rate while preserving the same flow ratio, if such decrease in elevation be made by movement of the control lever on a straight line to the closed valve lever location in the central plane, as shown in the drawings.

The travel area of the tip of the control lever is that of a curved triangle within which the lever can be moved in any path desired. The angle of the incline of the lever from the horizontal controls the fluid flow rate and the angle of side placement from the central vertical plane controls the fluid ratio, the proportions being equal when the lever is in said central vertical plane.

Referring to Figs. 116, 125, inclusive, 554 indicates a hollow faucet body or casing provided with inlet or fluid supply passages 555, 556, controlled by valves generally referred to by 336, 337, respectively, said valves discharging into a mixing or discharge passage 557 connected to the hollow spout 558 provided on the faucet body. The valve assemblies generally referred to by 336, 337, are mounted in sockets or passages 559 provided therefor in main casing 554. The valve parts making up the valve assemblies and the mounting thereof are practically identical with the parts correspondingly numbered in Figs. 67-78, inclusive, and reference is made to the previous detailed description of these parts for a detailed understanding of the parts correspondingly numbered in Figs. 116-125, inclusive. Mounted on the threaded portion 349 of each valve stem is a valve actuating gear 522 or 523, said gears being practically identical with the gears correspondingly numbered in Figs. 104-115, and also corresponding generally to the valve actuating gears 351, 352, respectively, illustrated in Figs. 67-78.

The valves are actuated, through valve actuating gears 522, 523, by a control member or gear 560 provided with an integral handle or lever 561. Control member 560, which takes the form of a beveled gear, is pivotally supported on the control member pivot pin 562. Pivot pin 562 is carried by a pivot block 563 rotatably supported on the pivot shaft 564 mounted in the apertured arms of a forked bracket 565 provided on main casing 554. Rotatably mounted on pivot shaft 564, on either side of control member or gear 560, are differential gear members 566, 567, each of said gears being provided with beveled gear portions or teeth 568 which engage with the beveled gear teeth on control member 560. Transmission gears 566, 567 are also provided with spiral gear portions or teeth 569, 570, respectively, the spiral teeth on gear 566 being right hand and the spiral teeth on gear 567 being left hand. The spiral teeth 569, 570 of transmission gears 566, 567 engage the spiral teeth of valve actuating gears 522, 523, respectively. It will be seen that control member or gear 560 is supported for movement about either a horizontal or vertical axis and that such movement of the control member will be transmitted through the gearing just mentioned to the valves, causing them to open or close.

In order to enclose and protect the operating parts, a main faucet hood or outside cover 571 is provided. An auxiliary cover 572 mounted on a pin 573 of pivot block 563, is provided to more completely shield and enclose the control gears, said gear cover 572 moving with the pivot block 563. 574 indicates a waste valve actuating rod supported by main casing 554.

The drawings show the control lever in the position it occupies when the valves are in closed position. If said control lever be moved to the position shown by dotted lines in Fig. 116, both valves would open equally, each to one-half of its full flow opening, due to the fact that gear 560 would move equally gears 566 and 567, as one unit, about shaft 564, the spiral teeth 569, 570 of said gears imparting equal movement to the valve stem spiral gears 523, 522, respectively, thereby raising both valves. If in this elevated position, control lever 561 be moved to the right to assume the position indicated by dotted lines in Fig. 118, then gear 566 will be turned in a reverse direction for a distance equal to the distance it was previously moved on movement of the control lever from closed to open position, and accordingly the valve connected to gear 566 through valve actuating gear 523 will be closed; at the same time gear 567 will move in the same direction again as much as it was moved when control lever 561 was moved to open middle position and the valve geared to gear 567 will be opened fully. Movement of control lever 561 to a position to the extreme left would reverse the action of the gears, opening the previously closed valve and closing the previously opened valve.

The travel area of the tip of the control lever is that of a spherical triangle within which the lever may be moved in any path desired. The angle of incline of the lever from the horizontal controls the fluid flow rate and the angle of the side travel plane with the central vertical plane of the fixture controls the variation of the fluid ratio proportion, the proportions being equal in said vertical central plane.

The modification illustrated in Figs. 126–143, inclusive, closely resembles the form illustrated in Figs. 116–125, inclusive. Referring to Figs. 126–143, 575 designates a hollow casing or faucet body provided with fluid inlet or supply passages 576, 577, controlled by valves generally referred to by 336, 337, respectively, said valves discharging into a discharge or mixing passage 580 connected to the hollow spout 581 with which main faucet body is provided. The valve assemblies generally referred to by 336, 337, are mounted in sockets or recesses 582 provided therefor in faucet body 575. The parts making up the valve assemblies and the mounting thereof are substantially identical with the parts correspondingly numbered in Figs. 67–78 and reference is made to the previous detailed description of these parts for a detailed understanding of the parts correspondingly numbered in Figs. 126–143, inclusive. Mounted on the threaded portion 349 of each valve spindle is a valve actuating gear 522 or 523, said gears being practically identical with the gears corespondingly numbered in Figs. 104–105, and also corresponding generally to the valve actuating gears 351, 352, respectively, illustrated in Figs. 67–78.

The valves are actuated, through valve actuating gears 522, 523, by control member or gear 583, provided with an integral handle or lever portion 584. Control member 583, which is formed as a bevel gear, is pivotally or rotatably supported on the shank of an apertured pin 585. Eye pin 585 is pivotally supported or suspended from gear pin 586, which in turn is supported by the spaced apertured arms or forked bracket portion 587 of a spider or support 588. Spider 588 is provided with a hollow shank 589 fitting in a socket or recess 590 provided therefor in main casing 575. A passage 591 in spider 588 in alinement with the hollow shank, forms a hollow guide for the waste valve actuating rod 592. Rotatably mounted on either end of gear pin 586, and on either side of the apertured end of pivot pin 585 and forked bracket 587, are transmitting gears 593, 594. Each of said transmitting gears is provided with a beveled gear segment or toothed portion 595 and a spiral gear segment or toothed portion 596. The beveled gear segments or gears 593, 594 engage the beveled control gear or member 583. The spiral teeth or segments 596 of gears 593, 594 engage, respectively, right hand spiral gear 597 and left hand spiral gear 598 rotatably supported on laterally extending studs 599, 600, respectively, with which spider 588 is provided. Spiral gears 597, 598 engage spiral valve actuating gears 522, 523, respectively. It will be seen that control member or gear 583 is supported for movement about both a vertical and horizontal axis and that such movement of the control member will, through the gearing just described, open or close the valves.

A faucet hood or cover 601 is provided to enclose and protect the operating or control parts. Cover 601 is locked in place by a spring lock member 602 which also functions to lock or hold spider 588 in place. Spring lock 602 is provided intermediate its ends with an enlarged fulcrum portion 603 adapted to be mounted in the groove or recess 604 provided therefor in spider 588. One end of spring lock 602 is provided with a hook 605 adapted to engage in a recess 606 in faucet body 575 when the spider and faucet body are assembled, as shown in Fig. 129, the spring thus holding or locking the spider and faucet body together. The other or opposite end of the spring lock 602 is provided with a rounded lateral extension or projection 607 which engages in an aperture 608 in cover 601 when the parts are assembled as shown in Fig. 129, to lock the cover in place.

The principle of operation of this form of this invention is substantially the same as that of the form illustrated in Figs. 116–125, from which this form differs mainly in that the differential gears 593, 594 indirectly engage the valve actuating gears through gears 597, 598 instead of engaging the valve actuating gears directly as is done in the form illustrated in Figs. 116–125. The present construction permits the pivot center of the control member or gear 583 to be brought in line with the center lines of the valves (see Fig. 128) and this construction also permits greater gear ratio choice than is possible with the single gear construction shown in Figs. 116–125.

The drawings show the control lever in the position it occupies when the valves are closed.

The explanation of the operation of the form illustrated in Figs. 116–125 applies with equal force to the present form of the invention, and in view of this fact it is believed to be unnecessary to repeat this explanation. Reference to this previous explanation is hereby made for detailed understanding of the operation of the present form of the invention.

It will be obvious to those skilled in the art that various changes and modifications can be made without departing from the spirit or scope of the invention as specified in the claims and it is to be understood that the invention is not limited to the exact arrangements illustrated and described.

What is claimed is:

1. Valve apparatus comprising two valves, and means movable about two different axes for positively opening and closing said valves, said means being movable in a path about either axis or in a different path which is the resultant of simultaneous movement about both axes.

2. Valve apparatus comprising a plurality of valves, means including a plurality of levers each movable about a different axis for actuating said valves, said means including reduction gearing, and means movable about two different axes for controlling the operation of such actuating means.

3. Valve apparatus comprising a plurality of valves, means movable about two different axes for positively opening and closing said valves, said means being movable in a path about either axis or in a different path which is the resultant of simultaneous movement about both axes, and means for guiding such operating means and limiting movement thereof to movement about the before-mentioned axes.

4. Valve apparatus comprising a plurality of independently movable valves, means movable on two different axes for operating said valves, said means including a valve actuating lever, and means for varying the effective length of said lever.

5. Valve apparatus comprising a plurality of valves, a lever for actuating either or both of said valves, and means carried by the lever for varying the effective length of said lever.

6. Valve apparatus comprising a plurality of independently movable valves, means for positively opening and closing said valves, and means movable about two different axes for controlling the operation of such valve opening and closing means.

7. Valve apparatus comprising a plurality of valves, a plurality of independent levers for actuating said valves, and means movable about two different axes in planes normal to each other for operating said levers, said means positively contacting said levers at all times.

8. Valve apparatus comprising a plurality of valves, a plurality of valve actuating levers, gear means connecting said levers and said valves, and means movable about two different axes for operating said levers.

9. Valve apparatus comprising a casing having a plurality of fluid inlet passages and a fluid discharge passage, a plurality of valves to control the fluid ratio and flow through said passages, and means movable about two different axes for positively opening and closing said valves, said means being movable in a path about either axis or in a different path which is the resultant of simultaneous movement about both axes.

10. Valve apparatus comprising a plurality of valves and means for operating said valves, such operating means being movable on two different axes to positively open and close said valves, movement of such operating means on one axis simultaneously opening or closing each valve an equal amount and movement of such valve operating means on the other axis causing the opening or closing of one valve and the closing or opening, respectively, of another valve, such operating means being movable without operation of said valves to permit preselection of valve operation.

11. Valve apparatus comprising two valves, and means movable on two different axes for positively opening and closing said valves, said means being movable in a path about either axis or in a path which is the resultant of simultaneous movement about both axes, movement of said means about one axis simultaneously opening or closing both valves, and movement of said means about the other axis opening or closing one valve and closing or opening, respectively, the other valve.

12. Valve apparatus comprising a plurality of valves and slidable and rotatable means for positively opening and closing said valves, sliding movement of said means simultaneously opening or simultaneously closing said valves, and rotary movement of said means opening or closing one valve and closing or opening, respectively, another valve.

13. Valve apparatus comprising a plurality of valves each provided with a spiral gear, and means engaging said gears for operating said valves independently or together.

14. Valve apparatus comprising a plurality of valves each provided with a spiral gear, and slidable and rotatable means engaging said gears for operating said valves.

15. Valve apparatus comprising a plurality of valves each provided with gear means, and common operating means engaging said gear means and movable in two different planes for opening and closing said valves.

16. Valve apparatus comprising a plurality of valves, and means movable on two different axes to positively open and close said valves, said means being movable without operation of said valves to permit a preselection of valve operation.

17. Valve apparatus comprising a casing provided with a plurality of fluid inlet and discharge passages, valve means controlling said fluid inlet passages, valve means controlling said discharge passages, and common means for operating said valve means, such operating means being movable in either of two zones without operating any of said first mentioned valve means to permit preselection of said first mentioned valve means to be operated, movement of said operating means from one zone to another causing closing of said first mentioned valve means, if open.

18. Valve apparatus comprising a casing provided with a plurality of fluid inlet and discharge passages and a mixing chamber connecting said passages, valve means controlling the fluid ratio and flow through said inlet passages, valve means controlling said discharge passages, common means located in said casing but separate from said passages and mixing chamber for actuating said valve means, and means for controlling the operation of said actuating means.

19. Valve apparatus comprising a casing provided with a plurality of fluid inlet passages, a discharge passage, a mixing chamber connecting said passages and a plurality of housings separate from said passages and mixing chamber, a valve controlling each of said inlet passages, means each located in a separate housing for actuating said valves, and means for controlling the operation of such actuating means.

20. Valve apparatus comprising a casing provided with a plurality of fluid inlet passages, a discharge passage, and a mixing chamber connecting said passages, valve means controlling said inlet passages, means located in said casing but separate from said passages and mixing chamber for actuating said valve means, and means movable about two different axes for controlling the operation of such actuating means.

21. Valve apparatus comprising a plurality of valves, a plurality of pivoted levers, one for each valve, for actuating said valves, the pivot of one lever being arranged at right angles to the pivot of the adjacent lever, and means movable about two different axes for actuating said levers.

22. Valve apparatus comprising a plurality of valves, a plurality of pivoted levers, one for each valve, for actuating said valves, the pivot of one lever being arranged at right angles to the pivot of the adjacent lever, gear means connecting each valve with its respective lever, and means movable about two different axes for actuating said levers.

23. Valve apparatus comprising a plurality of valves, a plurality of independent levers pivoted at right angles to each other for actuating said valves, and means movable about two different axes in planes normal to each other for operating said levers, said means being movable at all times about one axis or the other or about both axes simultaneously.

24. Valve apparatus comprising a plurality of valves, a plurality of independent levers for positively actuating said valves, and means movable about two different axes for positively moving said levers to and fro.

25. Valve apparatus comprising a plurality of valves, a plurality of pivoted levers, one for each valve, for actuating said valves, the pivot of one lever being arranged at right angles to the pivot of the adjacent lever, and means movable about two different axes for positively actuating said levers, said means being capable of movement on axes corresponding to the axes of the pivots of said levers.

CONSTANT J. KRYZANOWSKY,
*Administrator of the Estate of Julia B. Kryzanowsky, Deceased.*